(12) United States Patent
Lee et al.

(10) Patent No.: US 10,235,440 B2
(45) Date of Patent: Mar. 19, 2019

(54) DECENTRALIZED TRANSACTION COMMIT PROTOCOL

(71) Applicant: SAP SE, Walldorf (DE)

(72) Inventors: Juchang Lee, Seoul (KR); Chang Gyoo Park, Seoul (KR); Kyu Hwan Kim, Seoul (KR)

(73) Assignee: SAP SE, Walldorf (DE)

( * ) Notice: Subject to any disclaimer, the term of this patent is extended or adjusted under 35 U.S.C. 154(b) by 348 days.

(21) Appl. No.: 14/977,427

(22) Filed: Dec. 21, 2015

(65) Prior Publication Data

US 2017/0177698 A1   Jun. 22, 2017

(51) Int. Cl.
*G06F 17/30* (2006.01)

(52) U.S. Cl.
CPC .. *G06F 17/30581* (2013.01); *G06F 17/30351* (2013.01); *G06F 17/30477* (2013.01)

(58) Field of Classification Search
CPC ......... G06F 17/30581; G06F 17/30477; G06F 17/30351
See application file for complete search history.

(56) References Cited

U.S. PATENT DOCUMENTS

| | | | |
|---|---|---|---|
| 6,205,449 B1 * | 3/2001 | Rastogi | G06F 11/1471 |
| 6,662,196 B2 | 12/2003 | Holenstein et al. | |
| 7,290,056 B1 * | 10/2007 | McLaughlin, Jr. | H04L 43/0852 709/201 |
| 7,305,421 B2 | 12/2007 | Cha et al. | |
| 7,693,885 B2 | 4/2010 | Okada et al. | |
| 8,332,354 B1 | 12/2012 | Chatterjee et al. | |
| 8,442,962 B2 | 5/2013 | Lee et al. | |
| 8,700,660 B2 | 4/2014 | Lee et al. | |
| 8,768,927 B2 | 7/2014 | Yoon et al. | |
| 8,782,100 B2 | 7/2014 | Yoon et al. | |

(Continued)

FOREIGN PATENT DOCUMENTS

| | | |
|---|---|---|
| EP | 2653986 | 10/2013 |
| EP | 2738695 | 6/2014 |
| WO | WO 2016/045548 | 3/2016 |

OTHER PUBLICATIONS

Aulbach et al., "Extensibility and Data Sharing in Evolving Multi-Tenant Databases," in 2011 IEEE 27th International Conference on Data Engineering. IEEE, pp. 99-110 (2011).

(Continued)

*Primary Examiner* — Van H Oberly
(74) *Attorney, Agent, or Firm* — Klarquist Sparkman LLP

(57) ABSTRACT

Technologies are described for facilitating transaction processing within a database environment having first, second, and third database system nodes. In the database system, the first database system node receives from the second database system node a request to precommit a first database transaction. The first database system node stores information for the first database transaction that includes an indication that the second database system node coordinates the committing of the first database transaction. The first database system node receives from the third database system node a request to precommit a second database transaction. The first database system node stores information for the second database transaction that includes an indication that the third database system node coordinates the committing of the second database transaction.

21 Claims, 29 Drawing Sheets

(56) References Cited

U.S. PATENT DOCUMENTS

| | | | |
|---|---|---|---|
| 8,793,276 | B2 | 7/2014 | Lee et al. |
| 8,903,779 | B1 | 12/2014 | Holenstein et al. |
| 8,918,436 | B2 | 12/2014 | Yoon et al. |
| 8,935,205 | B2 | 1/2015 | Hildenbrand et al. |
| 9,009,182 | B2 | 4/2015 | Renkes et al. |
| 9,037,677 | B2 | 5/2015 | Lee et al. |
| 9,063,969 | B2 | 6/2015 | Lee et al. |
| 9,098,522 | B2 | 8/2015 | Lee et al. |
| 9,569,473 | B1 | 2/2017 | Holenstein et al. |
| 9,779,220 | B1* | 10/2017 | Kronrod .................. G06F 21/10 |
| 9,830,223 | B1 | 11/2017 | Holenstein et al. |
| 2003/0061537 | A1 | 3/2003 | Cha et al. |
| 2008/0065670 | A1 | 5/2008 | Cha et al. |
| 2008/0163062 | A1 | 7/2008 | Lee et al. |
| 2009/0024851 | A1* | 1/2009 | Andrade ............... H04L 9/3234 713/176 |
| 2009/0313311 | A1 | 6/2009 | Hoffmann et al. |
| 2009/0292744 | A1 | 11/2009 | Matsumura |
| 2011/0225121 | A1 | 9/2011 | Cooper |
| 2012/0084273 | A1 | 4/2012 | Lee et al. |
| 2012/0084274 | A1 | 4/2012 | Renkes et al. |
| 2012/0102006 | A1 | 4/2012 | Larson et al. |
| 2012/0105424 | A1 | 5/2012 | Lee et al. |
| 2012/0166407 | A1 | 6/2012 | Lee et al. |
| 2012/0167098 | A1 | 6/2012 | Lee et al. |
| 2012/0173589 | A1 | 7/2012 | Kwon et al. |
| 2013/0124475 | A1 | 5/2013 | Hildenbrand et al. |
| 2013/0151494 | A1* | 6/2013 | Dhamankar ...... G06F 17/30289 707/703 |
| 2013/0166534 | A1 | 6/2013 | Yoon et al. |
| 2013/0166553 | A1 | 6/2013 | Yoon et al. |
| 2013/0166554 | A1 | 6/2013 | Yoon et al. |
| 2013/0235000 | A1 | 9/2013 | Lee et al. |
| 2013/0275457 | A1 | 10/2013 | Lee et al. |
| 2013/0275467 | A1 | 10/2013 | Lee et al. |
| 2013/0275468 | A1 | 10/2013 | Lee et al. |
| 2013/0275550 | A1 | 10/2013 | Lee et al. |
| 2013/0290282 | A1 | 10/2013 | Faerber et al. |
| 2013/0304714 | A1 | 11/2013 | Lee et al. |
| 2014/0122439 | A1 | 5/2014 | Faerber et al. |
| 2014/0122452 | A1 | 5/2014 | Faerber et al. |
| 2014/0136473 | A1 | 5/2014 | Faerber et al. |
| 2014/0136788 | A1 | 5/2014 | Faerber et al. |
| 2014/0149353 | A1 | 5/2014 | Lee et al. |
| 2014/0149368 | A1 | 5/2014 | Lee et al. |
| 2014/0149527 | A1 | 5/2014 | Lee et al. |
| 2014/0156619 | A1 | 6/2014 | Lee et al. |
| 2014/0222418 | A1 | 8/2014 | Richtarsky et al. |
| 2014/0244628 | A1 | 8/2014 | Yoon et al. |
| 2014/0297686 | A1 | 10/2014 | Lee et al. |
| 2014/0304219 | A1 | 10/2014 | Yoon et al. |
| 2014/0337393 | A1 | 11/2014 | Burchall et al. |
| 2015/0074082 | A1 | 5/2015 | Yoon et al. |
| 2015/0149409 | A1 | 5/2015 | Lee et al. |
| 2015/0149413 | A1 | 5/2015 | Lee et al. |
| 2015/0149426 | A1 | 5/2015 | Kim et al. |
| 2015/0149704 | A1 | 5/2015 | Lee et al. |
| 2015/0149736 | A1 | 5/2015 | Kwon et al. |
| 2015/0178343 | A1 | 6/2015 | Renkes et al. |
| 2015/0242400 | A1 | 8/2015 | Bensberg et al. |
| 2015/0242451 | A1 | 8/2015 | Bensberg et al. |
| 2015/0254273 | A1* | 9/2015 | Larson .............. G06F 17/30575 707/703 |
| 2015/0261805 | A1 | 9/2015 | Lee et al. |
| 2016/0371356 | A1 | 12/2016 | Lee et al. |

OTHER PUBLICATIONS

Bailis et al., "Hat, Not Cap: Towards Highly Available Transactions", in Proceedings of the 14th USENIX Conference on Hot Topics in Operating Systems, pp. 24, USENIX Association (2013).
Bailis et al., "Scalable Atomic Visibility with Ramp Transactions," in Proceedings of the 2014 ACM SIGMOD International Conference on Management of Data. ACM, pp. 27-38 (2014).
Barber et al., "In-Memory Blu Acceleration in IBM's db2 and dashdb: Optimized for Modern Workloads and Hardware Architectures," in Proceedings of the 2015 International Conference on Data Engineering (ICDE). IEEE (2015).
Berenson et al., "A Critique of Ansi SQL Isolation Levels," ACM SIGMOD Record, vol. 24, No. 2, pp. 1-10, (1995).
Bernstein et al., "Concurrency Control and Recovery in Database Systems," (1987).
Bernstein et al., "Optimizing Optimistic Concurrency Control for Tree-Structured, Log-Structured Databases," in Proceedings of the 2015 ACM SIGMOD International Conference on Management of Data. ACM, pp. 1295-1309 (2015).
Binnig et al., "Distributed Snapshot Isolation: Global Transactions Pay Globally, Local Transactions Pay Locally," The International Journal on Very Large Data Bases, vol. 23, No. 6, pp. 987-1011 (2014).
Cha et al., "An Extensible Architecture for Main-Memory Real-Time Storage Systems", RTCSA : 67-73 (1996).
Cha et al., "An Object-Oriented Model for FMS Control", J. Intelligent Manufacturing 7(5): 387-391 (1996).
Cha et al., "Cache-Conscious Concurrency Control of Main-Memory Indexes on Shared-Memory Multiprocessor Systems", VLDB: 181-190 (2001).
Cha et al., "Efficient Web-Based Access to Multiple Geographic Databases Through Automatically Generated Wrappers", WISE : 34-41 (2000).
Cha et al., "Interval Disaggregate: A New Operator for Business Planning", PVLDB 7(13): 1381-1392 (2014).
Cha et al., "Kaleidoscope: A Cooperative Menu-Guided Query Interface", SIGMOD Conference : 387 (1990).
Cha et al., "Kaleidoscope Data Model for an English-like Query Language", VLDB : 351-361 (1991).
Cha et al., "MEADOW: A Middleware for Efficient Access to Multiple Geographic Databases Through OpenGIS Wrappers", Softw., Pract. Exper. 32(4): 377-402 (2002).
Cha et al., "Object-Oriented Design of Main-Memory DBMS for Real-Time Applications", RTCSA : 109-115 (1995).
Cha et al., "Paradigm Shift to New DBMS Architectures: Research Issues and Market Needs", ICDE: 1140 (2005).
Cha et al., "P*TIME: Highly Scalable OLTP DBMS for Managing Update-Intensive Stream Workload", VLDB: 1033-1044 (2004).
Cha et al., "Xmas: An Extensible Main-Memory Storage System", CIKM : 356-362 (1997).
Chang et al., "Bigtable: A Distributed Storage System for Structured Data," ACM Transactions on Computer Systems (TOCS), vol. 26, No. 2, p. 4, (2008).
Chaudhuri et al., "An Overview of Data Warehousing and OLAP Technology," ACM Sigmod Record, vol. 26, No. 1, pp. 65-74 (1997).
Cooper et al., "Pnuts: Yahoo!' s Hosted Data Serving Platform," Proceedings of the VLDB Endowment, vol. 1, No. 2, pp. 1277-1288 (2008).
DeCandia et al., "Dynamo: Amazon's Highly Available Key-Value Store," ACM SIGOPS Operating Systems Review, vol. 41, No. 6, pp. 205-220 (2007).
DeWitt et al., "Parallel Database Systems: the Future of High Performance Database Systems," Communications of the ACM, vol. 35, No. 6, pp. 85-98 (1992).
Diaconu et al., "Hekaton: SQL Server's Memory-Optimized OLTP Engine," in Proceedings of the 2013 ACM SIGMOD International Conference on Management of Data. ACM, pp. 1243-1254 (2013).
Du et al., "Clock-Si: Snapshot Isolation for Partitioned Data Stores Using Loosely Synchronized Clocks," in Reliable Distributed Systems (SRDS), 2013 IEEE 32nd International Symposium on. IEEE, pp. 173-184 (2013).
Farber et al., SAP HANA Database: Data Management for Modern Business Applications. SIGMOD Record 40(4): 45-51 (2011).
Farber et al., "The SAP HANA Database—An Architecture Overview." IEEE Data Eng. Bull., vol. 35, No. 1, pp. 28-33 (2012).
Fekete et al., "Making Snapshot Isolation Serializable," ACM Transactions on Database Systems (TODS), vol. 30, No. 2, pp. 492-528 (2005).

(56) References Cited

OTHER PUBLICATIONS

Hwang et al., "Performance Evaluation of Main-Memory R-tree Variants", SSTD: 10-27 (2003).
Kallman et al., "Hstore: A High-Performance, Distributed Main Memory Transaction Processing System," Proceedings of the VLDB Endowment, vol. 1, No. 2, pp. 1496-1499 (2008).
Kemper et al., "Hyper: A Hybrid OLTP & OLAP Main Memory Database System Based on Virtual Memory Snapshots," in Data Engineering (ICDE), 2011 IEEE 27th International Conference on. IEEE, pp. 195-206 (2011).
Kim et al., "Optimizing Multidimensional Index Trees for Main Memory Access", SIGMOD Conference: 139-150 (2001).
Kung et al., "On Optimistic Methods for Concurrency Control," ACM Transactions on Database Systems (TODS), vol. 6, No. 2, pp. 213-226 (1981).
Lahiri et al., "Cache Fusion: Extending Shared-Disk Clusters with Shared Caches," in VLDB, vol. 1, pp. 683-686 (2001).
Lahiri et al., "Oracle Timesten: An In-Memory Database for Enterprise Applications." IEEE Data Eng. Bull., vol. 36, No. 2, pp. 6-13 (2013).
Larson et al., "High-Performance Concurrency Control Mechanisms for Main-Memory Databases," Proceedings of the VLDB Endowment, vol. 5, No. 4, pp. 298-309, (2011).
Lee et al., "A Performance Anomaly Detection and Analysis Framework for DBMS Development", IEEE Trans. Knowl. Data Eng. 24(8): 1345-1360 (2012).
Lee et al., "Differential Logging: A Commutative and Associative Logging Scheme for Highly Parallel Main Memory Databases", ICDE 173-182 (2001).
Lee et al., "High-Performance Transaction Processing in SAP HANA." IEEE Data Eng. Bull., vol. 36, No. 2, pp. 28-33 (2013).
Lee et al., "SAP HANA Distributed In-Memory Database System: Transaction, Session, and Metadata Management," in Data Engineering (ICDE), 2013 IEEE 29th International Conference on. IEEE, pp. 1165-1173 (2013).
Neumann et al., "Fast Serializable Multi-Version Concurrency Control for Main-Memory Database Systems," in Proceedings of the 2015 ACM SIGMOD International Conference on Management of Data. ACM, pp. 677-689 (2015).
Pandis et al., "Dataoriented Transaction Execution," Proceedings of the VLDB Endowment, vol. 3, No. 1-2, pp. 928-939 (2010).
Park et al., Xmas: An Extensible Main-Memory Storage System for High-Performance Applications. SIGMOD Conference : 578-580 (1998).
Plattner, H., "A Common Database Approach for OLTP and OLAP Using an In-Memory Column Database", in Proceedings of the 2009 ACM SIGMOD International Conference on Management of Data, pp. 1-2. ACM (2009).
Qiao et al., "On Brewing Fresh Espresso: Linkedin's Distributed Data Serving Platform," in Proceedings of the 2013 ACM SIGMOD International Conference on Management of Data. ACM, pp. 1135-1146 (2013).

Roy et al., "The Homeostasis Protocol: Avoiding Transaction Coordination Through Program Analysis," in Proceedings of the 2015 ACM SIGMOD International Conference on Management of Data. ACM, pp. 1311-1326 (2015).
Sikka et al. "Efficient Transaction Processing in SAP HANA Database: the End of a Column Store Myth", in Proceedings of the 2012 ACM SIGMOD International Conference on Management of Data, pp. 731-742. ACM (2012).
Tu et al., "Speedy Transactions in Multicore In-Memory Databases," in Proceedings of the Twenty-Fourth ACM Symposium on Operating Systems Principles. ACM, pp. 18-32 (2013).
Vogels, W., "Eventually Consistent," Communications of the ACM, vol. 52, No. 1, pp. 40-44 (2009).
Weikum et al., "Transactional Information Systems: Theory, Algorithms, and the Practice of Concurrency Control and Recovery," (2001).
Yoo et al., "A Middleware Implementation of Active Rules for ODBMS", DASFAA : 347-354 (1999).
Yoo et al., "Integrity Maintenance in a Heterogeneous Engineering Database Environment", Data Knowl. Eng. 21(3): 347-363 (1997).
Zamanian et al., "Locality-Aware Partitioning in Parallel Database Systems," in Proceedings of the 2015 ACM SIGMOD International Conference on Management of Data. ACM, pp. 17-30 (2015).
Extended European Search Report, dated Apr. 4, 2017, EPC Appl. No. 16002568.0, 17 pages.
Extended European Search Report, dated Apr. 5, 2017, EPC App. No. 16002546.6 (10 pages).
"HINT Details," retrieved from http://helplegacy.sap.com/saphelp_hanaplatform/helpdata/en/4b/a9edce1f2347a0b9fcda99879c17a1/content.htm, on or before May 2017, 11 pages.
"SAP HANA SQL and System Views Reference," retrieved from https://help.sap.com/viewer/4fe29514fd584807ac9f2a04f6754767/2.0.00/en-US/4ba9edce1f2347a0b9fcda99879c17a1.html, on or before May 2017, 22 pages.
Wiesmann, et al., "Understanding replication in databases and distributed systems," Distributed Computing Systems, pp. 464-474, 2000.
Extended European Search Report, dated Mar. 9, 2017, EPC Appl. No. 16002574.8, 12 pages.
Kemme, et al., "Database Replication: A Tutorial," *Replication, LNCS*, 5959: 219-252, 2010.
Daudjee, K., et al. "Lazy Database Replication with Ordering Guarantees" *Proceedings of the 20th International Conference on Data Engineering* (2004), 12 pages.
Extended European Search Report, dated Sep. 6, 2018, European Application No. 18175767.5, 11 pages.
Gupta et al., "EasyCommit: A Non-blocking Two-phase Commit Protocol," *Published in Proceedings of the 21$^{st}$ International Conference on Extending Database Technology (EDBT)*, Mar. 26-29, 2018, pp. 157-168.
Le, "Main Difference between 2PC and 3PC Protocols," http://www.linkedin.com/pulse/main-difference-between-2pc-3pc-protocols-thiensi-le, downloaded Oct. 8, 2018, 4 pages.
Examination Report received in European Patent Application No. 16002546.6, dated Nov. 29, 2018, 7 pages.

* cited by examiner

SOFTWARE 2980 IMPLEMENTING DESCRIBED TECHNOLOGIES

DECENTRALIZED TRANSACTION COMMIT PROTOCOL

FIELD

The present disclosure generally relates to processing database transactions in a distributed environment. Particular implementations relate to processing write operations distributed among a plurality of nodes in a distributed database system.

BACKGROUND

Database performance can be enhanced by distributing information, such as source tables, among multiple hosts. For example, a number of hosts may store different tables in the database system, or tables can be partitioned among multiple hosts. The ability to distribute a database system among multiple hosts can provide opportunities to increase system performance, such as by distributing workloads among CPUs located at the different hosts, rather than relying on the capabilities of a single host. However, distributed systems can present challenges in ensuring that database operations are carried out in a way that provides queries with accurate data, and that write operations are processed accurately, but without requiring so much coordination between hosts that the performance of the distributed system is significantly adversely affected.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for processing write transactions involving database records stored at multiple hosts in a database environment that includes at least first, second, and third database system nodes. The first database system node receive a request to coordinate the commit of a first database transaction. The first database system node sends a request to the second database system node to commit the first database transaction. A synchronized transaction token is determined by the first database system node, which also assigns a first transaction token to the first database transaction. The first database system node sends the first transaction token to the second database system node and commits the first database transaction. The commit of the first database transaction is acknowledged to a database client by the first database system node.

The first database system node receives a request to precommit a second database transaction from the third database system node. A precommit log entry is written by the first database system node that includes an indication that the third database system node was responsible for the commit of the second database transaction.

In another aspect, in the database system, the first database system node receives a request, such as from a database client, to commit a first database transaction. The first database system node sends a request to the second database system node to precommit the first database transaction. A synchronized transaction token is determined by the first database system node, which also assigns, based at least in part on the synchronized transaction token, a first transaction token to the first database transaction. The first database system node sends the first transaction token to the second database system node and commits the first database transaction. The commit of the first database transaction is acknowledged to a database client by the first database system node.

The first database system node receives a request to precommit a second database transaction from the third database system node. The first database system nodes adds, to a precommit log, a precommit log entry, such as an entry that includes an indication that the third database system node coordinates the commit of the second database transaction The first database system node receives a second transaction token from the third database system node that is associated with the second database transaction. The first database system node determines a third transaction token and assigns it to the second database transaction. The first database system node sends an acknowledgment to the third database system node that the third transaction token was assigned to the second database transaction. The first database system node receives a request from the third database system node to commit the second database transaction and sets the second database transaction as committed.

In another aspect, in the database system, the first database system node receives from the second database system node a request to precommit a first database transaction. The first database system node stores an indication that the second database system node coordinates the commit of the first database transaction, such as by adding to a precommit log a precommit log entry for the first database transaction that includes the indication that the second database system node coordinated the commit of the first database transaction. The first database system node receives from the third database system node a request to precommit a second database transaction. The first database system node stores an indication that the third database system node coordinates the commit of the second database transaction, such as by writing a precommit log entry for the second database transaction that includes the indication that the third database system node coordinated the commit of the second database transaction.

In a further aspect, in the database system, the first database system node coordinates the commit of a first database transaction according to a transaction commit protocol. The first database system node acts as a coordinator node and the other database system nodes involved in the commit of the transaction act as worker nodes during the commit process for the first database transaction. The first database system node participates in a commit process for a second database transaction according to the transaction commit protocol. The first database system node acts as a worker node and one of the other database system nodes involved in the commit of the transaction acts as a coordinator node during the commit process for the second database transaction.

As described herein, a variety of other features and advantages can be incorporated into the technologies as desired.

DETAILED DESCRIPTION

EXAMPLE 1

Overview

Figure 1:
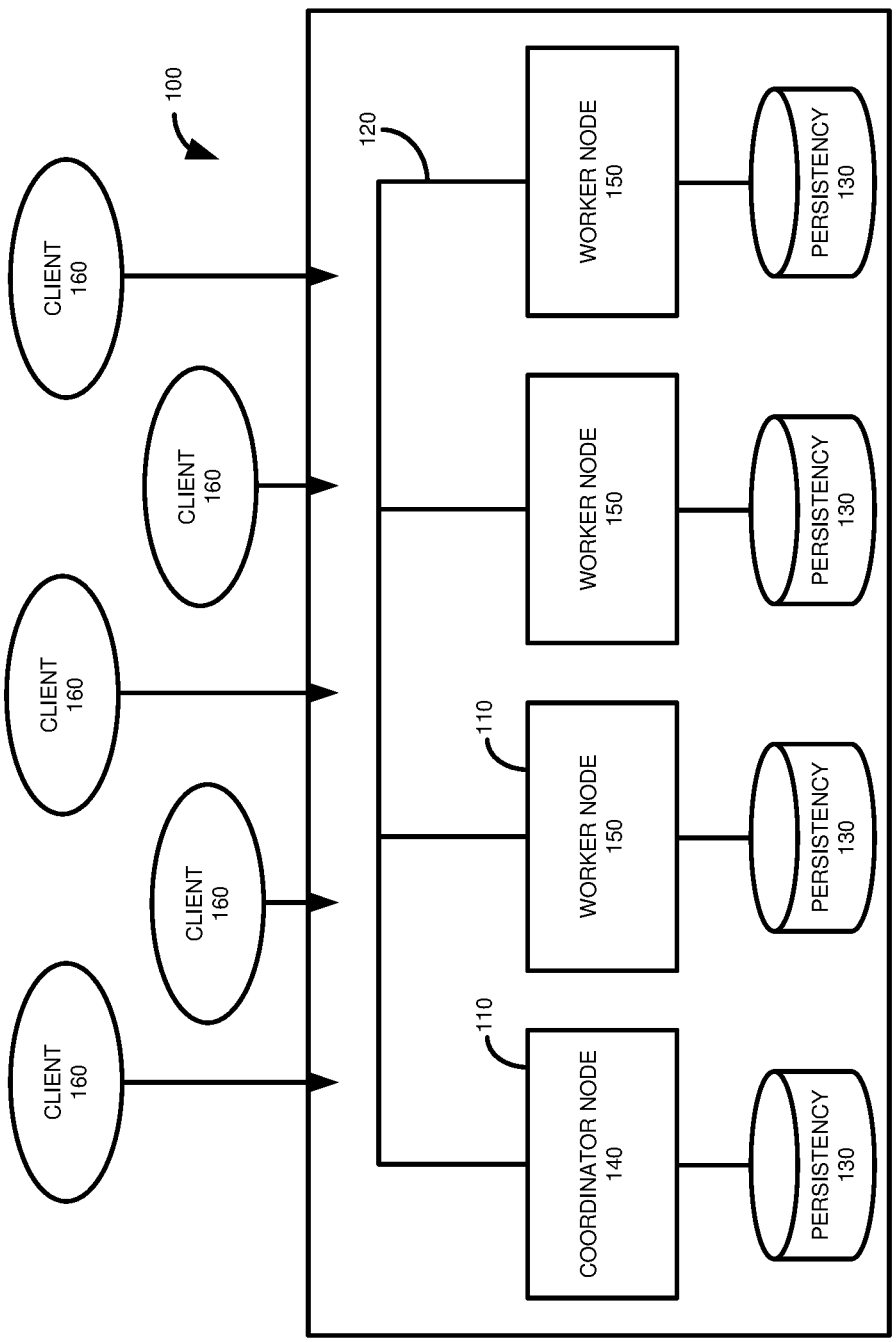
FIG. 1 is a diagram depicting a database environment having a coordinator node and a plurality of worker nodes in which at least certain implementations of a disclosed distributed transaction protocol may be used.

Database systems are increasingly designed and optimized for memory-centric, massively-parallel data processing, not only in single database systems, but also in multi-host distributed database systems. Partitioning and distributing a database into multiple hosts is a desirable feature, especially for high-performance in-memory database systems, because it can leverage larger in-memory database spaces and a higher number of CPU cores beyond the limitations of a single physical machine (also referred to as a host, or node). For example, by partitioning and distributing large and fast growing fact tables over multiple hosts while replicating infrequently-updated dimension tables in a data warehouse system, or by partitioning a multi-tenant database into multiple hosts by tenants, it is typically possible to handle larger databases and higher workloads.

However, it would be beneficial to have a distributed transaction protocol which can provide scalable transaction processing performance without sacrificing transactional consistency. One way of attempting to ensure full transactional consistency, as in a single node scenario, is to have a centralized transaction coordinator and synchronize all executed transactions with the coordinator. Unfortunately, such a protocol typically does not scale well in terms of performance due to frequent and expensive inter-node network communications between the coordinator and the worker nodes. Another way to attempt to ensure transactional consistency is to achieve high multi-node scalability by specifying the provided transactional consistency level for target application domains, mostly by weakening the transactional consistency to some extent. This approach may not be acceptable for database systems where inconsistent transactions cannot be tolerated.

Particular embodiments of the present disclosure provide a distributed database transaction protocol that can show scalable transaction processing performance in a distributed database system without compromising the transaction consistency typically used in snapshot isolation. Other embodiments of the present disclosure provide a distributed database transaction protocol that can show scalable transaction processing performance, while reducing the chances of compromising transaction consistency, including reducing the number of database records that could be potentially inconsistent. As will be explained further, at least in particular implementations of the protocol, this lower consistency protocol can be specified, such as being determined by a database system, a database client, or a user, such as an end user or a database administrator.

In at least certain implementations of embodiments of distributed database transaction protocols of the present disclosure, a "snapshot" refers to view of the database system, or at least a portion thereof, as it existed at the time of the snapshot. For example, a query started under a particular snapshot would have available to it records as they existed at the time of the snapshot. The query would not see, for example, changes that were made to the records after the snapshot was acquired. In addition, in at least certain implementations, records are not removed if there is an open snapshot that will access them. If there is no open snapshot that can access a particular record version, the record version may be removed in a process sometimes referred to as garbage collection.

Transaction snapshot isolation provides that all read operations in a transaction will see a consistent version, or snapshot, of the relevant database records. In terms of its performance, at least certain implementations of embodiments of a disclosed distributed transaction protocol show scalable transaction processing performance in distributed database systems by reducing inter-node transaction coordination.

The present disclosure can also provide a transaction consistency property, snapshot monotonicity, which can be used in systems along with ACID (atomicity, consistency, isolation, durability) properties. Snapshot monotonicity is related to snapshot isolation, and illustrates why the coordination provided in at least certain implementations of embodiments of a disclosed transaction protocol can be beneficial. Implementations of a transaction commit protocol are described in terms of sub operations in order to show how sub operations relate and interact in order to meet desired transaction consistency goals. However, at least some embodiments of the present disclosure, or implementations thereof, need not provide snapshot monotonicity, or one or more of the other ACID properties.

Certain embodiments, or implementations thereof, of the present disclosure also can provide practical optimizations that may be exploited by the disclosed distributed database transaction protocol. These optimizations include one or more of: (a) reducing transaction commit latency by interleaving inter-node coordination network operations with log persistency I/O operations, (b) grouping and coalescing inter-node network I/O requests for better throughput, (c) performing lock-free transaction commit operations by exploiting the in-doubt transaction state of changed records, (d) reducing the latency of visibility decision operations by early pruning of invisible record versions using a precommit timestamp, and (e) reducing the latency of transaction commit operations by acknowledging earlier during multi-node transaction commit operations.

EXAMPLE 2

Distributed Database Environment

This Example 2 describes an example distributed database system that may be used with at least certain embodiments of the disclosed distributed database transaction protocol, and characteristics and consistency properties of example workloads. This Example also describes a particular implementation of snapshot isolation for use in an implementation of the disclosed distributed database transaction protocol.

FIG. 1 illustrates a database environment 100 having a plurality of database nodes 110 connected through a network 120. In a particular example, the network 120 is a high-speed/low-latency network. A host refers to a computing system having a processor and memory. A host may also be referred to as a node. Unless the context clearly indicates otherwise, a node can refer to the host in a single host system (such a single worker node), or one of a plurality of hosts in a system (such as one of a plurality of worker nodes).

As shown, each node 110 has its own persistency store 130. In some examples, one or more nodes 110 may have shared storage. In a particular example, such as for disaster recovery purposes, a remote instance of the system 100 can be configured to act as a hot standby cluster by continuously replaying logs shipped from the primary cluster 100.

The database nodes 110 are asymmetric, in some respects, since database node 140 has the role of a coordinator node and database nodes 150 function as worker nodes. A coordinator node refers to a node (or host) that manages information regarding the coordinator node and one or more worker nodes. A worker node refers to a node that is installed on a different host than the coordinator node and has at least some of its activities or operations controlled or regulated by a coordinator node. In some examples described herein, a given node can act as a coordinator node at some times (e.g., for some transactions) but act as a worker node at other times (e.g., for other transactions).

In various aspects of the present disclosure, a coordinator node 140 may help manage snapshot isolation. For example, the coordinator node 140 may maintain one or more global transaction tokens and send communications to, and receive communications from, one or more of the worker nodes 150 to determine a synchronized transaction token that may then be sent to, and used by, the one or more worker nodes 150.

As used in the present disclosure, a "token" may refer to a value, a set of values, an object representing a value, or an object representing a set of values. A transaction token, as used in this disclosure, is a token used to manage transactions in a distributed database system. In one implementation, a transaction token may refer to a particular value, such as a snapshotID or a commitID value. In particular examples, the transaction token, such as the snapshotID or the commitID, is, or includes, a timestamp. The timestamp is used to indicate a particular state of the database system. In some examples, the timestamp is a time. In other examples, the timestamp is a counter, which can be used to represent an order of operations in the database system or otherwise indicate different states of the database system, such as states at different time points. The timestamp, in specific examples, is an integer, such as an 8 byte integer. The timestamp may also refer to the state of the database system in a different manner.

In another implementation, the transaction token may refer to a collection of values, such as values selected from a snapshotID, a commitID, the snapshotID of a transaction having a minimum or maximum value currently visible to the database system or a particular node of the database system, or a value representing the state of a particular node in the database system.

The coordinator node 140 and the worker nodes 150 are in communication, such as through the network 120, and may send and receive communications to and from one another. As used herein, the term "send" to a destination entity refers to any way of transmitting or otherwise conveying data within a computer system or between two computer systems, whether the data is directly conveyed or conveyed through one or more intermediate entities. Similarly, the term "receive," such as to receive from a source entity, refers to the receipt of data within a computer system or between two computer systems, whether the data is received directly from the computer system of original transmission or received through one or more intermediate entities. When used in conjunction with "token," sending or receiving typically refers to sending or receiving the value or values associated with the token.

Although the coordinator node 140 may also store tables and partitions, in particular aspects of the present disclosure, a specific role of the coordinator node 140 is to act as a metadata master and a transaction coordinator for distributed database transactions. In one example, when a client 160 seeks to access metadata at a worker node 150, the worker node 150 retrieves the corresponding metadata from the coordinator node 140 and caches it locally. The cached metadata for a specific database object will be valid until the next DDL (data definition language) transaction is committed for that particular database object. Furthermore, being the transaction coordinator, the coordinator node 140 may decide about the commit of multi-node write transactions and mediate between the worker nodes 150 when they need to exchange transactional information with each other.

However, in at least some embodiments of the present disclosure, the coordinator node 140 need not be involved in every multi-node transaction. For example, the coordinator node may mediate certain multi-node read operations, but not others. In other examples, the coordinator node mediates at least certain multi-node read operations, but does not mediate multi-node write operations, or at least not all multi-node write operations. In yet further examples, the coordinator node mediates some, or all, multi-node read and write operations. In particular implementations, the coordinator node 140, or at least a coordinator node 140 having a fixed identity, is omitted. For example, the coordinator node 140 may be omitted and, if desired, one or more of the worker nodes 150 may periodically and temporarily assume one or more functions of a coordinator node 140, such as mediating the commit of a multi-node write transaction between the nodes 110 involved in the transaction.

While, when the system 100 includes a coordinator node 140, the nodes 110 are asymmetric, in some respects, the database nodes 110 are symmetric, in other respects. For example, each node 110 typically has its own persistency store 130 for log and checkpoint files. From the perspective of a client 160, an application may connect to any of the database nodes 110 and execute arbitrary read and write transactions. Tables can be partitioned and distributed across multiple database nodes 110. If a table has partitions defined via hash or range predicates, then those partitions can be distributed and stored in different nodes 110.

Although a client 160 may connect to any of the database nodes 110, it could be sub-optimal to connect to one of them randomly, or in a round-robin fashion, because the query's required tables or partitions may reside in a node 110 different from its connected execution node 110. If a query's target database objects are located in a different node 110, then the query execution may need to involve node-to-node communication through the network 120, which can be expensive in terms of the delay and resources involved. To minimize this mismatch between the execution location and the data location, a number of strategies can be used in the system 100.

Client-side routing is one strategy that can be used to reduce delay and use of other resources. When a given query is compiled (e.g., prepareStatement( ) in the Java Database Connectivity (JDBC) API), its desired locations are cached at the database client library. The next execution of the compiled query (e.g., executePrepared( ) in JDBC) is then, transparently for the application, routed, such as being directly routed, to one of the desired locations. If a query's target table is partitioned and distributed, a single desired location of the query typically cannot be decided at query compilation time, but it can be decided at query execution time by evaluating the given arguments corresponding to the table's partitioning specification.

While client-side statement routing is an approach that changes the execution location to resolve the execution/data location mismatch, it is also possible to change the data location by moving tables or partitions into a different location. The relocation may be triggered by the database administrator or automatically by an advisor tool, such as based on monitoring statistics of a given workload. Alternatively, tables can be co-partitioned in view of particular workload or database schemas in order to avoid expensive multi-node joins.

It is also possible to resolve the execution/data location mismatch by selectively replicating or caching tables/partitions. For example, if a join between two tables reflects a typical query pattern, replicating or caching the less-update-intensive table, or the smaller table, or both at a node, may improve system performance.

In at least certain implementations, some embodiments of a disclosed distributed database transaction protocol can provide strong transaction consistency, which can be particularly useful for applications where weakened consistency would not be desirable. In at least some implementations, a disclosed distributed database transaction protocol can comply with ACID properties and provide the same, or at least substantially the same, transactional consistency independently of whether the underlying database is distributed or not. In other implementations, some embodiments of a disclosed distributed database transaction protocol can provide weaker consistency, or can switch between strong consistency and a weaker consistency regime.

Regarding the property isolation of the four properties in ACID, at least some database environments of the present disclosure can provide one or both of two variants of snapshot isolation, statement-level snapshot isolation (SSI) and transaction-level snapshot isolation (TSI). Snapshot isolation provides non-blocking read access against any concurrent write transactions.

In many examples described herein, a transaction consists of one or more statements (such as data manipulation language, or DML, statements), which can be, for example, either of read and write (e.g., INSERT, UPDATE, or DELETE). In SSI, each statement reads data from a snapshot of the committed data at the time the statement started. In TSI, each transaction reads data from a snapshot of the committed data at the time the transaction started, called the snapshot timestamp. In at least some database environments, SSI and TSI can co-exist, such as being configurable on a per user connection. The definitions of SSI and TSI imply that data once read, in a statement or a transaction, respectively, should be visible again within the same statement or transaction even though the data has been changed by a different concurrent transaction. For example, when executing a join query with some predicate, the same record can be visited multiple times within a single statement scope since the intermediate result of a query operator can be passed to the next query operator by a set of references to the filtered records (e.g., row IDs) without necessarily fully materializing them.

Although a Write Skew anomaly can happen under snapshot isolation, where two transactions concurrently read overlapping data, make disjoint updates, and commit, it typically can be avoided in practice by using SELECT FOR UPDATE properly in applications. Contrasted to other concurrency control options like optimistic concurrency control or two-phase locking, a benefit of snapshot isolation in example implementations is that read queries can proceed without any query abort or any lock waiting situation, even though they read a database object which is being changed by other transactions.

In some implementations, the disclosed distributed transaction protocol can have additional characteristics. For example, the protocol can provide improved performance for both read-oriented workloads and read/write-mixed workloads. Although optimistic concurrency control can perform acceptably for some read-oriented workloads, it can lead to a high abort ratio for applications which generate concurrent read and write transactions.

Typically, in SSI and TSI, a snapshot timestamp is assigned to a new snapshot when the new snapshot starts. Under SSI, each statement has its own snapshot, while each transaction has its own snapshot under TSI. The cost of the snapshot timestamp assignment operation typically becomes more significant in SSI than in TSI, because the snapshot timestamp is assigned for each transaction under TSI, but for each statement under SSI. SSI thus offers more room for optimizations within the database kernel, because it can be known which tables or partitions need to be accessed in that particular snapshot scope by looking up the statement's query plan before actually executing it.

Another characteristic is that the cost of transaction control operations, such as snapshot timestamp assignment or transaction commit, may become more important for local statements/transactions than multi-node global statements/transactions due to their relative impact on overall performance. When a query touches tables distributed among multiple nodes, the query's execution time involves the network cost of exchanging the intermediate execution result of a node, thus the increase in the transaction control operations could be relatively trivial. However, if a query does not need to involve any network interaction for its own query processing, then a network roundtrip added only for the transaction control operation, for example, can affect the overall performance significantly. Typically, a large fraction of simple, but highly concurrent, queries (as typically observed in OLTP applications), run as single-node local queries. For example, in a multi-tenant database, tables can be partitioned reasonably well by tenant ID, leading naturally to node-local query execution.

In some aspects of the present disclosure, a database environment includes a table having database records. A new version of a record is created on each update operation instead of overriding the existing record version. Even for record deletion operations, a new version header is typically created with an empty payload instead of deleting the existing record right away. When creating a new record version, a versioning token, such as a version timestamp, representing the version creation time (the commit time (e.g., commit ID) of the transaction creating the version), is stored, such as in a version header. The versioning token may be, or may be used as, all or part of a transaction token.

In a particular implementation, the version timestamp is derived from a global transaction token, such as a transaction commit timestamp, maintained by a central transaction manager (which may be, for example, the coordinator node 140 of FIG. 1) which will be incremented on each commit of a write transaction. According to a particular example, the versions of a single record are chained to each other in a sorted order, such as by their version timestamps. Older versions in the version chain can be garbage-collected when specified criteria are met, such as when it is determined that there is no potential reader in the system for that record version. In a particular implementation, there being no potential reader in the system can be detected by maintaining a minimum value of snapshot timestamps of active snapshots in the system and comparing it with the version timestamps of the garbage candidates.

When a query tries to read a record version, the visibility of the record is checked by comparing the query's snapshot timestamp with the version timestamp of the candidate record version. If the version timestamp of the record is higher than the snapshot timestamp of the query, the particular record version should typically not be visible to the query because the created version of the record was committed after the query started. Otherwise, if the version timestamp of the record is not higher than the snapshot timestamp of the query, the record version should typically be visible to the query.

One potential issue in snapshot isolation implementation is updating version timestamps of multiple different rows in a transaction with the transaction's assigned commit timestamp in an atomic way. At version creation time, the embracing version timestamp can typically be correctly and finally set only after the embracing write transaction receives its commit timestamp within the commit procedure. However, if the versions of the write transactions are updated with their commit timestamp one by one, then some of those versions could be visible to another snapshot while the others might still be invisible. Such an outcome would not fully comply with the atomicity rule in the ACID properties.

To avoid this potential anomaly concerning visibility atomicity, a transaction context may be maintained for each write transaction. When a write transaction starts its first write operation, a transaction context entry is created. In a particular example, all created row versions store a pointer to the transaction context entry in their version header field. At commit time, the transaction context entry is updated with the write transaction's commit timestamp, and thus is available to the other versions through the pointer to the transaction context entry. After the transaction commit processing is completed, the commit timestamp written in the transaction context entry is asynchronously propagated to the version timestamp fields. The transaction context entry may then be garbage-collected. With this atomic indirect commit timestamp assignment to the created versions, visibility atomicity is still facilitated under such a snapshot isolation implementation.

Figure 2:
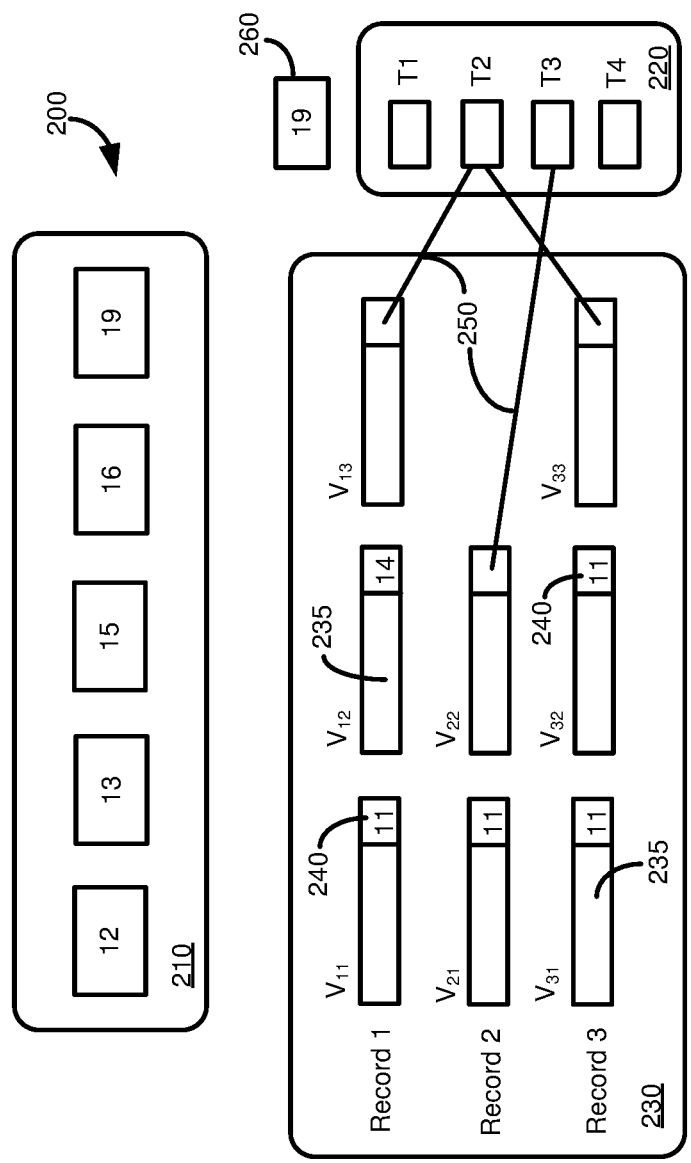
FIG. 2 is a diagram depicting an architecture of a transaction context providing version space management that may be used in at least certain implementations of a disclosed distributed transaction protocol.

FIG. 2 depicts an architecture 200 illustrating a transaction context providing version space management. The architecture 200 includes a snapshot timestamp store 210 that stores five active timestamps 12, 13, 15, 16, and 19. Architecture 200 further includes a transaction context store 220 for four active write transactions, T1, T2, T3, T4, each with their own transaction context entry. A record chain store 230 holds three database records, Record 1, Record 2, and Record 3, each with its own version chain of record versions 235. Each record version 235 includes a version timestamp 240.

As shown, from the viewpoint of a snapshot whose snapshot timestamp is 12, $V_{11}$ and $V_{21}$ are visible (because their version timestamps are less than the snapshot timestamp) but the other record versions 235 are not. $V_{13}$, $V_{22}$, and $V_{33}$ do not have their version timestamps yet, because their write transactions are not yet committed. Under this transaction state, the record versions store a pointer 250 to the corresponding transaction context entries ($T_2$ and $T_3$). Once $T_2$, for example, commits, then the transaction commit timestamp (19, as shown) of the transaction manager 260 at that time is copied to the transaction context entry 220, thus providing visibility atomicity indirectly. Note that the data structures in FIG. 2 are provided to give a conceptual overview, but their actual implementation can be different. For example, depending on whether the corresponding table is a row store or a column store, both of which may be supported in a single database system, the storage layout of the record versions may be different.

Although read statements do not acquire locks in at least certain implementations of the present disclosure, a write transaction typically acquires an exclusive lock of its updated record to ensure a serializable schedule of concurrent write operations. If the latest version of the record is not visible to the snapshot after the exclusive record lock is acquired, then a transaction under TSI may throw an error to the end user. A statement under SSI, however, may be configured to restart the statement by substituting its statement timestamp with a newer value of the transaction commit timestamp. In at least certain examples, database objects are finally updated after lock acquisition and validation. In further examples, lock tables are partitioned according to the location of their corresponding tables, or partitioned together with a multi-node deadlock detection implementation, to detect when dependencies between write operations carried out at different nodes prevent transaction commitment.

EXAMPLE 3

Distributed Snapshot Isolation

This Example 3 describes situations that can arise in distributed transaction processing, and also describes aspects of the present disclosure that may be used in addressing such situations. Table 1 provides a set of symbols that may be used to describe a distributed database transaction protocol.

TABLE 1

| Notations | |
|---|---|
| Symbol | Description |
| CTS | Transaction commit timestamp of a transaction manager, incremented when a write transaction commits |
| GCT | CTS at the coordinator node |
| $LCT_i$ | CTS at a worker node i |
| $CID(T_i)$ | Commit ID of a write transaction $T_i$, assigned from GCT or LCT when $T_i$ commits |
| $pCID(T_i)$ | Precommit ID of a write transaction $T_i$, assigned from GCT or LCT when $T_i$ pre-commits |
| $Status(T_i)$ | Status of a write transaction $T_i$, either of {Unused, Active, Precommitted, Committed, Aborted} |
| $TID(T_i)$ | Transaction identifier of a transaction $T_i$ |
| $STS(Si)$ | Snapshot timestamp of a snapshot $S_i$, assigned from GCT or LCT when the snapshot (statement or transaction) starts |

In at least certain implementations, a disclosed distributed database transaction protocol can provide the same level of transactional consistency regardless of how many nodes the database is partitioned into. For example, a database environment may evolve from a single-node system to a multi-node distributed system, such as to handle higher workloads or larger database volumes. It may be undesirable for users to change their own application logic and adapt it for a potentially weaker consistency level provided by the database engine. This Example 3 describes two consistency properties of distributed database environments that can be addressed by at least certain distributed database transaction protocols of the present disclosure.

According to the principle of visibility atomicity, a transaction's changes should be visible to another concurrent snapshot in an atomic way: either completely visible or not. Achieving visibility atomicity under snapshot isolation in a distributed database environment can be difficult because the record versions created by a write transaction can be distributed across worker nodes. For example, for a multi-node write transaction, if each updated node is committed one by one, then the changes of a node can be visible earlier to another concurrent reader, but others may not be visible to the same reader.

Figure 3:
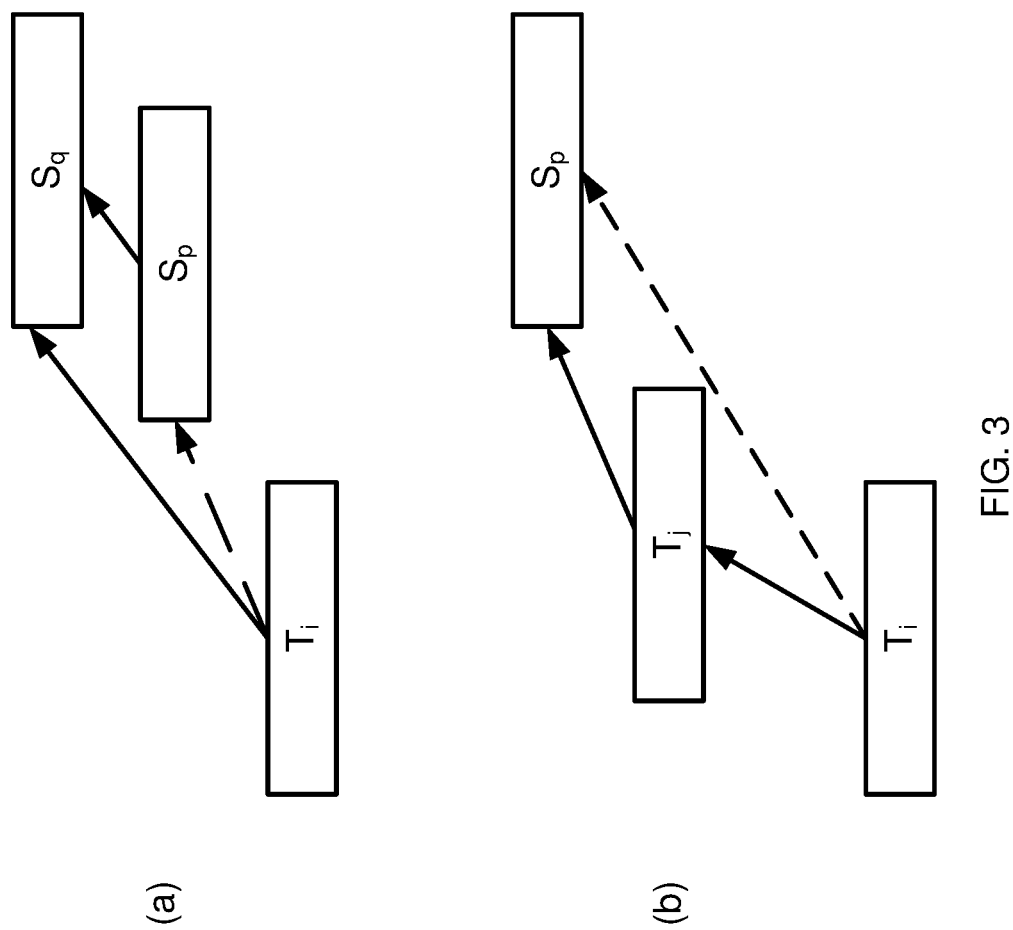
FIG. 3 is a diagram illustrating properties of snapshot monotonicity that may be provided by at least certain implementations of a disclosed distributed transaction protocol with reference to an arbitrary pair of snapshots and an arbitrary pair of write transactions.

According to the principle of snapshot monotonicity, a transaction protocol is said to ensure snapshot monotonicity if all of the following conditions (visually represented in FIG. 3) are met for an arbitrary pair of write transactions, $T_i$ and $T_j$, and an arbitrary pair of snapshots, $S_p$ and $S_q$:

If $T_i$'s changes were visible to $S_q$, and $S_q$ was started after $S_p$'s start, then $T_i$'s changes should be visible to $S_p$ as well (FIG. 3(a)).

If $T_j$'s changes were visible to $S_p$, and $T_j$ committed after $T_i$'s commit, then $T_i$'s changes should be visible to $S_p$ as well (FIG. 3(b)).

Snapshot monotonicity is not represented by traditional ACID property definitions. However, it is a feature that may be appreciated by users. For example, assume a SalesOrder processing component in a business application inserted a record into a database table Tab1 by using a transaction $T_1$, and then it notified the event to a SupplyAvailabilityCheck processing component via a messaging protocol inside an application server after $T_1$ is committed. The SupplyAvailabilityCheck processing component then inserts a new record into a table Tab2 by using another transaction $T_2$. Then, it will be expected that the inserted record by SalesOrder processing (into Tab1 by $T_1$) should be visible to an analytic query which joins the tables Tab1 and Tab2 if the inserted record by SupplyAvailabilityCheck processing (into Tab2 by $T_2$) was visible to the join query.

Although some previous approaches have sought to address the desired transaction consistency requirements, they typically suffer from disadvantages, as will be described. One approach is to use a central coordinator node for processing all types of transaction events to help ensure full coordination of transactions. Whenever a write transaction commits at the coordinator, or any of the worker nodes, it increments a global transaction commit timestamp maintained by the central transaction coordinator. Every snapshot starting at any worker node also acquires its snapshot timestamp by accessing the coordinator node. Thus, all multi-node and single-node transactions and snapshots are synchronized by the central coordinator node.

In this approach, even single-node local queries, which can be executed at a single worker node, require a network round trip to the coordinator node. In terms of performance, it is typically not desirable because the query's latency increases and the coordinator node may become a potential bottleneck with a large number of worker nodes.

As another potential solution, in a vectorized approach, a fully localized transaction model may be used where every worker node has its own local transaction manager and each local transaction manager maintains its own local commit timestamp (LCT). Whenever a write transaction commits, it increments its transaction manager's local commit timestamp. Starting a local snapshot at a worker node, a snapshot timestamp (STS) is acquired from the local transaction commit timestamp of the worker node. When a multi-node snapshot starts, it collects snapshot timestamps from the worker nodes that it can potentially access during its snapshot and carries the collected snapshot timestamp in a vector during its query execution.

This approach can impose a significant performance penalty on multi-node queries. First, the cost of a multi-node access query is high because snapshot timestamps from multiple worker nodes that the query can potentially access during its snapshot are collected. If the worker nodes to be accessed are not known a priori, this cost becomes even higher because the query may need to collect the snapshot timestamps from all available worker nodes.

Second, acquiring snapshot timestamps from query target nodes should be atomic against any concurrent write transactions, and thus even the read operation may lead to expensive synchronization across multiple nodes. An example of such a situation is illustrated by the scenario 400 shown in FIG. 4. In the scenario 400, a system includes a first node 410 having an execution timeline 415 and a second node 420 having an execution timeline 425. Node 410 has an initial local commit timestamp of 10, while node 420 has a local commit timestamp of 20.

A multi-node query, $S_1$, accesses tables at node 410 and node 420. At process block 430, when $S_1$ accesses node 410, the query is assigned a snapshot ID, such as a timestamp, from the LCT maintained by node 410. In this case, the STS assigned by 410 is 10.

A write transaction $T_1$ accesses tables maintained at node 410 and node 420. When the write transaction executes on node 410, at process block 435, $LCT_1$ increments to 11, which is also the value assigned to the commit ID (CID) for $T_1$ at node 410. When write transaction $T_1$ executes at node 420, at block 440, $LCT_2$ increments to 21, which is also the value assigned to the CID for $T_2$ at node 420. After execution at nodes 410, 420, $T_1$ has a vector that includes the CIDs obtained from each node: $\{11, 21\}$. Query $S_1$ then executes on node 420 at process block 445.

Note that $S_1$ executes before $T_1$ on node 410, but after $T_1$ on node 420. Thus, while $S_1$ has a vector of $\{10, 21\}$, $T_1$ has a vector of $\{11, 21\}$. If there is no synchronization during the step of collecting snapshot timestamps from nodes 410, 420, a part (changes at node 420) of a write transaction $T_1$ is visible to a multi-node query $S_1$ ($STS(S_1)$, as 21 is higher than or equal to $CID(T_1)$, 21 at node 420). However, the changes at node 410 are not visible to $S_1$, as the snapshot timestamp $S_1$ at node 410, 10, is less than the commit ID of $T_1$, 11 at node 410. As the write operations within a transaction should be either all visible or all not visibility, this scenario violates visibility atomicity.

The incremental snapshot timestamp scheme is an optimized variant of the vectorized approach. The incremental snapshot timestamp scheme does not acquire the snapshot timestamps when a snapshot starts, but rather acquires them on demand incrementally. In this approach, the visibility atomicity issue described in conjunction with FIG. 4 can be more problematic because of a wider time gap between the snapshot timestamp acquisition at node 410 and snapshot timestamp acquisition at node 420 for a query which accesses both of them.

To attempt to resolve this visibility atomicity issue, the incremental approach maintains a mapping between consistent snapshot timestamp values of different worker nodes by requiring that every multi-node write transaction update the mapping information. The representation of the mapping information is simplified by using the global commit timestamp, which is incremented on every multi-node write transaction's commit so that the mapping information contains only a pair of a global snapshot timestamp value and a local snapshot timestamp value. Although this approach can help address the visibility atomicity issue discussed in conjunction with FIG. 4, it can have undesirable features.

For example, the existence of multi-node write transactions adds high cost to a system which has many concurrent, local read queries, because the multi-node write transaction accesses all running local snapshots to update its mapping information between the global snapshot timestamp and its local snapshot timestamp. In addition, snapshot monotonicity is not fully ensured because local write transactions are not synchronized with each other at all.

Figure 4:
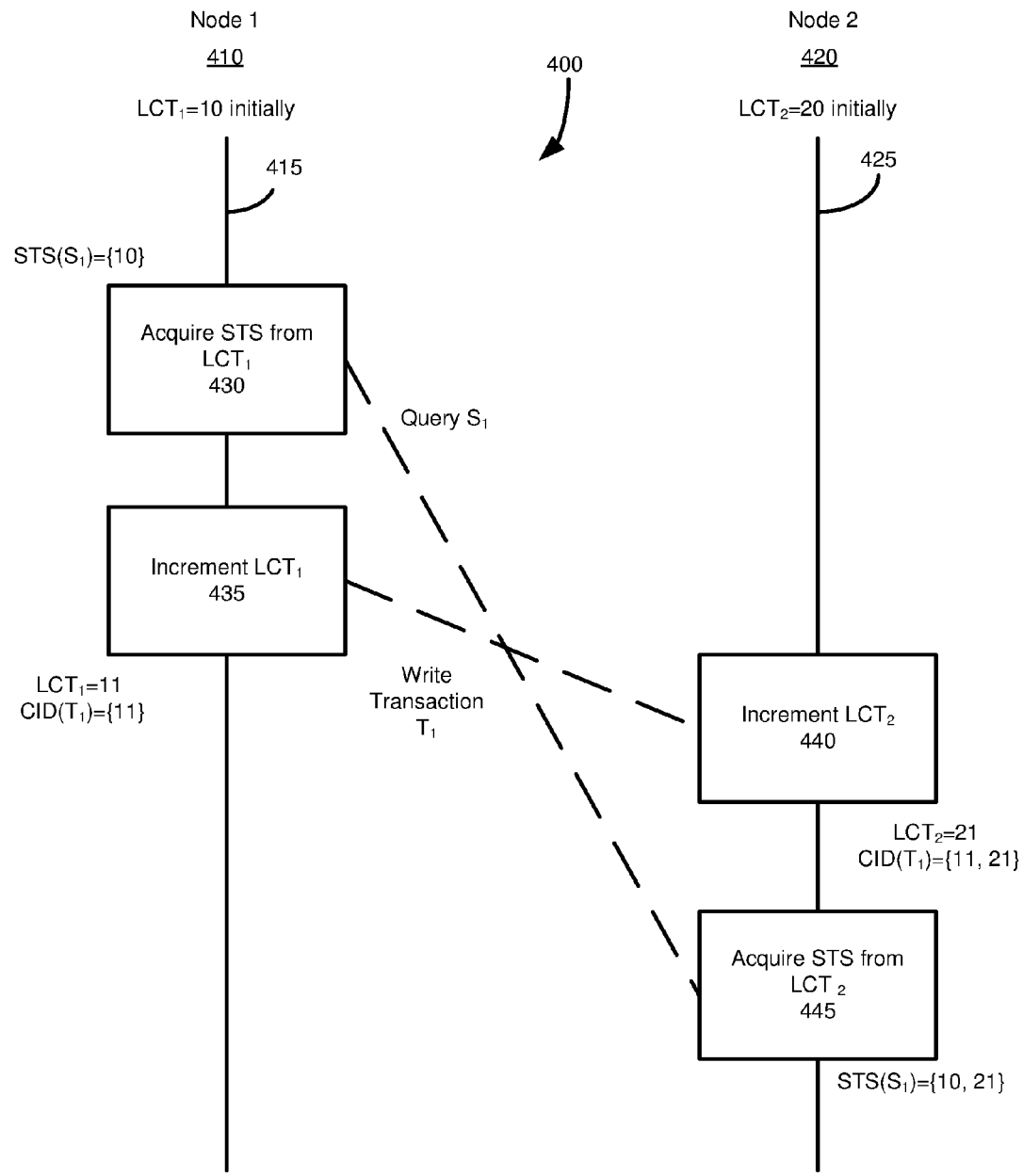
FIG. 4 is a diagram illustrating operations occurring at first and second nodes in a distributed database environment using vectorized transaction coordination.
Figure 5:
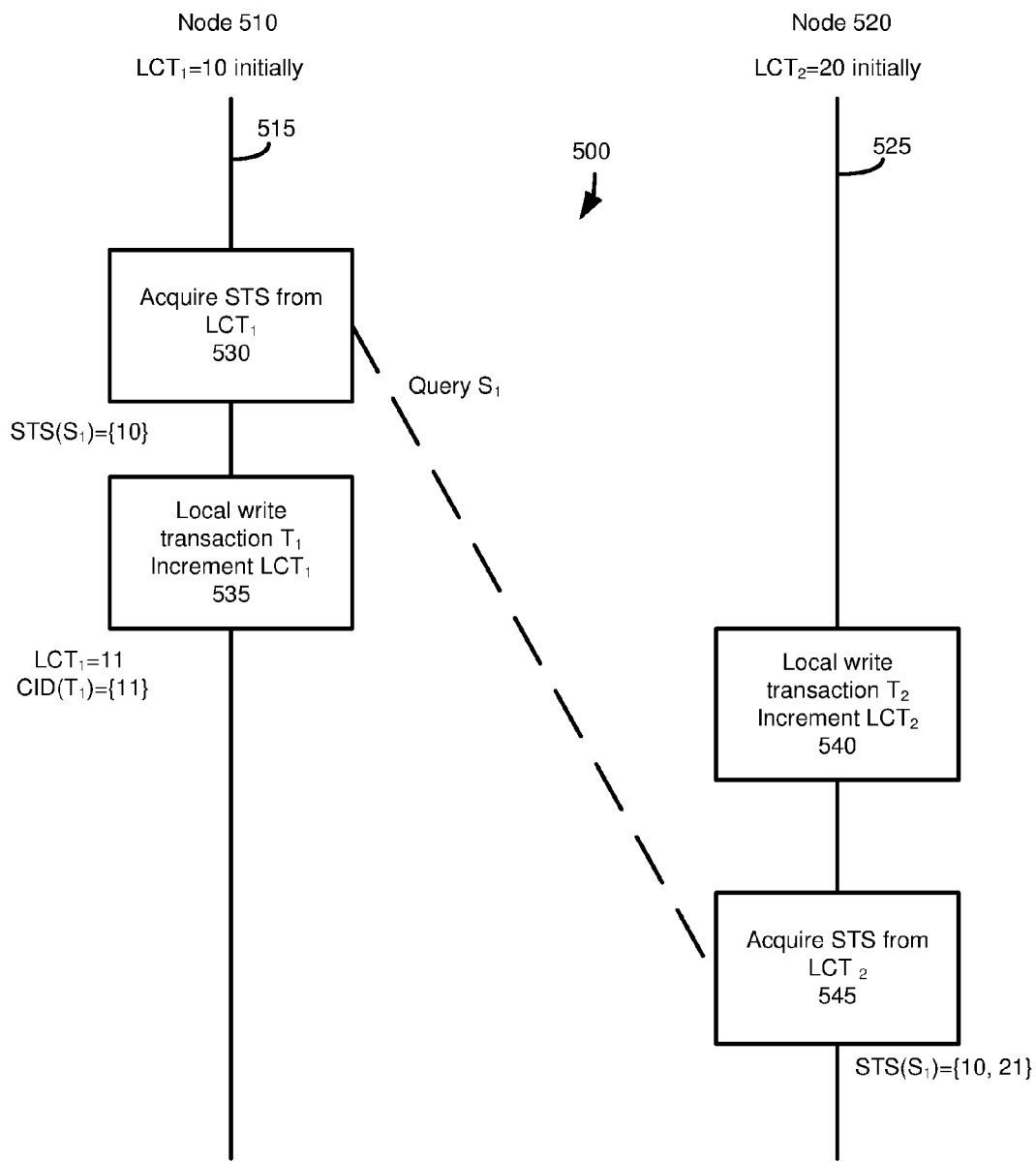
FIG. 5 is a diagram illustrating operations occurring at first and second nodes in a distributed database environment using incremental snapshot timestamp transaction coordination.

FIG. 5 illustrates a scenario 500 that is similar to the scenario 400 of FIG. 4. In the scenario 500, a system includes a first node 510 having an execution timeline 515 and a second node 520 having an execution timeline 525. A query $S_1$ accesses nodes 510 and 520. $S_1$ acquires a snapshot ID, such as a timestamp, from node 510 in process 530.

Node 510 has an initial $LCT_1$ value of 10, which is assigned as the STS of $S_1$ at node 510. A local write transaction $T_1$ executes on node 510, at block 535, after the search acquires its STS from $LCT_1$. The LCT of node 510 increments from 10 to 11 in block 535, which value is assigned as the commit ID of $T_1$ on node 510.

Node 520 has an initial $LCT_2$ value of 20. Write transaction $T_2$ executes on node 520 at block 540, incrementing the LCT of node 520 to 21, which value is assigned as the commit ID of $T_2$ on node 520. In block 545, $S_1$ acquires a snapshot ID from node 520, and is assigned a STS of 21. Thus, local write transaction $T_2$ executes on node 520 before the search acquires its STS from $LCT_2$.

As seen in FIG. 5, $T_1$'s change will not be visible to $S_1$, as the STS of 10 for $S_1$ is less than the CID of 11 for $T_1$. However, because $S_1$ acquires a STS of 21 from node 520, and that is equal to or greater than the CID for $T_2$, 21, on node 520, $T_2$'s change will be visible to $S_1$. So, as described above, in the particular case that $T_2$ was committed after $T_1$ with some implicit causal dependency at the application server side, it violates the requirement of snapshot monotonicity, even if it does not violate visibility atomicity (because there are two different, local write operations, rather than a single, multi-node transaction as in FIG. 4). If the causal dependency between two local transactions is explicitly exposed to the database engine (e.g., in case of a trigger), it may be possible to capture such dependencies automatically and interpret the two local transactions as a single global transaction. However, it typically cannot be expected that all the causal dependencies of two different local transactions are explicitly exposed by the application server.

The incremental STS assignment technique also may lead to a visibility anomaly under existing version garbage collection, or potentially a high performance penalty in avoiding the anomaly and providing correct version garbage collection. As opposed to the vectorized approach, which collects the needed snapshot timestamps at the time of snapshot start, the incremental snapshot assignment approach accesses the execution node later than its start time. Since non-local nodes are not aware of such multi-node queries, the versions needed for the query might already have been already garbage-collected. In this case, even though the right local snapshot timestamp is assigned, the needed versions may no longer be available, and thus the query may abort.

Yet another potential drawback of the incremental approach is the possibility of multi-node queries being aborted due to a mismatch of local mapping information among the nodes accessed by a query. This is because, in some cases, a given global snapshot timestamp cannot be always correctly translated to the correct local snapshot timestamp.

EXAMPLE 4

Snapshot Management

This Example 4 describes how, according to one aspect of the present disclosure, a snapshot timestamp (STS) is assigned to a snapshot (a statement under SSI or a transaction under TSI), how the STS is used for a visibility decision by the snapshot, and how the garbage versions are detected based on STS values. Although this Example 4 generally describes the protocol being used with SSI, the protocol can be applied in other contexts, including under TSI.

Figure 6:
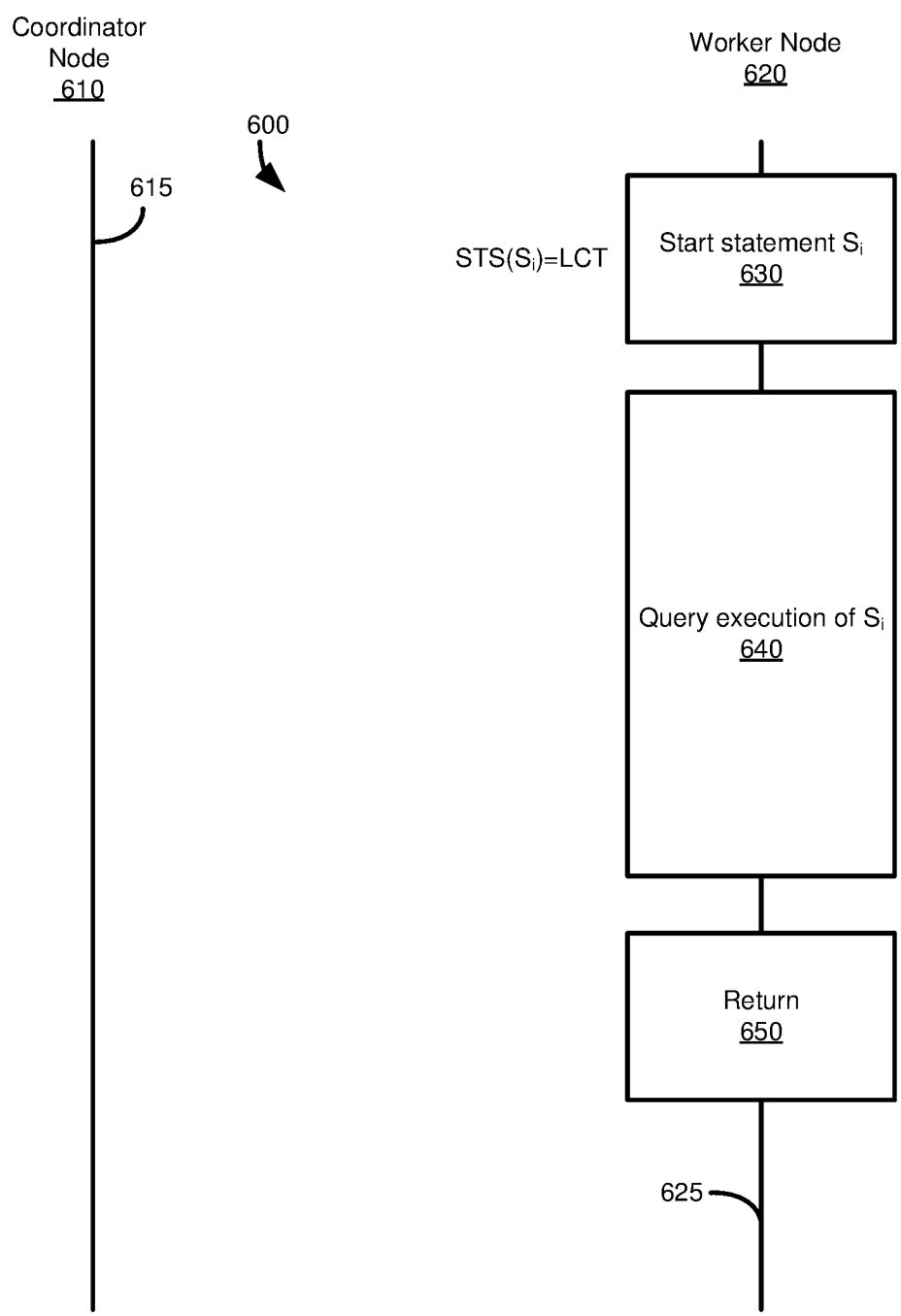
FIG. 6 is a diagram illustrating operations occurring at a coordinator node and a worker node for a local snapshot of the worker node using at least certain implementations of a disclosed distributed transaction protocol.

FIG. 6 illustrates a scenario 600 illustrating how a STS is assigned to a local statement. In the scenario 600, a system includes a coordinator node 610 with an execution timeline 615 and a worker node 620 with an execution timeline 625. When a statement, $S_i$, starts in block 630, it gets its STS from its local synchronization token (such as a local commit timestamp (LCT)) maintained at worker node 620, not from the global synchronization token (such as a global commit timestamp (GCT)) maintained by the coordinator node 610. This is possible because the LCT of the worker node 620 is synchronized with the GCT maintained by the coordinator node 610 whenever a write transaction commits in the worker node 620. Throughout the statement execution, block 640, the same STS value is used to determine the visibility of a candidate record version. At operation 650, the worker node 620 returns query results to the database client which initiated the query.

Figure 7:
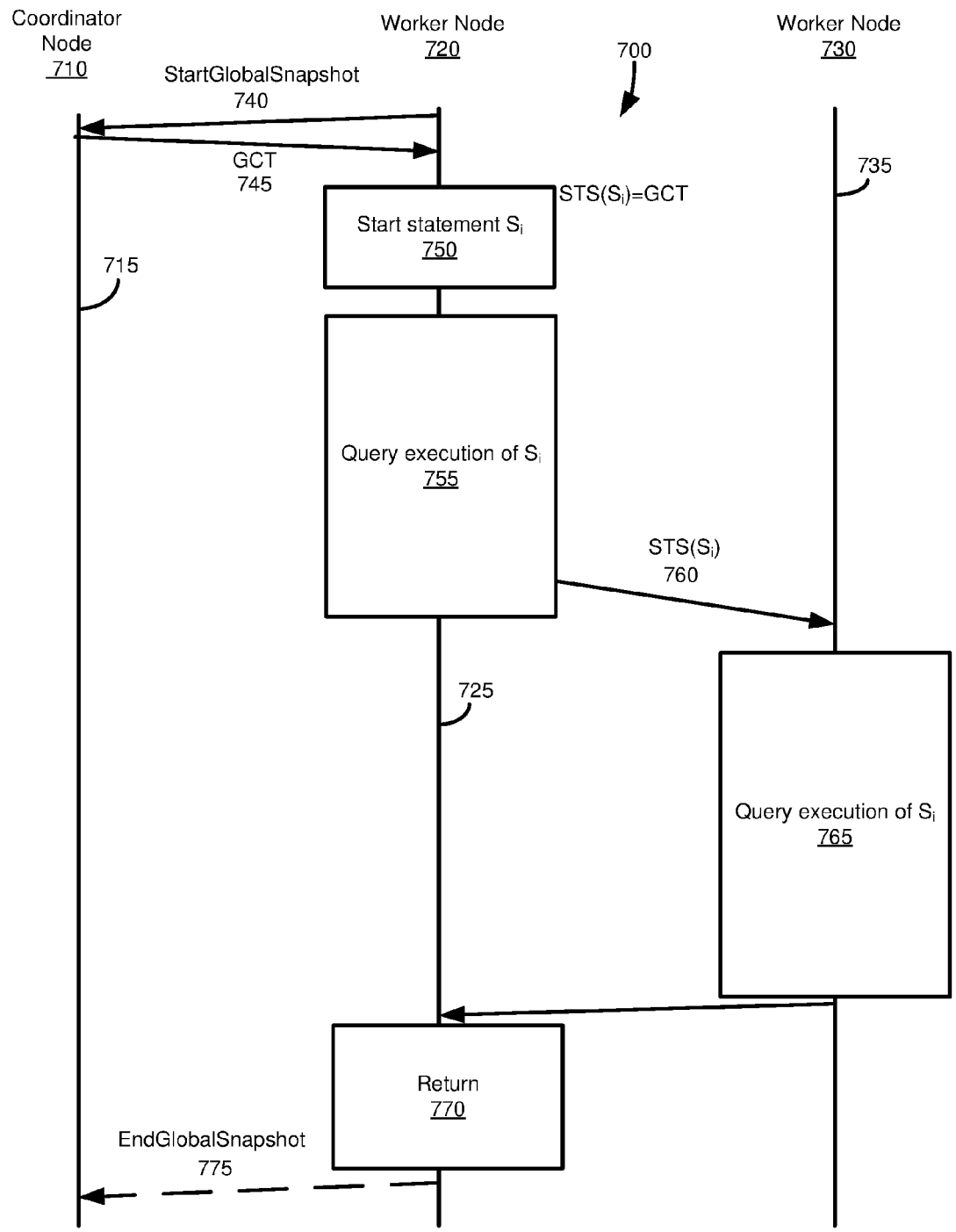
FIG. 7 is a diagram illustrating operations occurring at a coordinator node and first and second worker nodes for a global snapshot, under which statements at each of the first and second worker nodes are executed, using at least certain implementations of a disclosed distributed transaction protocol.

FIG. 7 illustrates a scenario 700 depicting STS assignment of a multi-node statement executable at worker nodes 720, 730 having respective execution timelines 725, 735. Execution of the statement $S_i$ is facilitated by a coordinator node 710 having an execution timeline 715. To provide visibility atomicity across multiple worker nodes 720, 730, the statement timestamp is acquired at worker node 720 from the coordinator node 710 by the worker node 720 sending a StartGlobalSnapshot request 740 to the coordinator node 710 for a global transaction token maintained by the coordinator node. The STS (corresponding to the transaction token, such as the GCT) assigned by the coordinator node 710 is sent to the worker node 720 in communication 745 and can be used for transactional access to any node, because all the worker-side transaction commit operations inform the coordinator node 710 synchronously during their commit operations.

In at least certain implementations of the present disclosure, including, but limited to, this Example 4, "maintaining" a token includes generating the token and assuming responsibility for the correctness of the token. For example, a coordinator node may be responsible for generating a global timestamp and incrementing it as appropriate to reflect the correct state of a database system. "Sending a token" or "receiving a token," in at least certain implementations, refers to sending or receiving, respectively, the current value of the token.

In particular implementations of the systems in the scenarios of FIGS. 6 and 7, the snapshot ID is an integer, such as an eight byte integer. In a specific example, the snapshot ID is derived from, or the same as, the LCT (which, if the node 410 is a coordinator node, is the global commit timestamp (GCT)).

After receiving the STS, the STS is assigned to the statement $S_i$ in block 750, which then executes in block 755. The statement $S_i$ carries the assigned STS, such as in communication 760, when it needs to be executed in another worker node, such as worker node 730, throughout its statement execution (as shown in block 765 for worker node 730). At the end of the statement execution, such as in return block 770 of execution timeline 725, an asynchronous request is made to the coordinator node 710 by the worker node 720 using EndGlobalSnapshot request 775, which can be used, for example, for garbage collection purposes.

Making a synchronous network I/O to the coordinator to receive the global STS adds an additional cost (in both time and resources) for a multi-node statement. As previously mentioned, this cost can be minimized by grouping the requests from concurrent global queries into a single network call, as explained further with reference to FIG. 12.

However, since the multi-node statement itself already generates larger network traffic than getting a single STS value, the extra cost imposed by the global STS is typically not significant.

Under SSI, at least in some implementations, it can be decided at the statement start time whether a statement will use the local STS or the global STS. Using client-side statement routing, the target location information of a compiled query is already maintained. Before query execution, it can be determined whether the query will access only a single node or multiple nodes retrieved from a pre-compiled query plan. For queries whose target location cannot be determined at query compilation time (e.g., a query for a partitioned table not containing the partitioning key in its WHERE clause), in a particular implementation, the query is optimistically classified as a local query. If this decision turns out to be not correct, the query can be re-started by substituting the STS with the current GCT. Under SSI, such query restart can be done without necessarily returning any error to the client application.

Under TSI, a database environment operating an implementation of the disclosed distributed transaction protocol may be configured to mostly employ the global snapshot timestamp, as it may not be certain which types of statements will be executed within the transaction's life cycle. However, for cases where the transaction boundary is not particularly short, any performance penalty coming from access to the global STS is typically not significant because the global STS is typically accessed under TSI only when the transaction starts, not for every statement. In case of pre-compiled stored procedures, it can be detected earlier even under TSI whether the procedure will make a local execution or a multi-node execution by looking up the query plans of the statements to be executed in the procedure.

If node 620 fails while the query is executed in the scenario of FIG. 6, then the query is automatically aborted as the node 620 is restarted. In the scenario of FIG. 7, if node 730 fails while the query is executed at node 720, the query is restarted or aborted because the record versions corresponding to the query's assigned global STS might not be available any more in the restarted node 730. This case can be detected by maintaining a per-node watermark at each worker node 720, 730, which is incremented whenever the corresponding worker node 720, 730 is restarted. In a specific example, the watermark is a token, such as an integer. After a worker node is restarted, its watermark value is also cached at the coordinator node 710, and then the set of available per-node watermark values are transmitted jointly to a global query when the query gets the global STS value from the coordinator node. Therefore, in at least certain implementations of the disclosed distributed transaction protocol, the communication 745 from the coordinator node 710 to the worker node 720 includes at least the GCT and the watermark tokens cached at the coordinator node. In some examples, the GCT and watermark are separate tokens, including transaction tokens. In other examples, the GCT and watermark values are part of a single transaction token. Whenever the execution of a global query is shipped to a new worker node 720, 730, it is checked whether the worker node has the same watermark value as the query's informed watermark value.

Algorithm 1 shows how a statement checks if a record version V should be visible or not to a snapshot S (a statement under SSI or a transaction under TSI). For the visibility decision, first, V's creator transaction's state is checked. If it is aborted or active, then V should not be visible to S (lines 8 to 11). If it is committed, then V's CID is compared to STS(S). V is visible to S only if STS(S) is equal to or larger than V's CID (lines 3-7).

| Algorithm 1 Visibility decision algorithm: check if a record version V should be visible to a snapshot S or not |
| --- |
| 1: while TRUE do |
| 2:    if V's status is Committed then |
| 3:       if V's CID ≤ STS(S) then |
| 4:          return TRUE |
| 5:       else |
| 6:          return FALSE |
| 7:       end if |
| 8:    else if V's status is Aborted then |
| 9:       return FALSE |
| 10:    else if V's status is Active then |
| 11:       return FALSE |
| 12:    else if V's status is Precommitted then |
| 13:       if V's pCID ≥ STS(S) then |
| 14:          return FALSE |
| 15:       else |
| 16:          wait until V's status becomes Committed or Aborted |
| 17:       end if |
| 18:    end if |
| 19: end while |

In addition to the basic visibility rules, the following extensions are provided. As previously mentioned, and as recited in Algorithm 1, at least certain implementations of disclosed embodiments of distributed database transaction protocols provide a statement or transaction status of being precommitted, where the final commitment of the statement or transaction is treated as in-doubt, with the visibility decision being delayed until the in-doubt status has been resolved, such as by the statement or transaction being committed. If V's status is precommitted (lines 12 to 17), the corresponding record version's visibility decision is postponed. The precommitted/in-doubt state makes sub-operations of a transaction commit effectively atomic without relying on any latch or lock.

The delayed visibility decision scheme may result in a situation where a read statement may need to wait for another write transaction's commit to be completed. However, this waiting situation is typically uncommon, because it happens when a read statement is trying to check the visibility of a record version which was created by a write transaction committed at the same time as the read attempt. To further reduce the possibility of a reader waiting for an in-doubt transaction to complete, particular implementations of the disclosed transaction management protocol can include early pruning of record versions that will never be visible.

As explained above, the in-doubt period of a transaction is started by setting the transaction's state as precommitted. By assigning pCID, which is typically defined to be smaller than its CID value to be decided later, at the time when the transaction state is set as precommitted, record versions which will never be visible to the pending reader statement, such as because the query was started later than the write operations and thus should only view records that were available when the query was started, can be pruned. More specifically, if STS(S) is smaller than or equal to pCID(T) for a write transaction T and a snapshot S, then STS(S) will also be smaller than CID(T) because pCID(T) is smaller than CID(T) assigned by the commit protocol. Thus, if STS(S)≤pCID(T), it can be determined that the tested version V is not visible to S (lines 13 to 14 of Algorithm 1) without waiting any further.

In at least certain implementations of the present disclosure, garbage collection is executed independently in each worker node, but it considers not only the queries running in its local node, but also multi-node queries which were started at different worker nodes but can potentially access the local node. In order to reflect such global queries during local garbage collection, the coordinator node maintains all the active global queries by watching the incoming StartGlobalSnapshot calls and EndGlobalSnapshot calls. When local garbage collection starts at a worker node, it gets the minimum STS value of active global queries, called MinActiveGlobalSTS, from the coordinator node, and also the minimum STS value of its active local queries, called minActiveLocalSTS, from its local node. Taking the minimum value of MinActiveGlobalSTS and MinActiveLocalSTS, the garbage collector finds out the record versions that have version timestamps which are smaller than the minimum value by traversing the record version chains.

To maintain the complete set of active global queries at the coordinator, StartGlobalSnapshot should typically be executed synchronously from a worker node to the coordinator node. However, since StartGlobalSnapshot is already used to get the global STS of a global query, it does not add additional latency to the global query. In particular implementations of the disclosed method, the overhead of EndGlobalSnapshot is minimized by making it as an asynchronous call, as shown in FIG. 7. Although the asynchronous call can result in the MinActiveGlobalSTS value being slightly out of date, which can result in slightly delayed garbage collection, it does not typically otherwise affect the overall performance of transaction processing.

EXAMPLE 5

Periodic Synchronization of Local Transaction Tokens of Worker Nodes by Coordinator Node As described above, many snapshot isolation protocols involving multiple worker nodes rely on a coordinator node to provide, or synchronize, the transaction tokens, such as timestamps, of the worker nodes. As the number of worker nodes increases, this communication with the coordinator node can create a bottleneck and degrade the performance of the database system. This Example 5 describes a protocol in which the coordinator node periodically synchronizes the transaction tokens of the worker nodes, rather than having the worker nodes inform the coordinator node of every local write transaction on the worker node, and without the local nodes requesting a global transaction token for multi-node snapshot. As will be explained in more detail, local statements may execute at the worker nodes using the current transaction token, such as the local commit timestamp, of the respective worker nodes. However, global (multi-node) statements are held at the worker node until the next transaction token synchronization cycle by the coordinator node is completed. Similarly, local write transactions may be committed by the worker node without coordination with the coordinator node.

Figure 8:
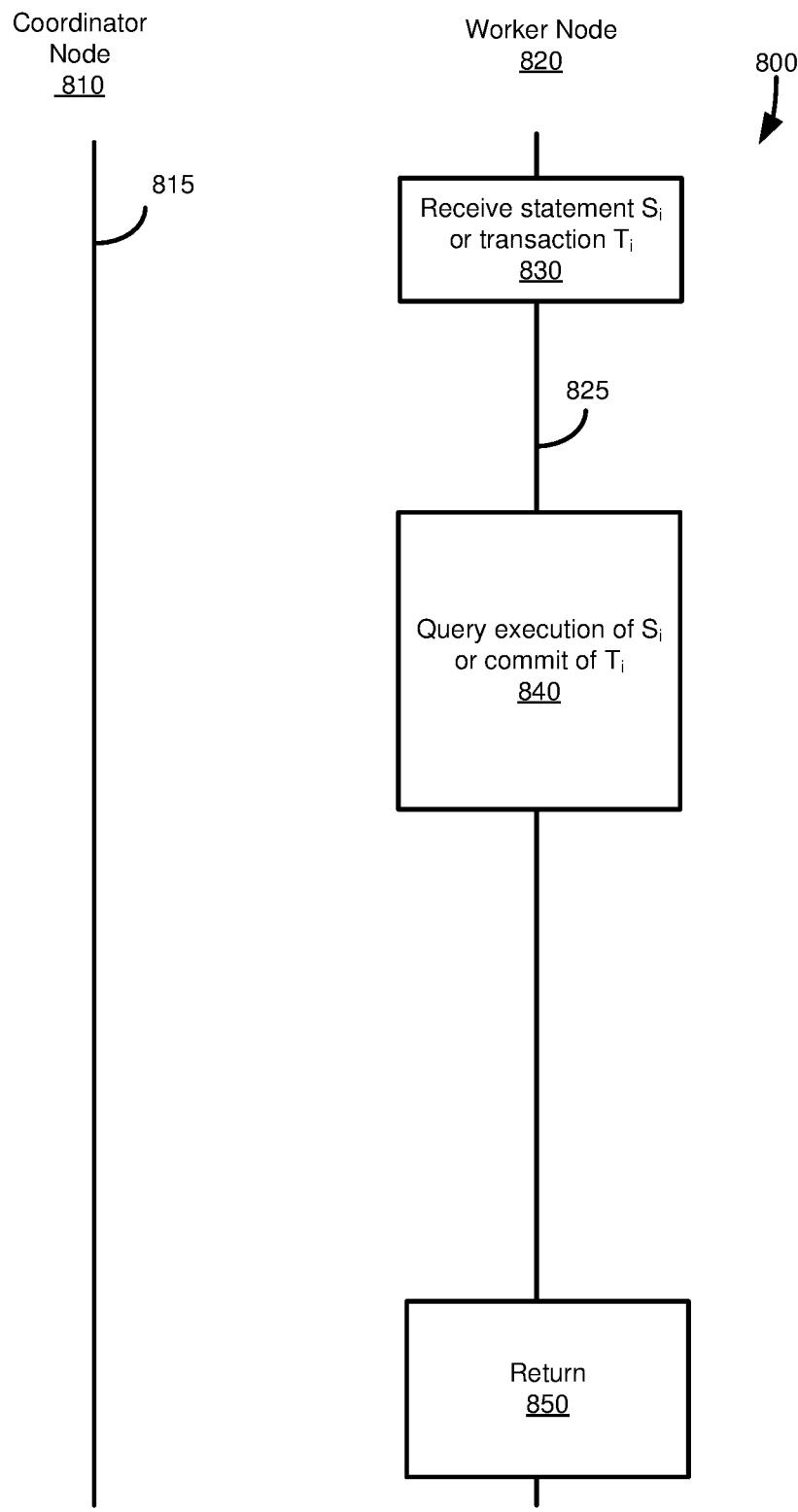
FIG. 8 is a diagram illustrating operations occurring at a coordinator node and a worker node for a local snapshot of the worker node using at least certain implementations of a disclosed distributed transaction protocol.

With reference to FIG. 8, a scenario 800 involves a system that includes a coordinator node 810 and a worker node 820, with respective execution timelines 815, 825. A statement $S_i$ which only accesses records located at worker node 820, or a transaction $T_i$ (with one or more local read or write operations on the worker node 820), is received by the worker node 820. In this situation, statement $S_i$ or transaction $T_i$ can start at the worker node 820 in block 830 using a local transaction token, such as a local commit timestamp (LCT), of the worker node 820. The worker node 820 executes the read operations of the statement $S_i$ or transaction $T_i$, or executes the write operations and commits the transaction $T_i$, at the worker node 820 in process 840, and results, or a commit acknowledgement, are returned to the client in block 850. So, for local-only read or write operations, the worker node 820 does not need to communicate with the coordinator node 810 before starting the query, executing read or write operations, and committing the write operations.

Figure 9:
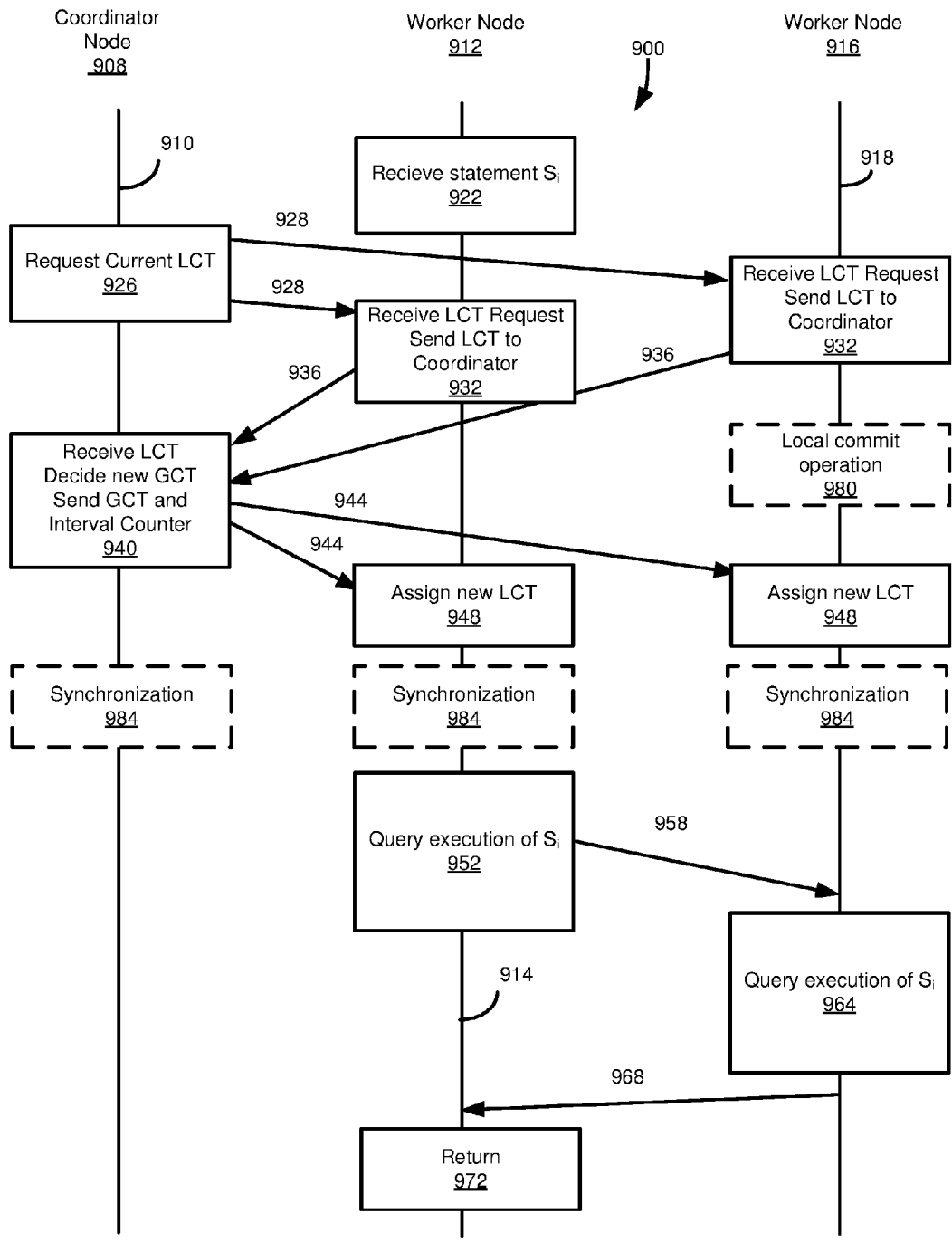
FIG. 9 is a diagram illustrating operations occurring at a coordinator node and first and second worker nodes during synchronization of transaction tokens of the coordinator node and the first and second worker nodes.

FIG. 9 illustrates a scenario 900 in a system that includes a coordinator node 908, a worker node 912, and a worker node 916, with respective execution timelines 910, 914, 918. The coordinator node 908 maintains a global transaction token, such as a commit timestamp, and, in particular examples, a synchronization interval counter.

Worker node 912 receives a multi-node statement in block 922 that includes read operations. As the statement $S_i$ is a global statement, its execution is held until the local transaction token, such as the LCT of the worker node 912, is synchronized with a global transaction token maintained by the coordinator node 908. The remainder of FIG. 9 will be described with respect to synchronizing the LCT of the worker nodes 912, 916 with the GCT of the coordinator node 908. However, the scenario 900 may be used with other types of transaction tokens. In addition, although FIG. 9 illustrates synchronization of LCTs in processing a multi-node statement with read operations, an analogous synchronization protocol may be used with local write operations at the worker nodes 912, 916.

In block 926, the coordinator node 908 begins a new synchronization cycle by sending requests 928 to each of the worker nodes 912, 916 for the current value of their LCT. In at least some implementations, the coordinator node 908 starts a new synchronization cycle at periodic intervals, such as at determined or predetermined intervals, including at regular intervals. In other implementations, the coordinator node 908 does not initiate synchronization cycles, but rather periodically receive the LCT values of the worker nodes 912, 916, such as receiving LCT values at, or receiving LCT values sent at, determined or predetermined intervals, including at regular intervals.

In some implementations, the communications 928 may be used to carry out functions in addition to initiating a synchronization cycle. For example, the communications 928 may include the current GCT value (such as a GCT value determined from a prior synchronization cycle or operation) and, if used, the value of the synchronization interval counter. In a particular case, the sending of the GCT in communication 928, based on LCT values obtained from prior communication with the worker nodes 912, 916, is used to initiate the next synchronization cycle. Including the GCT value, and optionally the synchronization interval counter, in the communications 928 can reduce the number of communications between the coordinator node 908 and the worker nodes 912, 916. It can also reduce the number of types of communications that need to be included in a system implementing the scenario of FIG. 9. In further examples, the communications 928 can include additional, or different, information.

The interval may be selected based on a number of factors, including the number of worker nodes in the database environment and the desired transaction throughput, which can be affected by delays in processing multi-node transactions while the worker nodes are waiting for the next synchronization cycle. For example, longer intervals between synchronizations may be used as the number of worker nodes increases, in order to reduce the amount of network communications with the coordinator node 908. However, longer intervals typically result in lower transaction throughputs. In various implementations, the synchronization interval is between about 0.25 milliseconds and about 2 seconds, such as between about 0.5 milliseconds and about 1 second, between about 0.75 milliseconds and about 500 milliseconds, between about 1 millisecond and about 200 milliseconds, between about 1 millisecond about 50 milliseconds, or between about 1 millisecond and about 10 milliseconds. For example, the synchronization interval may be between 0.25 milliseconds and 2 seconds, such as between 0.5 milliseconds and 1 second, between 0.75 milliseconds and 500 milliseconds, between 1 millisecond and 200 milliseconds, between 1 millisecond and 50 milliseconds, or between 1 millisecond and 10 milliseconds. In specific examples, the synchronization interval is about 0.25, about 0.5, about 0.75, about 1, about 2, about 5, about 10, about 25, about 50, about 75, about 100, about 200, about 300, about 400, about 500, about 600, about 700, about 800, about 900, or about 1000 milliseconds, such as being 0.25, 0.5, 0.75, 1, 2, 5, 10, 25, 50, 75, 100, 200, 300, 400, 500, 600, 700, 800, 900, or 1000 milliseconds.

In further implementations, the synchronization interval is adjustable. For example, the synchronization interval may be manually set by a database administrator. In another example, a database system may dynamically adjust the synchronization interval, such as based on the number of worker nodes currently in the database system or the number or frequency of global statements. For example, if global statements are occurring more frequently, the database system may dynamically set a shorter synchronization interval to reduce the delay in processing global statements. Or, even if global statements are occurring frequently, if communications to the coordinator are creating a bottleneck, the synchronization interval can be dynamically increased (lengthened) to mitigate the bottleneck. On the other hand, if global statements are occurring less frequently, such as based on the type of use of the database systems, or simply during periods of low activity (such outside of working hours), the synchronization interval can be lengthened, which can save on power consumption and network traffic costs. In some examples, the synchronization interval may analyzed, such as by the coordinator node 908, after each synchronization cycle or operation is carried out, and modified if appropriate.

The worker nodes 912, 916 receive the requests 928 in blocks 932 and transmit their current LCT values to the coordinator node 908 in communications 936.

Alternatively, the worker nodes 912, 916 can periodically (e.g., at a synchronization interval) transmit their current LCT values to the coordinator node 908 in communications 936 without the coordinator node 908 requesting the current LCT values (no block 926). In this approach, network traffic is reduced since the request messages from the coordinator node 908 are skipped. The synchronization interval can be set statically or dynamically as described above.

In yet further implementations, the synchronization of LCT values happens periodically, but need not happen at regular intervals. In some cases, synchronization is initiated by the coordinator node 908, or by one of the worker nodes 912, 916, such as based on particular criteria (such as the receipt by a worker node of a multi-node statement).

In process 940, the coordinator node 908 determines a new GCT value, such as by selecting the maximum of the LCT values received from the worker nodes 912, 916, or the maximum of the current GCT value maintained by the coordinator node 908 and the LCTs received from the worker nodes 912, 916. Once the coordinator node 908 determines the new GCT value, the coordinator node 908 updates the synchronization interval counter, if used, and sends the new GCT and, optionally, synchronization interval counter values to the worker nodes 912, 916 in communications 944. The GCT and interval counter values may be sent as separate transaction tokens, or as, or as part of, a single transaction token.

In some implementations, communications 928 and 944 may be combined (including in a single network call from the coordinator node 908 to each worker nodes 912, 916). That is, the sending of the updated GCT (and, optionally, interval counter) may be combined with initiating a request for the LCT values of the worker nodes 912, 916 (and, at least in some examples, initiating a new synchronization operation). As discussed above, the communications 928 can include the GCT value, and, optionally, the synchronization interval counter value. Consolidating these communications can further reduce the number (and types) of network communications between the coordinator node 908 and the worker nodes 912, 916 as part of the synchronization process.

When the worker nodes 912, 916 receive the communications 944, they determine a LCT value to be used at the worker nodes 912, 916 in process 948. The LCT value determined by the respective worker nodes 912, 916 provides a snapshot for the read operations of the multi-node statement $S_i$. For example, each worker node 912, 916 may determine the LCT value by selecting the maximum value of the GCT sent by the coordinator node 908 and the current LCT value of the worker node 912, 916. In this way, the worker nodes 912, 916 may continue to commit local write operations during the synchronization process. If the local write operations result in the LCT of the worker node 912, 916 having a higher value than the GCT provided by the coordinator node 908 in communication 944, the worker node 912, 916 simply continues uses its current LCT value. However, the synchronization processes provides that each worker node 912, 916 will have a LCT value that is at least as large as the largest LCT (or the largest of the LCT and GCT values) sent by the worker nodes 912, 916 in communications 928.

After determining the LCT value in process 948, the multi-node statement $S_i$ is executed on worker node 912 in block 952. A portion of statement $S_i$ that is executable at worker node 916 is forwarded to worker node 916 by worker node 912 in communication 958 with the LCT value assigned by the worker node 912 in process 948. The worker node 916 executes $S_i$ at block 964 and returns results to worker node 912 in communication 968. Executions results of $S_i$ are returned to the database client in process 972.

FIG. 9 shows periodic synchronization operations (between the coordinator node 908 and worker nodes 912, 916) that are interleaved with query receipt and processing operations. More generally, the periodic synchronization operations shown in FIG. 9 (including at least blocks 932, 940, and 948) happen periodically, regardless of whether a query has been received with one or more statements and one or more transactions to process. When a query is received, the worker nodes 912, 916 use the synchronization information provided with periodic synchronization.

Although the scenario of FIG. 9 shows a single timestamp synchronization operation before the multi-node statement is executed on worker node 912 at step 952, it can be beneficial to carry out more than one synchronization operation before executing the multi-node statement. As described above, at least certain implementations of this Example 5 allow local write operations to commit at a worker node 912, 916 without coordination with the coordinator node 908, and during the timestamp synchronization process. However, snapshot monotonicity may not be guaranteed in this situation.

For example, consider a scenario where worker node 912, 916 both originally have LCT values of 12. In optional block 980, a local commit operation executes on worker node 916, incrementing the LCT value of worker node 916 to 13. Assuming that 12 was selected as the GCT by the coordinator node 908 in step 940, and that no local write transactions were committed on worker node 912, in block 948, worker node 912 would use the LCT value of 12. However, worker node 916, selecting the greater of its own current LCT value and the GCT, would proceed using a LCT value of 13.

If a local statement was started on worker node 916 after block 948, it would be assigned a snapshot value of 13 and the local write operation committed in step 980 would be visible in the statement. However, if $S_j$ was executed at worker node 912 after block 948, it would have a snapshot value of 12, and local commit operation 980 on worker node 916 would not be visible to the query. This would not be consistent with the property of snapshot monotonicity discussed earlier, where if a transaction is visible to a first statement, it should also be visible to a second statement that was started later than the first statement.

If desired, a higher level of consistency can be provided, including the property of snapshot monotonicity, by carrying out the synchronization operation more than one time before a multi-node statement is executed. For example, optional block 984 illustrates one or more additional synchronization operations at the coordinator node 908 and the worker nodes 912, 916. Continuing the example above, assuming no other transactions were committed, after another synchronization operation in step 984, both worker nodes 912 and 916 would have LCT values of 13, and a statement at either worker node 912, 916 would see the same record versions. Thus, in at least some implementations, rather than waiting for an interval counter to be incremented by one before executing a multi-node statement, the execution of the multi-node statement is delayed until the interval counter has been incremented by more than one, such as being incremented by two, or being incremented by a larger value.

When execution of multi-node statements is delayed for more than one synchronization operation, in one implementation, the operations are carried out as described above. That is, each synchronization cycle may include a single synchronization operation and there may be an interval, including a periodic interval, between synchronization cycles. If desired, any delay in executing multi-node statements can be reduced by carrying out synchronization operations consecutively, such as without the interval described above, in a given synchronization cycle. For example, for the desired number of iterations, a worker node 912, 916 may send its LCT value to the coordinator node 908 as soon as it receives the new GCT (and, optionally, interval counter), or a LCT value request, from the coordinator node 908, and decides its updated LCT. In another example the worker nodes 912, 916 may consecutively initiate a synchronization operation for the desired number of iterations.

When consecutive synchronization operations are used in a single synchronization cycle, the interval periods between synchronizations cycles may correspond to the intervals described above for a single synchronization cycle. That is, for a synchronization cycle that includes two synchronization operations per cycle, two synchronization operations are executed consecutively during a cycle and then the next synchronization cycle does not begin until the interval has passed (or the next synchronization cycle is otherwise initiated).

At a high level, there are at least two different approaches for the worker nodes 912, 916 to start query processing. In one approach ("wait approach", described in this Example 5), after receiving a multi-node statement $S_j$, the respective worker nodes 912, 916 wait for the next synchronization with the coordinator node 908 before executing the statement $S_j$. In another approach ("no-wait approach", described in Example 6), after receiving a multi-node statement $S_j$, the respective worker nodes 912, 916 use the most recently received synchronization information from the coordinator node 908 when executing the statement $S_j$.

The protocol described in FIG. 9 may be modified if desired. For example, the coordinator node 908 was described as incrementing a synchronization interval counter, such as incrementing an integer value. In other implementations, in the wait approach, the worker nodes 912, 916 can determine when a synchronization cycle has been completed, and the processing of pending multi-node statements can be started, in another manner. For example, a Boolean variable may be set to false after pending multi-node statements have been started at a worker node 912, 916 after synchronization with the coordinator node 908. While the variable is false, new multi-node statements are again held at the worker node 912, 916. When another synchronization with the coordinator node 908 is carried out, the variable is set to true, pending statements are processed, and the variable is again set to false. Thus, execution of pending multi-node statements "waits" until synchronization completes with the coordinator node (e.g., a new GCT is received). The wait approach can add delay to query processing in an amount that depends on the synchronization interval.

In the no-wait approach, described in Example 6, the worker nodes 912, 916 process a multi-node statement using the current (most recent) synchronization information from the coordinator node 908. This avoids the added delay of the "wait approach," but transactional consistency is not guaranteed. In particular, a change to data at one worker node might be visible at that worker node but not visible at another worker node. So long as the synchronization interval is sufficiently short, however, such occurrences may be limited. In some cases, such an occurrence can be handled by canceling and restarting a query.

In at least certain implementations of this Example 5, the communications 936 may include information in addition to the values of the transaction tokens of the worker nodes 912, 916. For example, in addition to sending the value of their transaction tokens, which typically represents the largest active transaction token at the worker nodes 912, 916, the worker nodes 912, 916 may also send in communications 936 minimum transaction token values currently in use by the worker nodes 912, 916. The coordinator node 908 may use the minimum active transaction token values to facilitate garbage collection—the removal of record versions that are longer needed by any active query. In some examples, the coordinator node 908 sends additional information to the worker nodes 912, 916 in communications 944, such as the minimum active transaction token value in the scenario 900. The worker nodes 912, 916 may then remove record versions older than this minimum value.

As the protocol of this Example 5 can involve less frequent communication between the coordinator node 908 and the worker nodes 912, 916, there can be some delay in garbage collection. However, combining garbage collection information with the communications 936, 944 can avoid sending this information in separate communications, which can reduce network traffic in the scenario 900, including reducing the networking and processing burdens at the coordinator node 908.

In an alternative implementation, if a portion of the multi-node query is executable at a remote worker node (a worker node other than the worker node that originally received the query), without prior processing by the node which received the statement, it may be forwarded to the remote node without waiting for a new synchronization cycle. However, the portion of the statement executable at the remote node is not executed until the next synchronization cycle has completed. This scenario is illustrated in the scenario 1000 of FIG. 10. As with FIG. 9, the description of FIG. 10 discusses synchronization of the LCT values with the GCT of a coordinator node, but other transaction tokens may be used and synchronized in an analogous manner.

In the scenario 1000, a system includes a coordinator node 1008, a worker node 1012, and a worker node 1016, having respective execution timelines 1010, 1014, 1018. In block 1022, worker node 1012 receives a multi-node statement $S_i$ that includes read operations. A portion of the statement $S_i$ is determined to be executable at worker node 1016. Without waiting for synchronization of a transaction token with the coordinator node 1008, worker node 1012 forwards all or a portion of statement $S_i$ to worker node 1016 in communication 1026. The communication 1026 may include additional information. For example, if a synchronization counter is used, the value of the synchronization counter when worker node 1012 received statement $S_i$ may be sent to worker node 1016 in communication 1026. In this way, the worker node 1016 may execute $S_i$ when the synchronization counter known to worker node 1016 is larger than the value sent in communication 1026 (but using the new GCT sent to the worker node 1016 by the coordinator node 1008).

Worker node 1016 receives the statement $S_i$ in block 1030. In this implementation, $S_i$ is not executed at worker node 1012 or worker node 1016 until the next synchronization cycle is completed. In other examples, $S_i$ may be executed by the worker node 1012 prior to synchronization, as long as its results do not depend on execution of $S_i$ by the worker node 1016.

In block 1034, the coordinator node 1008 starts a new synchronization cycle by sending requests 1038 to worker nodes 1012, 1016 for their current LCT values. As described above in the discussion of FIG. 9, the request 1038 can include additional information, including the GCT and, optionally, a synchronization interval counter value. The worker nodes 1012, 1016 receive the requests 1038 in block 1042 and send their current LCT values to the coordinator node 1008 in communications 1046. Alternatively, the worker nodes 1012, 1016 can periodically (e.g., at a synchronization interval) transmit their current LCT values to the coordinator node 1008 in communications 1046 without the coordinator node 1008 requesting the current LCT values (no block 1034).

In process 1050, the coordinator node 1008 determines a new GCT, such as described above. As described above in the discussion of FIG. 9, in some implementations, the communications 1038 may be combined with the communications 1054. The updated GCT value is sent to the worker nodes 1012, 1016 in communications 1054. When the worker nodes 1012, 1016 receive the communications 1054, they determine a LCT value, such as described above, in block 1058. The LCT value determined by the respective worker nodes 1012, 1016 provides a snapshot for the read operations of the multi-node statement $S_i$. The worker nodes 1012, 1016 then execute $S_i$ in blocks 1062, 1066, respectively. Worker node 1016 returns query results to worker node 1012 in communication 1070. Worker node 1012 returns query results to a database client in block 1074.

Figure 10:
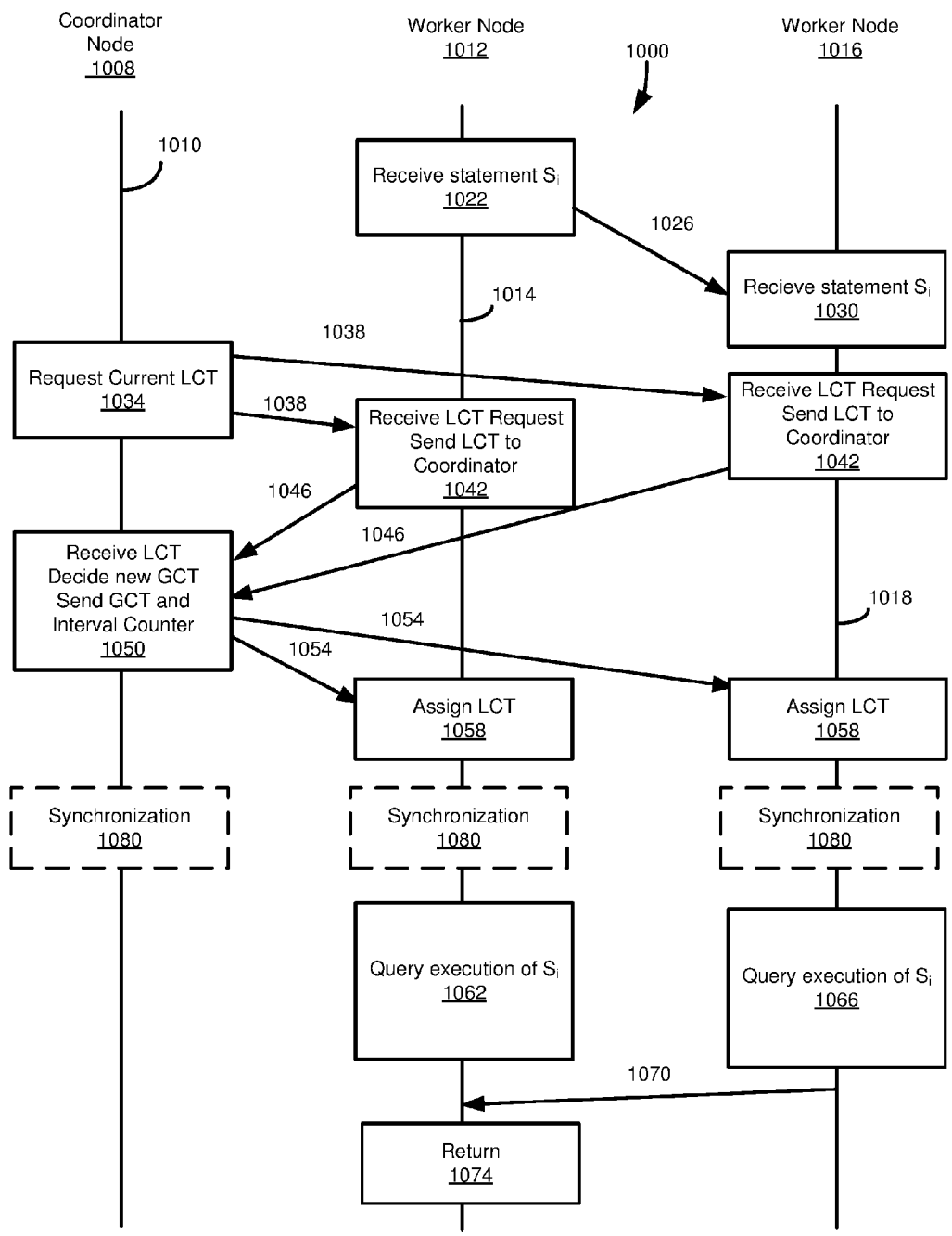
FIG. 10 is a diagram illustrating operations occurring at a coordinator node and first and second worker nodes during synchronization of transaction tokens of the coordinator node and the first and second worker nodes.

Like FIG. 9, FIG. 10 shows periodic synchronization operations that are interleaved with query receipt and processing operations. More generally, the periodic synchronization operations shown in FIG. 10 (including at least blocks 1042, 1050, and 1058) happen periodically, regardless of whether a query has been received with one or more statements and one or more transactions to process. When a query is received, the worker nodes 1012, 1016 use the synchronization information provided with periodic synchronization. Depending on implementation, the worker nodes 1012, 1016 can use a wait approach (wait for the next synchronization with the coordinator node 1008 before executing the statement $S_i$) or a no-wait approach (use the most recently received synchronization information from the coordinator node 1008 when executing the statement $S_i$), as described above.

Additionally, also like FIG. 9, the scenario of FIG. 10 may include more than one synchronization operation before execution of the multi-node query. For example, optional block 1080 indicates one or more additional synchronization operations.

Figure 11:
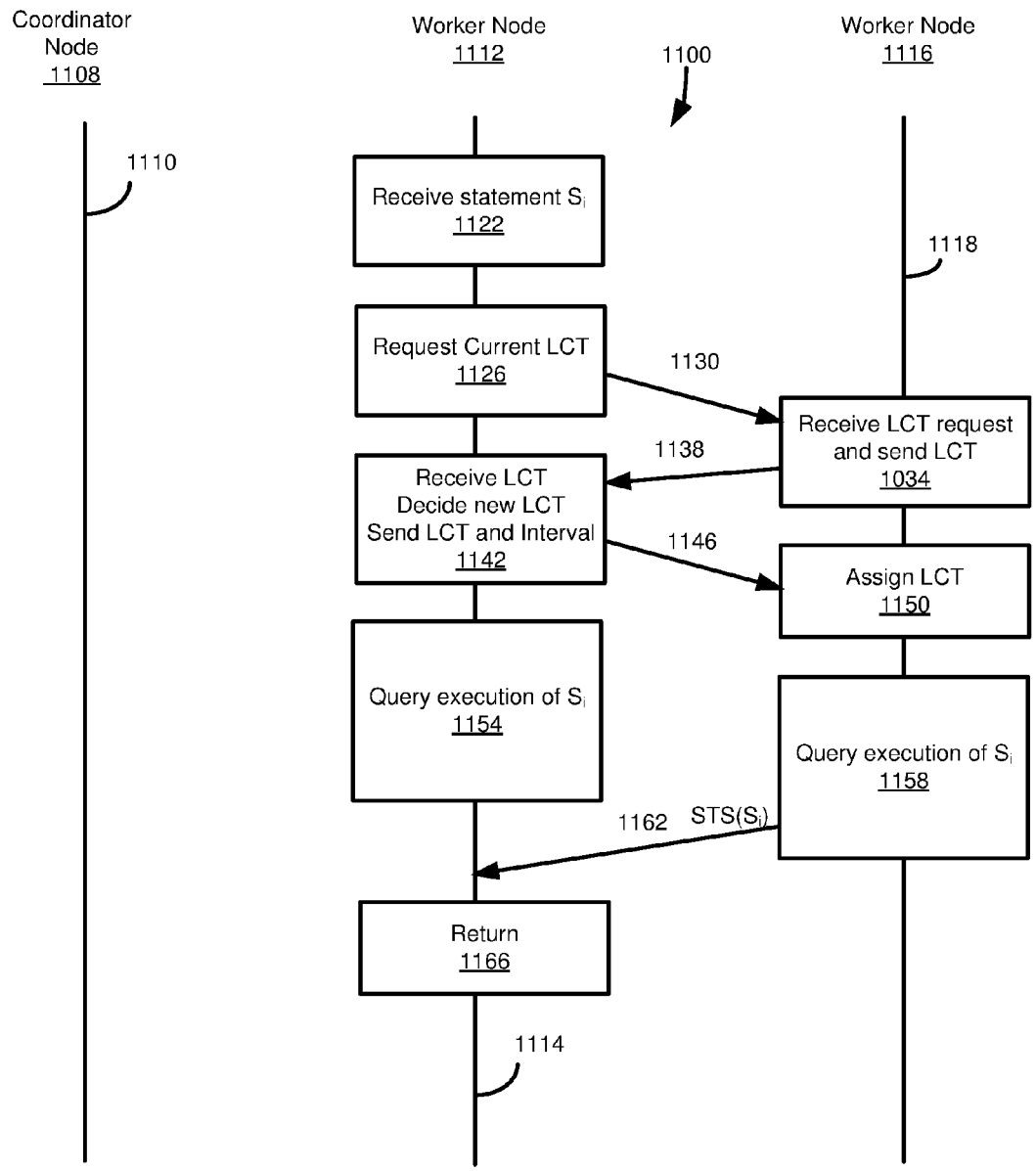
FIG. 11 is a diagram illustrating operations occurring at a coordinator node and first and second worker nodes during synchronization of transaction tokens of the first and second worker nodes.

FIG. 11 illustrates another implementation of the protocol of this Example 5. Again, FIG. 11 discusses the synchronization of LCT and GCT values, but other transaction tokens may be used and synchronized in a similar manner.

FIG. 11 illustrates a scenario 1100 in a system having a coordinator node 1108, a worker node 1112, and a worker node 1116, with respective execution timelines 1110, 1114, and 1118. In block 1122, worker node 1112 receives a statement $S_i$. The worker node 1112 is able to determine, such as from a query plan associated with $S_i$, that $S_i$ will access records maintained by worker node 1116. In this implementation, worker nodes 1112 and 1116 can communicate directly to coordinate timestamps without waiting for the synchronization process mediated by the coordinator node 1108.

For example, in process 1126, the worker node 1112 starts the timestamp coordination process by sending a request 1130 to the worker node 1116 for the LCT of the worker node 1116. The worker node 1116 receives the communication 1130 in block 1134 and sends its LCT to the worker node 1112 in communication 1138. In block 1142, the worker node 1112 determines a LCT value, such as choosing the maximum LCT of the worker node 1112 and the worker node 1116. This LCT value is then sent to the worker node 1116 by the worker node 1112 in communication 1146. In some examples, as shown, the communication 1146 also includes the statement $S_i$. In other examples, $S_i$ is sent to the worker node 1116 by the worker node 1112 in a separate communication.

In block 1150, the worker node 1116 determines a new LCT value. In some cases, the worker node 1116 selects the LCT value sent in communication 1146 as the new LCT value for the worker node 1116. In other cases, the worker node 1116 selects as a LCT value for the worker node 1116 the larger of the current LCT value of the worker node 1116 and the LCT value received in communication 1146.

Query $S_i$ is executed on worker nodes 1112 and 1116 in blocks 1154 and 1158. Query execution results from worker node 1116 are returned to the worker node 1112 in communication 1162. Worker node 1112 returns query results to a database client in process 1166.

As described above, in particular implementations of this Example 5, a transaction token synchronization protocol of this Example 5 may be used with a commit protocol to commit write operations (such as transactions including one or more DML statements) local to a worker node, such as worker nodes 912, 916 of FIG. 9, without communication or synchronization with the coordinator node, such as the coordinator node 908. This can further reduce network traffic at the coordinator node. As the LCT values of the worker nodes are periodically synchronized with the coordinator node, the coordinator node eventually becomes aware of local write operations at the worker nodes.

Figure 12A:
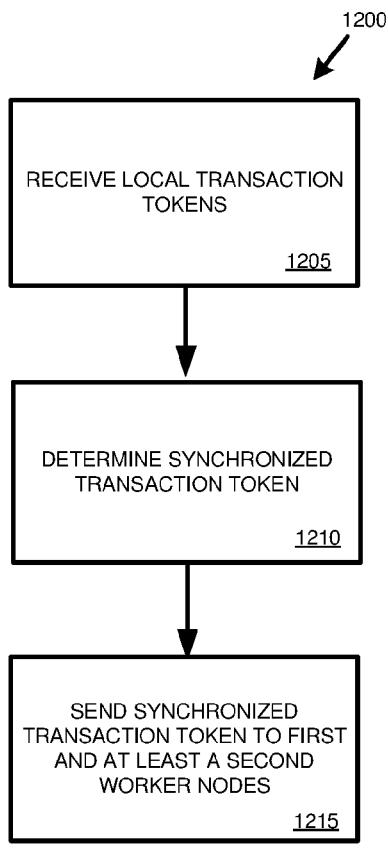
FIG. 12A is a flowchart of an example method summarizing actions occurring at a coordinator node during an embodiment of the present disclosure for synchronizing transaction tokens between first and at least a second worker nodes.
Figure 12B:
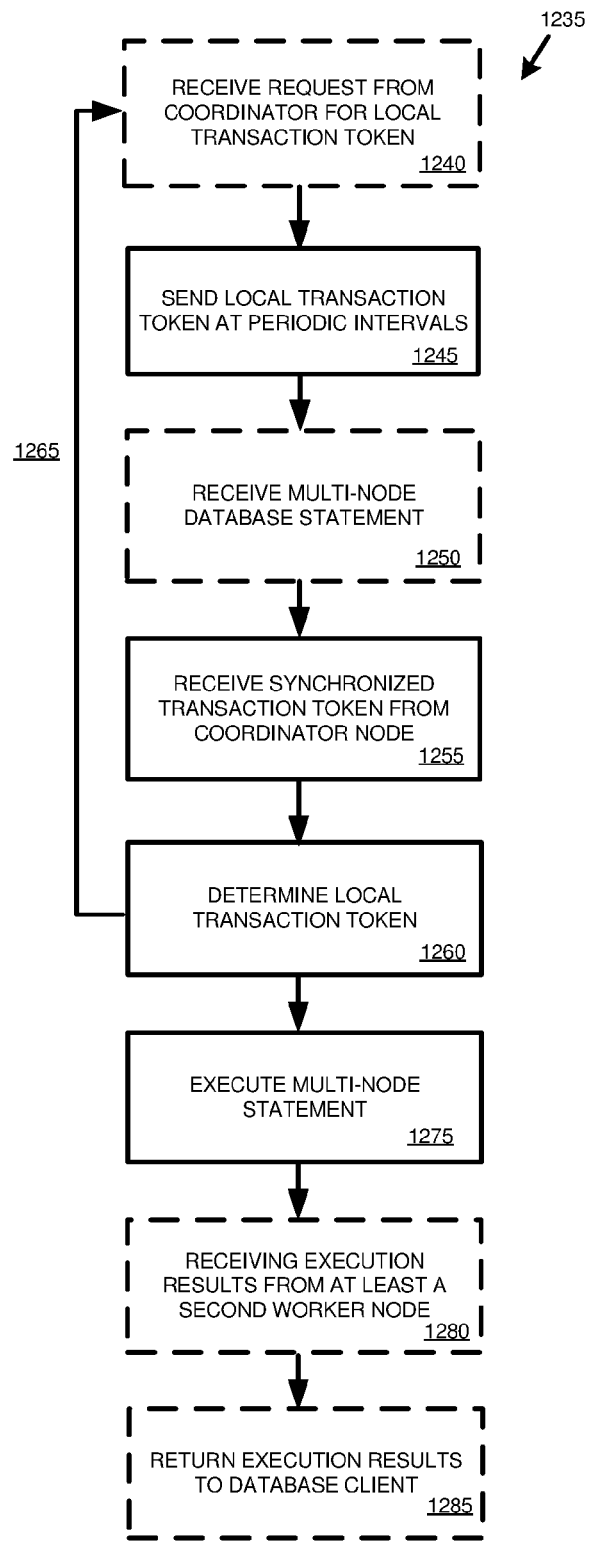
FIG. 12B is a flowchart of an example method summarizing actions occurring at a first worker node during an embodiment of the present disclosure for synchronizing transaction tokens between first and at least a second worker nodes using a coordinator node.

FIGS. 12A and 12B describe actions occurring at a coordinator node and worker node, respectively, according to at least certain implementations of this Example 5. Although described with respect to a multi-node statement, the methods of FIG. 12A and FIG. 12B may be applied analogously to local node write operations. FIG. 12A illustrates a process 1200 occurring at a coordinator node. In some aspects of the present disclosure, a coordinator node refers to a database node that is responsible for coordinating at least certain aspects of the database system, such as synchronizing one or more transaction tokens. In various implementations, these transaction tokens can be used to synchronize various aspects of the database system, such as to provide a consistent view of the database system as it existed at a particular time point. Thus, these transaction tokens may act as synchronization tokens. In a particular example, the coordinator node is responsible for synchronizing snapshot timestamps between the coordinator node and one or more worker nodes.

In step 1205, the coordinator node receives local transaction tokens from a first and at least a second worker node. In a particular example, the transaction tokens are local snapshot timestamps or local commit timestamps. The coordinator node, in step 1210, determines a synchronized transaction token using at least the local transaction tokens received from the first and the at least the second worker node. The coordinator node may determine the synchronized transaction token using additional tokens, such as a transaction token maintained by the coordinator node. In step 1215, the coordinator node sends the synchronized transaction token to the first and the at least the second worker nodes.

In specific examples, determining the transaction token includes comparing the transaction token values from the first and the at least the second worker node, and, optionally, the coordinator node, and selecting the highest value as the synchronized transaction token.

In some implementations, the coordinator node receives the transaction tokens from the first and the at least the second worker nodes at, or within, periodic intervals, such as determined or predetermined intervals. In further implementations, the coordinator node requests the transaction tokens from the first and the at least the second worker nodes at, or within, periodic intervals, such as determined or predetermined intervals.

FIG. 12B illustrates a synchronization process 1235 according to an implementation of this Example 5 for actions occurring at a first worker node in communication with a coordinator node. In particular examples, the first worker node is also in communication with at least a second worker node.

In optional step 1240, the worker node receives a request from the coordinator node for a local transaction token maintained by the first worker node. In particular implementations, the worker node receives the request from the coordinator node for the local transaction token at, or within, periodic intervals, such as determined or predetermined intervals. Alternatively, the worker node does not receive any requests from the coordinator node for local transaction tokens, but still periodically retrieves and sends local transaction tokens (block 1245) to the coordinator node. In some examples, the request may include additional information, such a transaction token maintained by the coordinator node (such as a GCT value based at least in part on a LCT value previously sent to the coordinator node), or a synchronization interval counter.

The first worker node retrieves and sends its local transaction token to the coordinator node in step 1245. For example, the first worker node may send its local transaction token to the coordinator node at, or within, periodic intervals, such as determined or predetermined intervals. In particular examples, the interval may be based on an interval occurring at another portion of the database system. For example, the interval could be an interval occurring at a coordinator node, and there could be some, at least in some implementations, typically minor, variation in when the first worker node sends its local transaction token to the coordinator node.

In step 1250, the first worker node receives a multi-node database statement, such as a query with read operations for data on multiple nodes. The first worker node receives a transaction token from the coordinator node in step 1255. In particular implementations, steps 1245 and 1255 are carried out at, or within, periodic intervals, such as determined or predetermined intervals.

The first worker node, in step 1260, determines a local transaction token based at least in part on the synchronized transaction token received from the coordinator node. The determined local transaction token indicates which version of data is visible during the execution of the multi-node database statement.

In one example, the first worker node assigns the transaction token received from the coordinator node as the local transaction token. In another example, the first worker node compares a current value of its local transaction token to the value of the transaction token or value received from the coordinator node and assigns the more current (such as a larger commit timestamp, or integer value) as the local transaction token.

Although FIG. 12B shows periodic synchronization cycles (1245, 1255, 1260, and optionally 1240) that are interleaved with query receipt and processing operations (1250, 1275), more generally, as indicated by line 1265, the synchronization cycles shown in FIG. 12B happen periodically, regardless of whether a query has been received with one or more statements and one or more transactions to process. When a query is received, the first worker node uses the synchronization information provided with periodic synchronization. Depending on implementation, the worker node can use a wait approach as implied in FIG. 12B (wait for the next synchronization with the coordinator node before executing the statement) or a no-wait approach (use the most recently received synchronization information from the coordinator node when executing the query).

In addition, the synchronization operations defined by line 1265 may occur a determined number of times before the execution of the multi-node statement in step 1275. The determined number of times is at least one time, but may be a greater number of times. In some cases, the line 1265 indicates a synchronization cycle (such as synchronization cycle with a single synchronization operation), with an interval between synchronization cycles. Or, as described above, two or more consecutive synchronization operations can be included in a synchronization cycle. In either case, the use of multiple synchronization operations, in one or more cycles, before executing multi-node statements can help provide snapshot monotonicity in the system by providing a second synchronization operation to account for local only write operations occurring at a worker node during a first synchronization operation.

In step 1275, after determining a new local transaction token, the first worker node executes the multi-node database statement. When the first worker node has forwarded the statement, or a portion of the statement, to at least a second worker node, the first worker node, in optional step 1280, receives execution results from the at least a second worker node. The first worker node may forward execution results to a database client in optional step 1285.

In further aspects of the present disclosure, the first worker node requests a local transaction token from at least a second worker node. For example, the first worker node may send the request to the at least a second worker node if the multi-node query remains unexecuted for a predetermined period of time. In another implementation, the first worker node analyses the multi-node statement to determine that the statement accesses records maintained at the at least a second worker node. The first worker nodes requests the local transaction token from the at least a second worker node when it determines that the statement accesses records maintained at the at least a second worker node. The first worker node receives the local transaction token from the at least a second worker node. In this aspect, determining a local transaction token in step 1270 can include comparing a local transaction token of the first worker node to the local transaction token received from the at least a second worker node and, for example, selecting the more current (such as a larger commit timestamp, or integer value) as the local transaction token of the first worker node.

In this aspect, other steps of the scenario 1200 may occur in a different order. For example, step 1280 could occur after steps 1285 and 1290, where steps 1285 and 1290 were carried out after receiving, and using, the local transaction token received from the at least a second worker node. In this scenario, the first worker node may carry out step 1285 again, in this case using the local transaction token maintained by the first worker node and a synchronized transaction token received from the coordinator node.

FIG. 12B illustrates receiving the synchronization token from the coordinator node before the determining in step 1270 or the executing in step 1275. This is consistent with the "wait approach" described above, according to which the first worker node, after receiving the multi-node database statement at block 1250, waits to receive the synchronized transaction token at block 1265 before determining the local transaction token at block 1270 and executing the multi-node database statement at block 1275.

It should be appreciated that steps shown in FIG. 12B may occur in another order. For example, for the "no-wait approach" describe above, the first worker node performs the determining the local transaction token at block 1270 and executing the multi-node database statement at block 1275 without waiting to receive the synchronized transaction token at block 1265. In this case, the first worker node uses the synchronization token it most recently received from the coordinator node. For the no-wait approach, the multi-node database statement can be received at block 1250 before or after the synchronized transaction token is received at block 1265 from the coordinator node. Example 6 illustrates variations of the no-wait approach.

EXAMPLE 6

Commencement of Multi-Node Statements without Waiting for New Synchronization According to another aspect of the present disclosure, protocols are provided that allow a multi-node statement to be executed without waiting for synchronization of a transaction token between the worker nodes and the coordinator nodes, or among the worker nodes themselves. For example, periodic synchronization may be happening in the background. In particular implementations, the protocol includes periodically synchronizing the transaction tokens, such as commitIDs (for example, a timestamp) of the worker nodes and a coordinator node. For example, the protocol of Example 6 may use the protocol described in Example 5 to synchronize transaction tokens used for snapshot isolation at a periodic interval. Statements can be executing without waiting for the most current synchronization transaction token, instead using the most recently received synchronization transaction token as in the "no-wait approach" described in Example 5.

Figure 13:
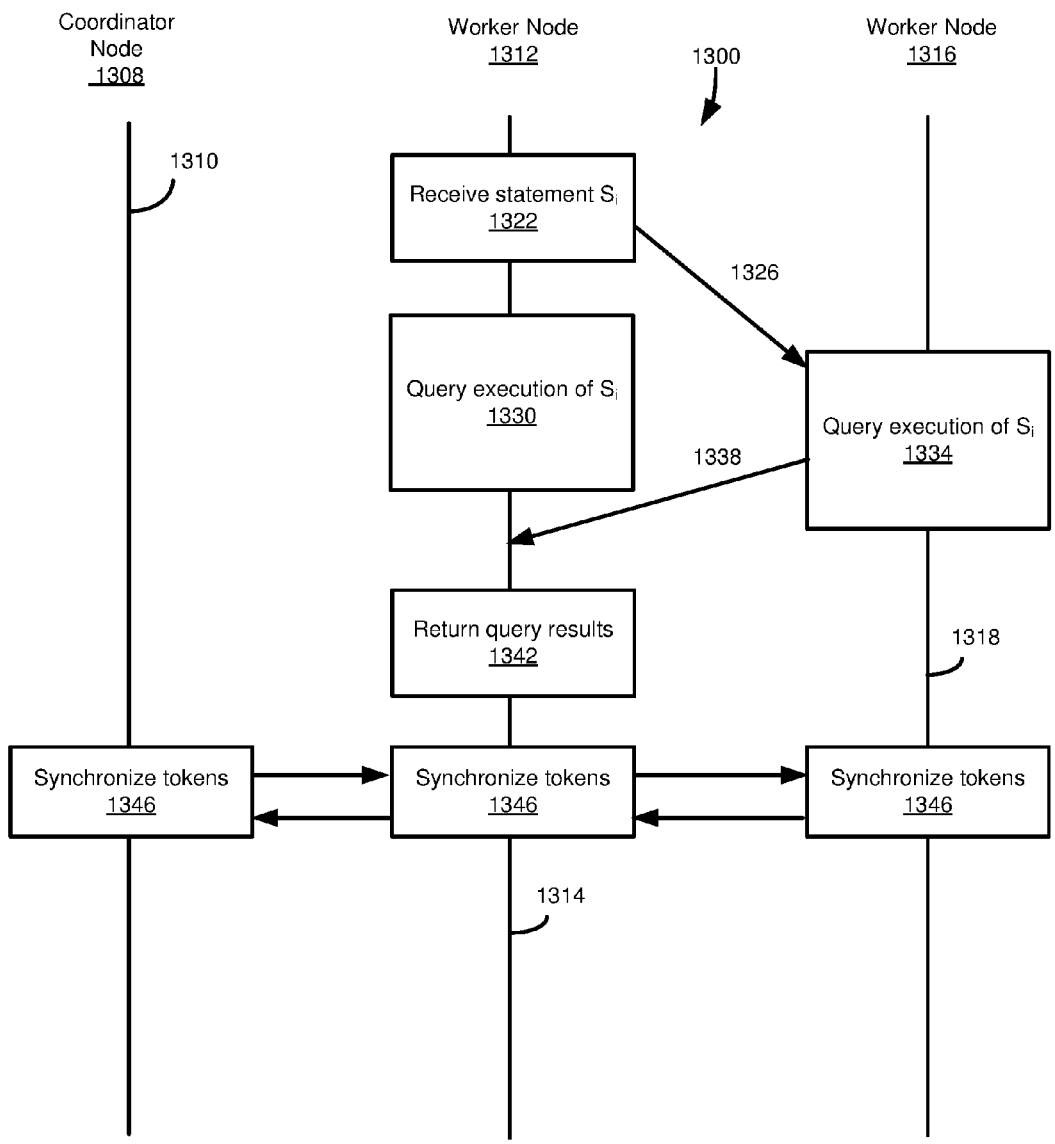
FIG. 13 is a diagram illustrating operations occurring at a coordinator node and first and second worker nodes during execution of a multi-node database statement without requiring communication by the first or second worker nodes with the coordinator node.

FIG. 13 illustrates a scenario 1300 of this Example 6, depicting a particular scenario using a protocol according this Example 6. In the scenario 1300, a system includes a coordinator node 1308, a worker node 1312, and a worker node 1316, with respective execution timelines 1310, 1314, 1318. In block 1322, worker node 1312 receives a multi-node statement $S_i$ that includes read operations. Without waiting to synchronize transaction tokens, such as commit timestamps, between the worker nodes 1312, 1316, or between the coordinator node 1308 and the worker nodes 1312, 1316, the worker node 1312 sends $S_i$, or portions of $S_i$ executable at worker node 1316, to worker node 1316 in communication 1326.

In some cases, statement $S_i$ may include a token that indicates that a protocol of this Example 6 should be used, such as being used rather than another protocol, for example, rather than strictly following the protocol of Example 5. For example, when a database session is initiated, it can be decided, such as automatically by the database system, for example, based on settings made by a database administrator, or by a user, that the session may use a protocol of this Example 6. The database or user may, for example, determine that it is not significant whether query results include some possibly outdated information, or may determine that the information is likely to be up to date before the data will be accessed.

In other examples, individual queries may be selected to use a protocol according to this Example 6. In a particular implementation, a query may be set, such as automatically by the database system, for example, based on settings made by a database administrator, or by a user, such that the query uses a protocol of this Example 6. In a specific example, the query may be set to use a protocol of this Example 6 if a delay in executing all or a portion of a query exceeds a predetermined threshold, or upon manual intervention of a user. In this way, a query may continue with possibly outdated data rather than delaying query execution for an undesirably long period of time.

Worker nodes 1312 and 1316 execute query $S_i$ in blocks 1330, 1334 respectively. Worker node 1316 sends execution results to worker node 1312 in communication 1338. Worker node 1312 returns execution results to a database client in process 1342.

The coordinator node 1308, worker node 1312, and worker node 1316 synchronize transaction tokens, such as a timestamps, in process 1346. For example, synchronization may be carried out as described above in Example 5, including carrying out more than one synchronization operation in a synchronization cycle.

Although synchronization process 1346 is shown as being carried out after query results have been returned to the client in process 1342, process 1346 may occur at other times. For example, process 1346 could be carried out after worker node 1312 sends communication 1326 to worker node 1316 and before query results are returned to the client in process 1342, or the synchronization process 1346 could be carried out before worker node 1312 sends communication 1326 to worker node 1316. More generally, the synchronization in block 1346 happens periodically, regardless of whether a query has been received with one or more statements and one or more transactions to process. When a query is received, the worker nodes 1312, 1316 use the most recent synchronization information provided with periodic synchronization, without waiting for another round of synchronization to finish.

As described above, by allowing multi-node queries to be executed at remote worker nodes without waiting to synchronize transaction tokens, it is possible that the query may access some data that is out of date. Periodic synchronization of the transaction tokens of the worker nodes 1312, 1316, such as using the protocol of Example 5, reduces the chances of changes at a remote node not being visible to a query, particularly if the interval between synchronizations is relatively low, such as being on a comparable timescale as the rate that changes are made to remote nodes.

In at least certain implementations, a database session has access to all changes made during the session, regardless of the node to which the changes were made. In these implementations, the chance of a query accessing out of date information is further reduced, as changes made during the same session will be visible to the query. For example, a database session may include a session context that includes a transaction token representing the last (most recent) commit timestamp or snapshot timestamp assigned to any event of the session. So, when a new statement is started in the session, if the LCT of the node receiving the statement is smaller than the session context transaction token, the LCT of the node is set to the value of the session context transaction token. In this way, the snapshot timestamp assigned to the new statement will be at least as large as the session context transaction token, and thus prior events in the session will be visible to the new statement. If the LCT value of the node is equal to or greater than the session context transaction token, the session context transaction token is assigned the current LCT value of the node.

Similarly, when a write transaction commits at a node during a session, the write increments the LCT of the node and is assigned as the transaction commit ID. The session context transaction token is set to this updated value. As described above, any new statement will have a snapshot value at least as large as the incremented LCT value, and thus the committed transaction will be visible to later statements within the same session.

Figure 14:
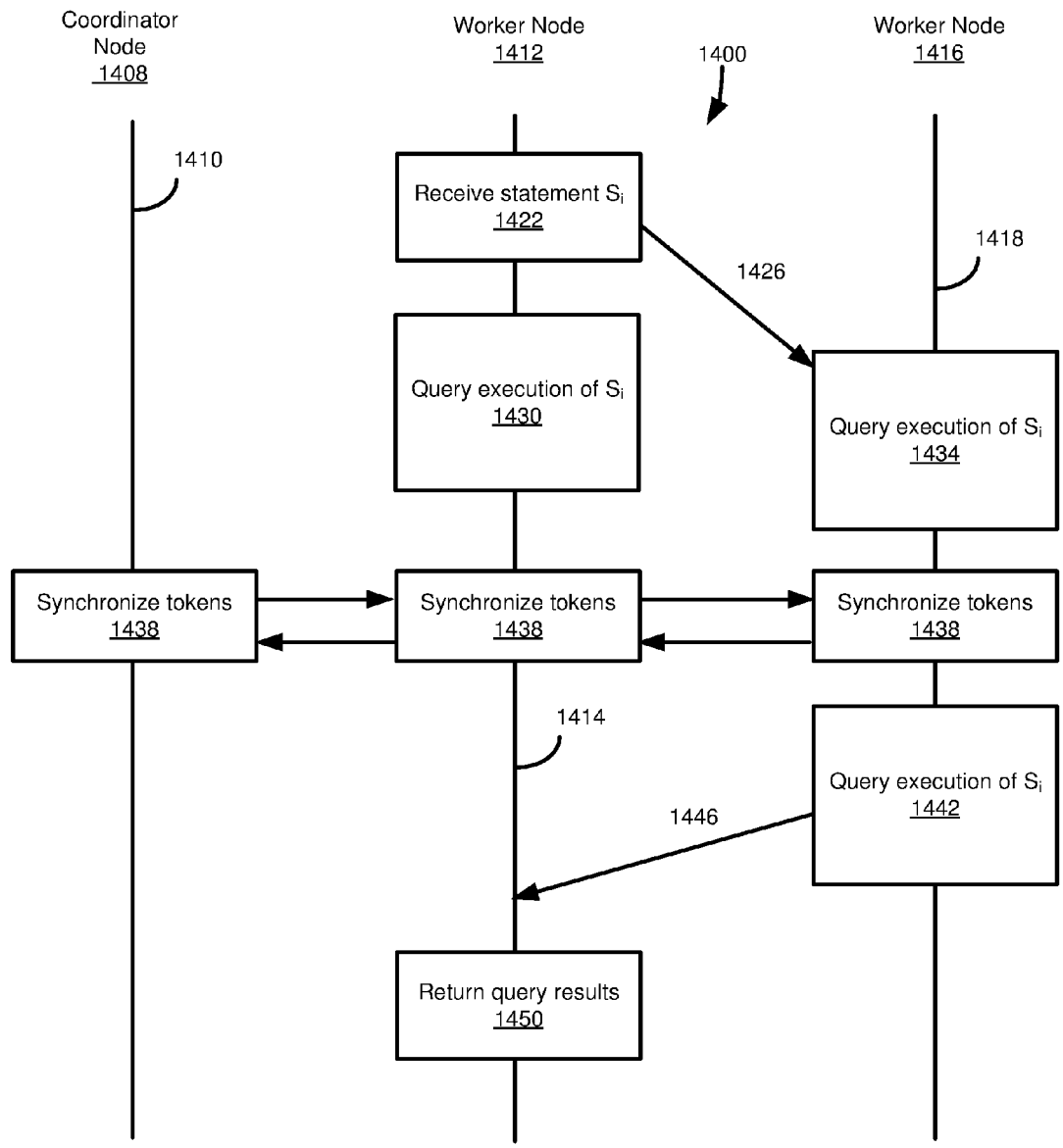
FIG. 14 is a diagram illustrating operations occurring at a coordinator node and first and second worker nodes during execution of a multi-node database statement with synchronization of transaction tokens of the first and second worker nodes occurring during execution of the multi-node database statement.

FIG. 14 illustrates another scenario for a protocol according to this Example 6. In the scenario 1400, a system includes a coordinator node 1408, a worker node 1412, and a worker node 1416, with respective execution timelines 1410, 1414, 1418. In block 1422, worker node 1412 receives a multi-node statement $S_i$ that includes read operations, such as a database query. Without waiting to synchronize a transaction token, such as a local transaction token maintained by the first worker node, with the coordinator node 1408, the worker node 1412 sends the statement, or components of the statement executable at worker node 1416, to worker node 1416 in communication 1426. The worker nodes 1412, 1416 execute query $S_i$ in blocks 1430 and 1434, respectively.

In process 1438, the worker nodes 1412, 1416 synchronize their transaction tokens with the coordinator node 1408, such as using the protocol of Example 5. Again, the synchronization can include more than one synchronization operation in a synchronization cycle. Although synchronization process 1436 is shown after query execution 1430, 1434, process 1446 may occur at other times. Generally, the synchronization in block 1346 happens periodically, regardless of whether a query has been received with one or more statements and one or more transactions to process. When a query is received, the worker nodes 1412, 1416 use the most recent synchronization information provided with periodic synchronization, without waiting for another round of synchronization to finish.

When worker node 1416 determines the appropriate transaction token, it can restart the query $S_i$ in block 1442, using the updated transaction token of the worker node 1416. For example, the worker node 1416 may determine if any records accessed by $S_i$ have a newer transaction token than the transaction token used at block 1434. If so, the statement $S_i$ may be restarted. That is, the statement can be restarted using the updated transaction token, rather than the original transaction token received from the worker node 1412. In this way, the chances of a query encountering inconsistent data are further reduced.

In other examples, with continued reference to FIG. 14, in block 1434, worker node 1416 executes the statement $S_i$ for records that have not been updated since the transaction token, such as a timestamp, assigned to $S_i$ by the worker node 1412. If records are identified having a later transaction token, processing of those records may be delayed until the synchronization process 1438 has been carried out, with the remainder of statement $S_i$ being carried out in block 1442. Waiting for an updated transaction token can help ensure that the statement sees the correct record versions.

Query results are returned to the worker node 1412 by the worker node 1416 in communication 1446. In block 1450, worker node 1412 returns query results to a database client.

Figure 15:
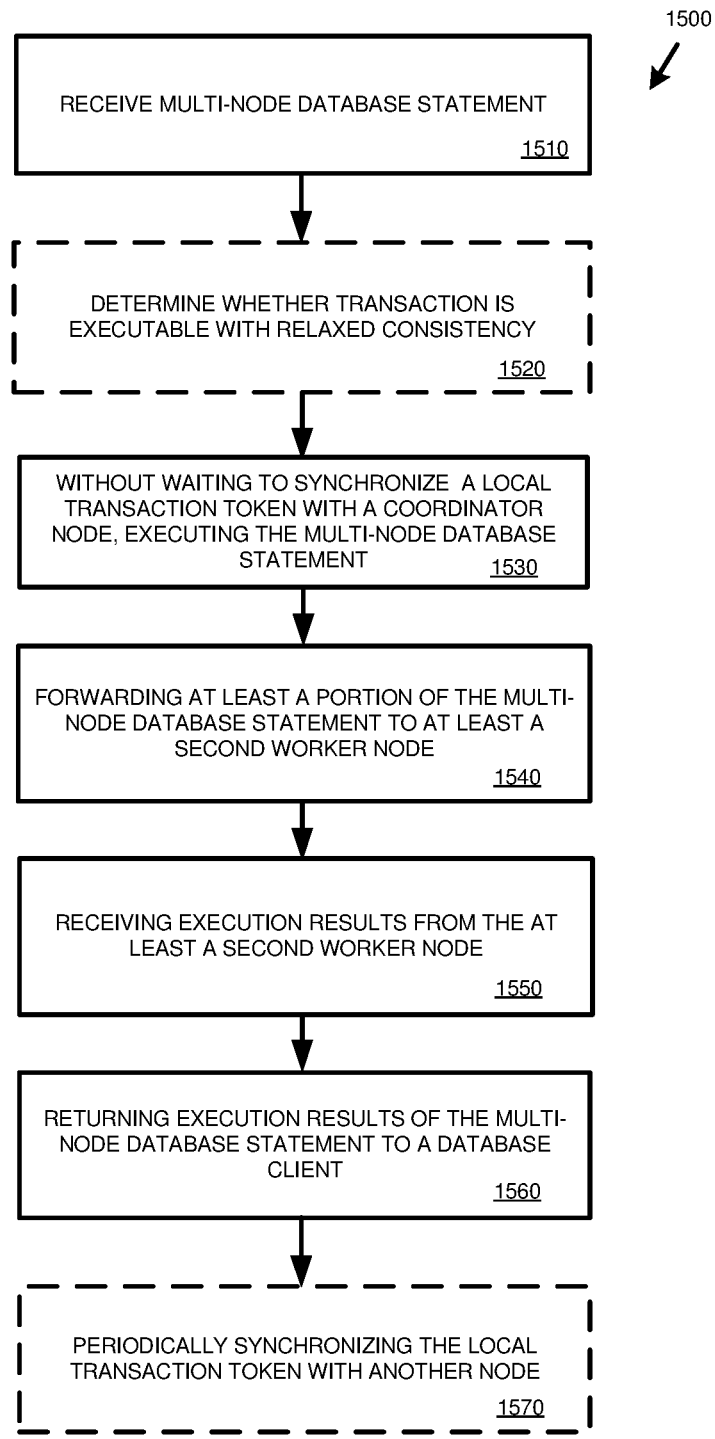
FIG. 15 is a flowchart of an example method summarizing actions occurring at a first worker node during an embodiment of the present disclosure for executing a multi-node statement involving at least a second worker node without waiting to synchronize with a coordinator node.

FIG. 15 presents a flowchart of a method 1500 representing actions at a first worker node in at least certain implementations of the present disclosure. In step 1510, the first worker node receives a multi-node database statement, such as a query that accesses records maintained by the first worker node and records maintained by at least a second worker node. In optional step 1520, the first worker node determines whether the multi-node transaction is executable with relaxed consistency. For example, the first worker node may determine whether a flag or field has been set indicating that the transaction may be processed with relaxed consistency (as in Example 6) or without relaxed consistency (as in the "wait approach" of Example 5). In another example, the first worker node may determine that the transaction is associated with a database session indicated as having transactions that can be executed with relaxed consistency.

In step 1530, without waiting to synchronize a local transaction token maintained by the first worker node with a transaction token maintained by a coordinator node, the first worker node executes at least a portion of the multi-node statement. The local transaction token indicates data versions visible during the execution of the multi-node statement. The first worker node, in step 1540, forwards at least a portion of the multi-node statement to the at least a second worker node for execution. Steps 1530 and 1540 may occur in a different order, for example, step 1540 may be carried out before step 1530, or steps 1530 and 1540 may be carried out in parallel.

The first worker node receives execution results from the at least a second worker node in step 1550. In step 1560, the first worker node returns execution results of the multi-node database statement to a database client.

In optional step 1570, the first worker node synchronizes its local transaction token with another node, such as a coordinator node or the at least a second worker node. In a particular example, the synchronization is carried out as described in Example 5, including optionally using a synchronization cycle that includes more than one synchronization operation. Alternatively, step 1570 is carried out in a different order. However, the execution of the query by the first worker node in step 1530, and the forwarding in step 1540, are carried out independently of the synchronization of step 1570. Although FIG. 15 shows periodic synchronization operations (1570) after query receipt and processing operations (1510, 1530, 1540), more generally, in particular aspects of the present disclosure, the synchronization operations shown in FIG. 15 happen periodically, regardless of whether a query has been received with one or more statements and one or more transactions to process. When a query is received, the first worker node uses the synchronization information provided with periodic synchronization, using the most recently received synchronization information from the coordinator node when executing the query at block 1530.

EXAMPLE 7

Selection of Distributed Database Transaction Protocol

In at least certain embodiments of the present disclosure, a database system may be configured to implement a plurality of distributed database transaction protocols, such as snapshot isolation protocols. The database system may be configured to automatically select a distributed database transaction protocol based on one or more factors, or an operator, such as a user or database administrator, may select a distributed database transaction protocol based on such factors. The factors may include one or more of the number of nodes in the database system, the relative amounts of multi-node queries and local queries, the communication speed between nodes, and the nature of the queries, including the acceptability of the query accessing out-of-date records.

For example, when the number of nodes is relatively low, a distributed database transaction protocol that provides more frequent communication, and/or synchronization, between worker nodes and a coordinator node may provide a desirable balance between network and processing loads at the coordinator node, transactional consistency, and transaction throughput. For example, the distributed database transaction protocol of Example 4 can be particularly useful when the number of worker nodes is comparatively low, such as being less than about 100 nodes, such as less than about 75, about 70, about 65, about 60, about 55, about 50, about 45, about 40, about 35, about 30, about 25, about 20, about 15, about 10, or about 5 nodes, such as less than less than 75, 70, 65, 60, 55, 50, 45, 40, 35, 30, 25, 20, 15, 10, or 5 nodes.

As the number of nodes increases, it may be desirable to select a distributed database transaction protocol that reduces communication with the coordinator node, such as the distributed database transaction protocol of Example 5 or Example 6. For example, the distributed database transaction protocol of Example 5 or Example 6 may be particularly useful when the number of worker nodes is comparatively large, such as systems with at least 55; 60; 75; 80; 85; 90; 95; 100; 125; 150; 175; 200; 225; 250; 500; 1,000; 1,250; 1,500; 2,000; 2,500; 5,000; 10,000; 12,500; 15,000; 20,000; 25,000; or 50,000 nodes. Reducing the amount of communication with the coordinator node can facilitate using a larger number of worker nodes. However, such protocols can result in lower transaction throughput, or increased transaction processing times, due to longer intervals between communications between the coordinator node and the worker nodes. In some cases, such as described in Example 6, these delays can be potentially reduced by lowering the level of consistency provided by the distributed database transaction protocol.

A database system may simultaneously operate a plurality of distributed database transaction protocols. For example, certain nodes, tables, or records may be selected to operate using a first distributed database transaction protocol, with other nodes, tables, or records using a second distributed database transaction protocol. In some examples, the first and second distributed database transaction protocols, are the same, while in other examples they are different.

Figure 16:
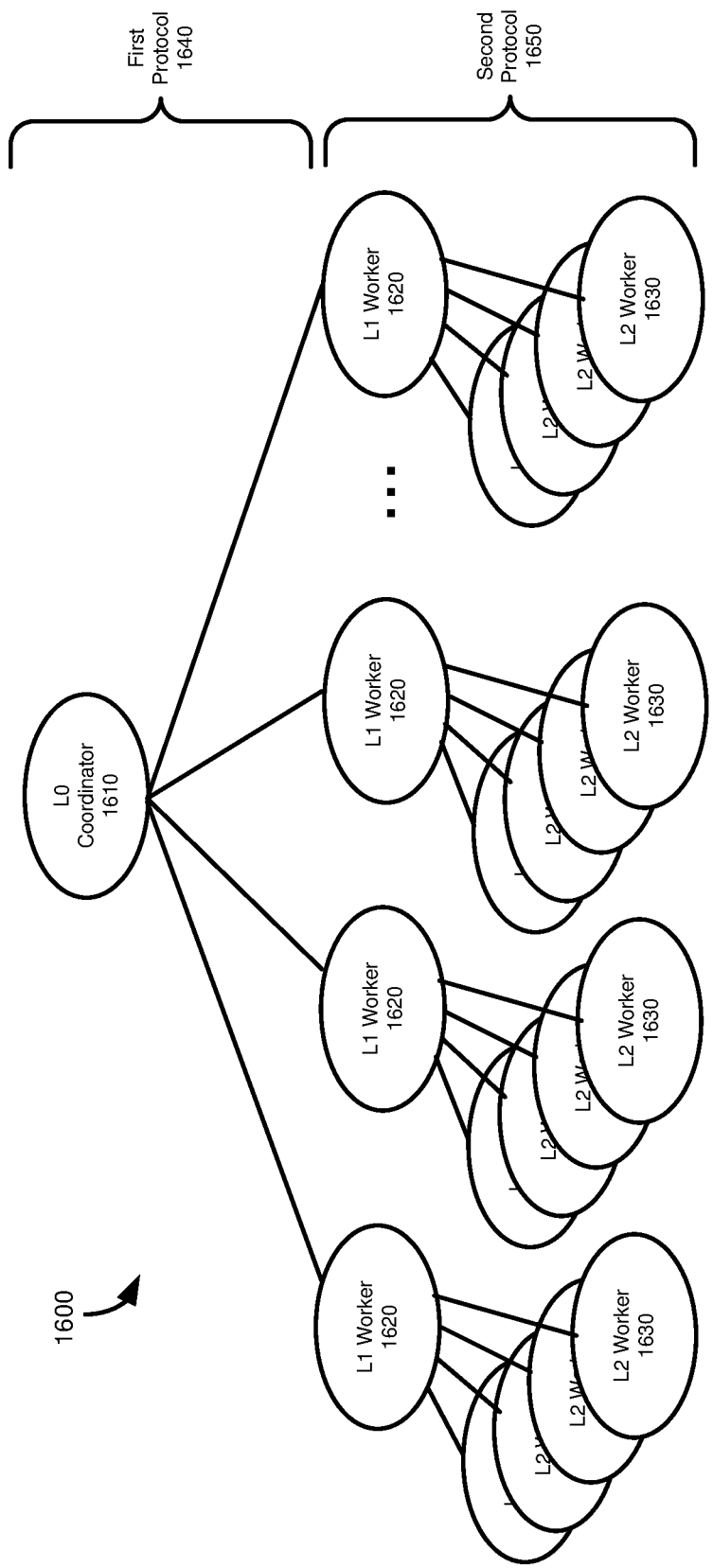
FIG. 16 is a diagram illustrating a database system having a hierarchical relationship between a coordinator node, a first plurality of first worker nodes, and a second plurality of second worker nodes.

FIG. 16 illustrates a database system 1600 having a hierarchical arrangement and simultaneously operating first and second distributed database transaction protocols. The database system 1600 includes a coordinator node 1610 connected to a plurality of level 1 worker nodes 1620. Each of the level 1 worker nodes 1620 is in turn in communication with a plurality of level 2 worker nodes 1630. Although not shown, in at least certain implementations of this Example 7, each of the level 1 worker nodes 1610 may be in communication with other level 1 worker nodes 1610. Similarly, the level 2 worker nodes 1620 may be in communication with one another. Although FIG. 16 illustrates a three-tiered system, the same principles can be used in systems with larger numbers of tiers.

A first distributed database transaction protocol 1640 may be used between the coordinator node 1610 and the level 1 worker nodes 1620. For example, if the number of level 1 worker nodes 1620 is relatively small, a distributed database transaction protocol, such as the distributed database transaction protocol of Example 4, that involves more frequent communication between the level 1 worker nodes 1620 and the coordinator node 1610 may be used. Typically, the number of level 2 worker nodes 1630 associated with each level 1 worker node 1620 is larger than the number of level 1 worker nodes 1620 associated with the coordinator node 1610. For example, the number of level 2 worker nodes for each level 1 worker node 1620, and the number of level 2 worker nodes 1630 overall, may be relatively large.

Each level 1 worker node 1620 may act as a coordinator node with respect to its associated level 2 worker nodes 1630. In FIG. 16, a second distributed database transaction protocol 1650 is used between each of the level 1 worker nodes 1620 and its associated level 2 worker nodes 1630. In some implementations, the first and second distributed database transaction protocols 1640, 1650 are the same. However, in other implementations, the first and second distributed database transaction protocols 1640, 1650 are different. For example, the distributed database transaction protocol 1650 may be a distributed database transaction protocol that provides comparatively fewer communications with the coordinator node, such as the distributed database transaction protocols of Example 5 or 6.

The hierarchical arrangement of FIG. 16 may be particularly useful when data within the database system 1600 is organized such that queries typically operate locally on a particular level 1 worker node 1620 and its associated level 2 worker nodes 1630. In this situation, such as when the distributed database transaction protocol of Example 4 is used, local queries may run on the level 1 worker node 1620 and its level 2 worker nodes 1630 without communicating with the coordinator node 1610. However, the transaction tokens of the L1 worker nodes 1620 are typically synchronized with the coordinator node 1610 during the commit process, and when a multi-node query is initiated by a level 1 worker node 1620.

When the distributed database transaction protocol 1650 used between the level 1 worker nodes 1620 and the level 2 worker nodes 1630 involves less frequent communication with the coordinator node (in this case, the particular level 1 worker node 1620), transaction throughput may be somewhat lower than under a distributed database transaction protocol with more frequent communication with the coordinator node. However, the network load at the coordinator node may be significantly reduced. For example, in some cases, such as when multiple communications between coordinator and worker nodes are required for a synchronization process, the network load at the coordinator may reduce faster than the throughput decreases. Additionally, distributing the level 2 worker nodes 1630 among a plurality of level 1 worker nodes 1620 can allow a greater number of nodes to be used in the system 1600 without incurring the more significant decrease in throughput that may occur if all of the worker nodes were in communication with a single coordinator node.

Figure 17:
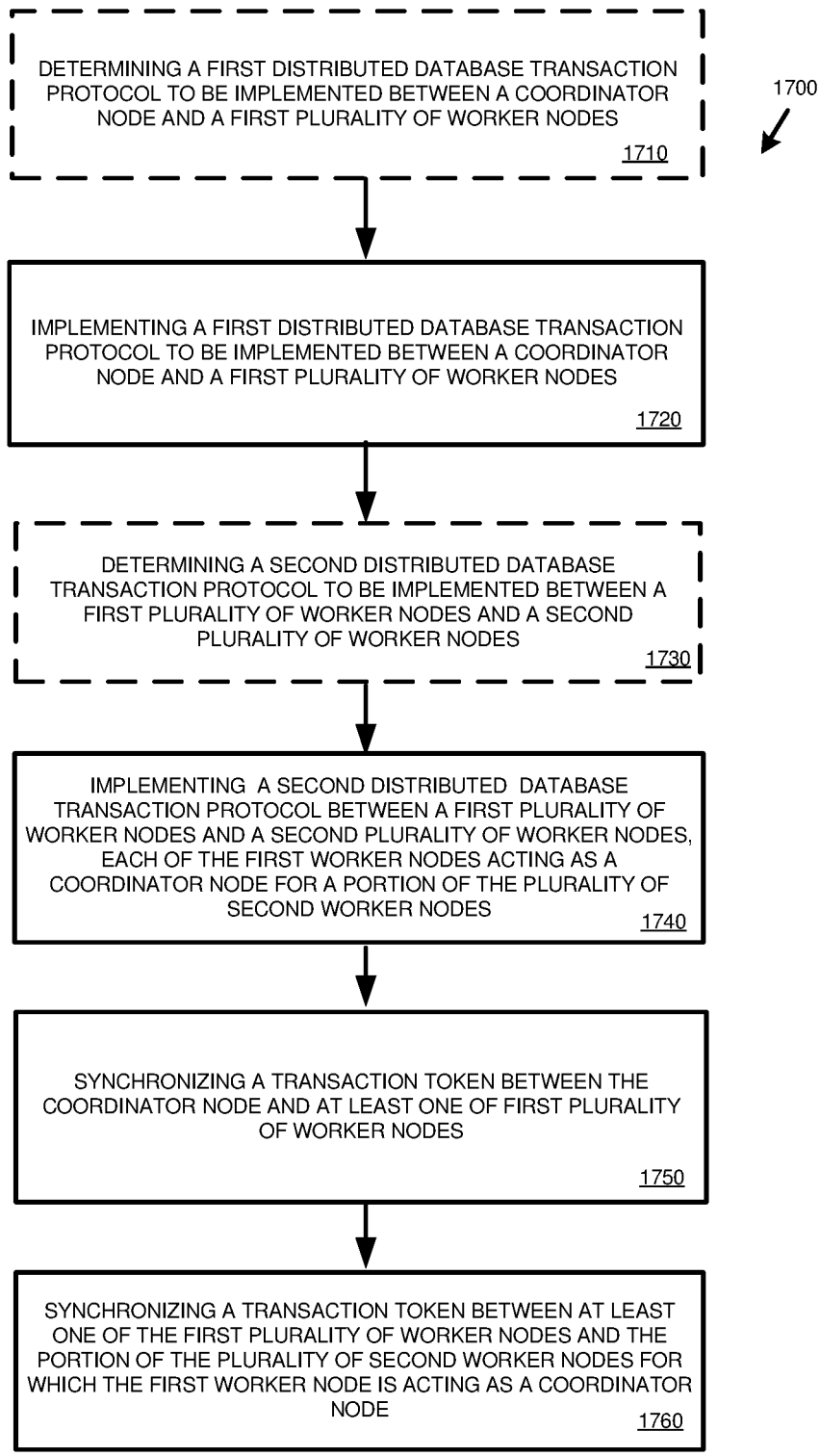
FIG. 17 is a flowchart of an example method for implementing first and second database transaction protocols in the database system of FIG. 16.

FIG. 17 illustrates a method 1700 of operating a database system having a coordinator node, a first plurality of worker nodes, and a second plurality of worker nodes. In optional step 1710, a first distributed database transaction protocol to be implemented between the coordinator node and the first plurality of worker nodes is determined. In one example, the first distributed database transaction protocol is determined by a user, such as a database administrator. In another example, the first distributed database transaction protocol is determined by the database system. The first distributed database transaction protocol may be determined, in various examples, by the number of the first plurality of worker nodes in the database system, the number of the second plurality of worker nodes in the database system, or the number of database operations accessing more than one of the first plurality of worker nodes, more than one of the second plurality of worker nodes, or more than one of the first plurality of worker nodes and more than one of the second plurality of worker nodes.

In step 1720, a first distributed database transaction protocol is implemented between the coordinator node and the first plurality of worker nodes.

In optional step 1730, a second distributed database transaction protocol to be implemented between the first plurality of worker nodes and the second plurality of worker nodes is determined. In one example, the second distributed database transaction protocol is determined by a user, such as a database administrator. In another example, the second distributed database transaction protocol is determined by the database system. The second distributed database transaction protocol may be determined, in various examples, by the number of the first plurality of worker nodes in the database system, the number of the second plurality of worker nodes in the database system, the number of database operations accessing more than one of the first plurality of worker nodes, more than one of the second plurality of worker nodes, or more than one of the first plurality of worker nodes and more than one of the second plurality of worker nodes, or the first distributed database transaction protocol used between the coordinator node and the first plurality of worker nodes.

In step 1740, a second distributed database transaction protocol is implemented between the first plurality of worker nodes and the second plurality of worker nodes. In one example, the first and second distributed database transaction protocols are the same. In another example, the first and second distributed database transaction protocols are different. In a specific example, the first distributed database transaction protocol is a protocol according to Example 4 and the second distributed database transaction protocol is a protocol according to Examples 5 or 6.

A transaction token is synchronized between the coordinator node and at least one of the first plurality of worker nodes in step 1750, according to the first distributed database transaction protocol. In step 1760, according to the second distributed database transaction protocol a transaction token is synchronized between at least one of the first plurality of worker nodes and a portion of the plurality of second worker nodes for which the first worker node is acting as a coordinator node.

EXAMPLE 8

Transaction Commit

Figure 18:
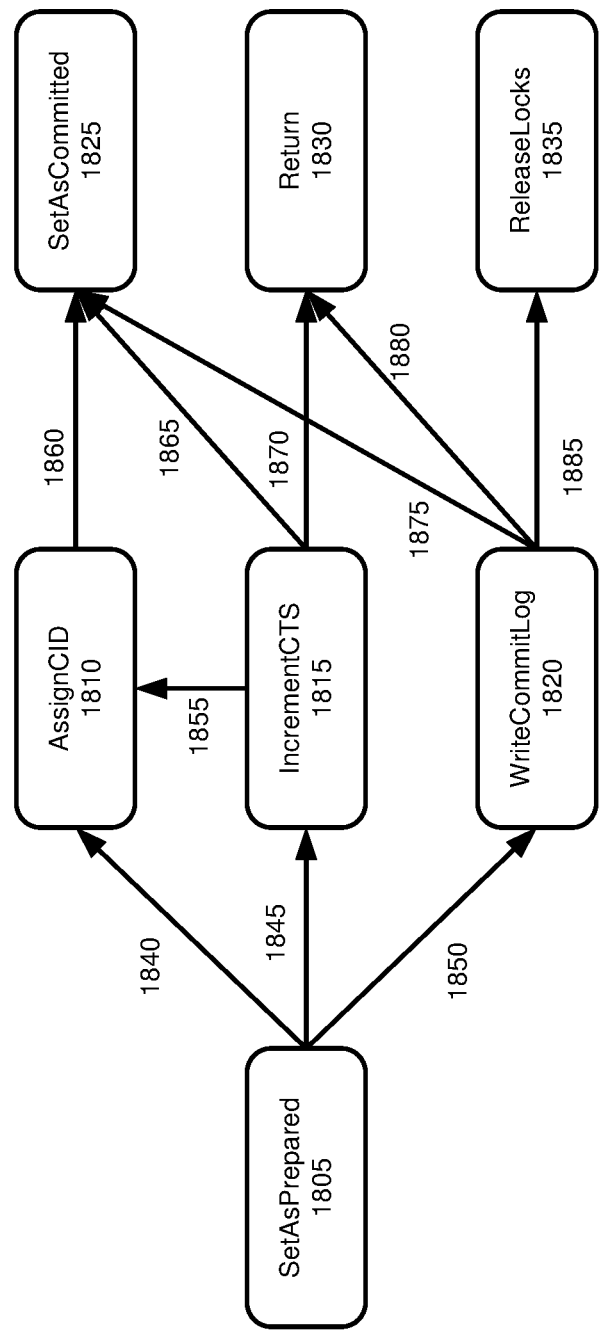
FIG. 18 is a diagram illustrating an operation ordering that may be used with at least certain implementations of a disclosed distributed transaction protocol.

This Example 8 describes a transaction commit protocol according to an embodiment of the present disclosure, which may have different implementations depending on the write transaction type. Commit protocols according to at least certain embodiments of the present disclosure have a common set of sub-operations (Table 2) and employ the same ordering rules among those sub-operations (FIG. 18). This transaction commit protocol may be used in conjunction with one or more of the snapshot isolation protocols of the present disclosure, such as those described in any of Examples 4-7, or it may be used separately.

TABLE 2

Sub-operations of transaction commit

| ID | Description |
| --- | --- |
| SetAsPrepared | Set the transaction's status as precommitted |
| IncrementCTS | Increment GCT or LCT depending on where it commits |
| AssignCID | Assign the transaction its CID value and associate it with the transaction's created record versions |
| WriteCommitLog | Write the transaction's commit log to persistent storage |
| SetAsCommitted | Set the transaction's status as committed |
| ReleaseLocks | Release all the write locks acquired by the |

TABLE 2-continued

Sub-operations of transaction commit

| ID | Description |
|---|---|
| Return | Acknowledge the completion of the transaction's commit to the client which requested it |

A write transaction's status becomes precommitted by SetAsPrepared until SetAsCommitted is called later for the transaction. As previously mentioned, this in-doubt state can be used by the delayed visibility decision scheme to help ensure the atomicity of IncrementCTS and AssignCID of a write transaction without relying on any latching or locking during transaction commit processing. When IncrementCTS is called, GCT or LCT is incremented depending on which type of node it commits. Based on the new GCT or LCT value, the transaction's CID is decided at AssignCID. When WriteCommitLog is called, the write transaction generates a commit log entry and writes it to persistent storage, then calls SetAsCommitted that sets the transaction's status as committed, and then calls ReleaseLocks, which releases all the write locks acquired by the transaction. If SetAsCommitted is finished, the write transaction's created record versions can be potentially visible to other readers. If ReleaseLocks is finished, then the write transaction's changed records can be potentially changed again by other writers. Note that, following the multi-version concurrency control approach, a write operation of a transaction acquires a write lock on the changed record, but read operations do not acquire any lock. Finally, at Return, the transaction's commit is acknowledged to the client which requested it.

Among these suboperations, a predefined execution order is typically maintained to help ensure transactional consistency, which is shown in FIG. 18. For operation boxes 1805, 1810, 1815, 1820, 1825, 1830, 1835, arrows 1840, 1845, 1850, 1855, 1860, 1865, 1870, 1875, 1880, 1885 indicate that the operation at the tail end of the arrow should be executed before the operation at the head of the arrow.

The execution order 1875, between WriteCommitLog 1820 and SetAsCommitted 1825, and the execution order 1880 between WriteCommitLog 1820 and Return 1830, should typically be maintained in order to help provide snapshot monotonicity. Otherwise, snapshot monotonicity may not occur, because once visible data might not be visible any more after crash restart. Execution order 1885, between WriteCommitLog 1820 and ReleaseLocks 1835, should also typically be maintained, as it provides two-phase locking. Otherwise, uncommitted data can be changed again by another transaction, potentially leading to a cascaded rollback problem.

Without maintaining execution order 1860, between AssignCID 1810 and SetAsCommitted 1825, a record version that should be visible to a query may not be visible because the CID assignment to the record version is not yet finished. Without execution order 1865, between IncrementCTS 1815 and SetAsCommited 1825, and execution order 1870, between IncrementCTS 1815 and Return 1830, commit-marked or commit-informed data might not be visible even to its next query of the same session because the next query may start with a smaller snapshot timestamp value than the previously committed transaction's CID value.

Execution order 1855, between IncrementCTS 1815 and AssignCID 1810, also helps provide snapshot isolation. For example, if IncrementCTS 1815 is performed after AssignCID 1810, a query that started before a write transaction T1's IncrementCTS 1815 operation could see T1's changes later because the STS value assigned to the query could be identical to T1's CID value. SetAsPrepared 1805 should typically be executed before WriteCommitLog 1820 (transaction order 1850) as well as before IncrementCTS 1815 and AssignCID 1810 (execution orders 1845 and 1840, respectively), since these two suboperations should be made effective for other transactions in an atomic way. For example, if IncrementCTS 1815 is completed, but AssignCID 1810 is not yet finished for a write transaction T1, then a different reader statement S1 can have STS(S1)>=CID(T1). However, since T1 does not yet have any CID, S1 can interpret T1's created versions as invisible but suddenly they will become visible when T1 finishes AssignCID, which will violate snapshot isolation.

Figure 19:
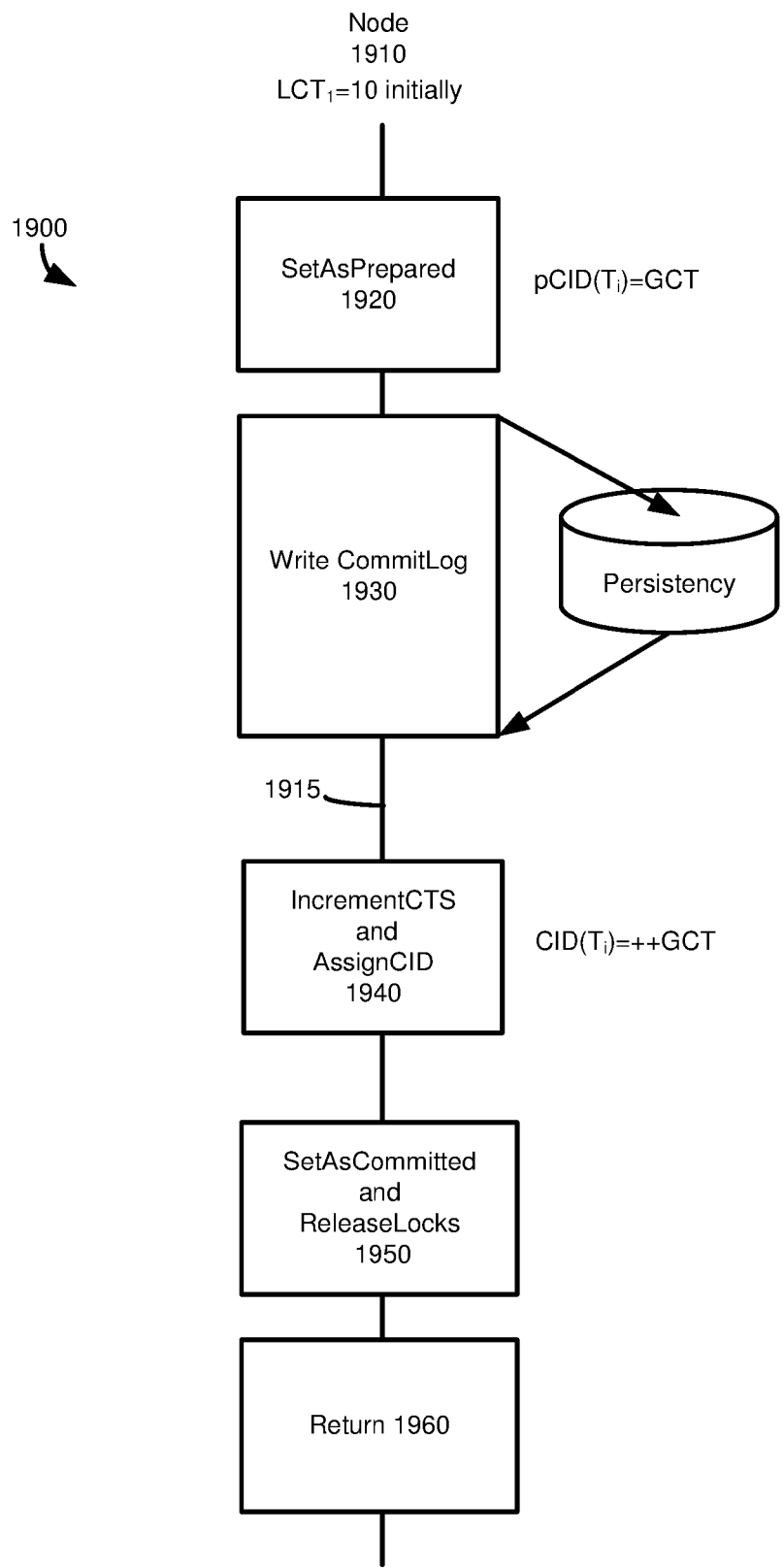
FIG. 19 is a diagram illustrating how a write transaction commits, using at least certain implementations of a disclosed distributed transaction protocol, when it has only updated tables at a coordinator node.

FIG. 19 depicts a scenario 1900 illustrating how a write transaction commits when it has updated only the tables in a coordinator node 1910 having an execution timeline 1915. The GCT is available locally in this scenario. The suboperations of the transaction commit are ordered as: SetAsPrepared 1920, writeCommitLog 1930, Increment-CTS and AssignCID 1940, SetAsCommitted and ReleaseLocks 1950, and Return 1960, which meets the ordering structure shown in FIG. 18.

Figure 20:
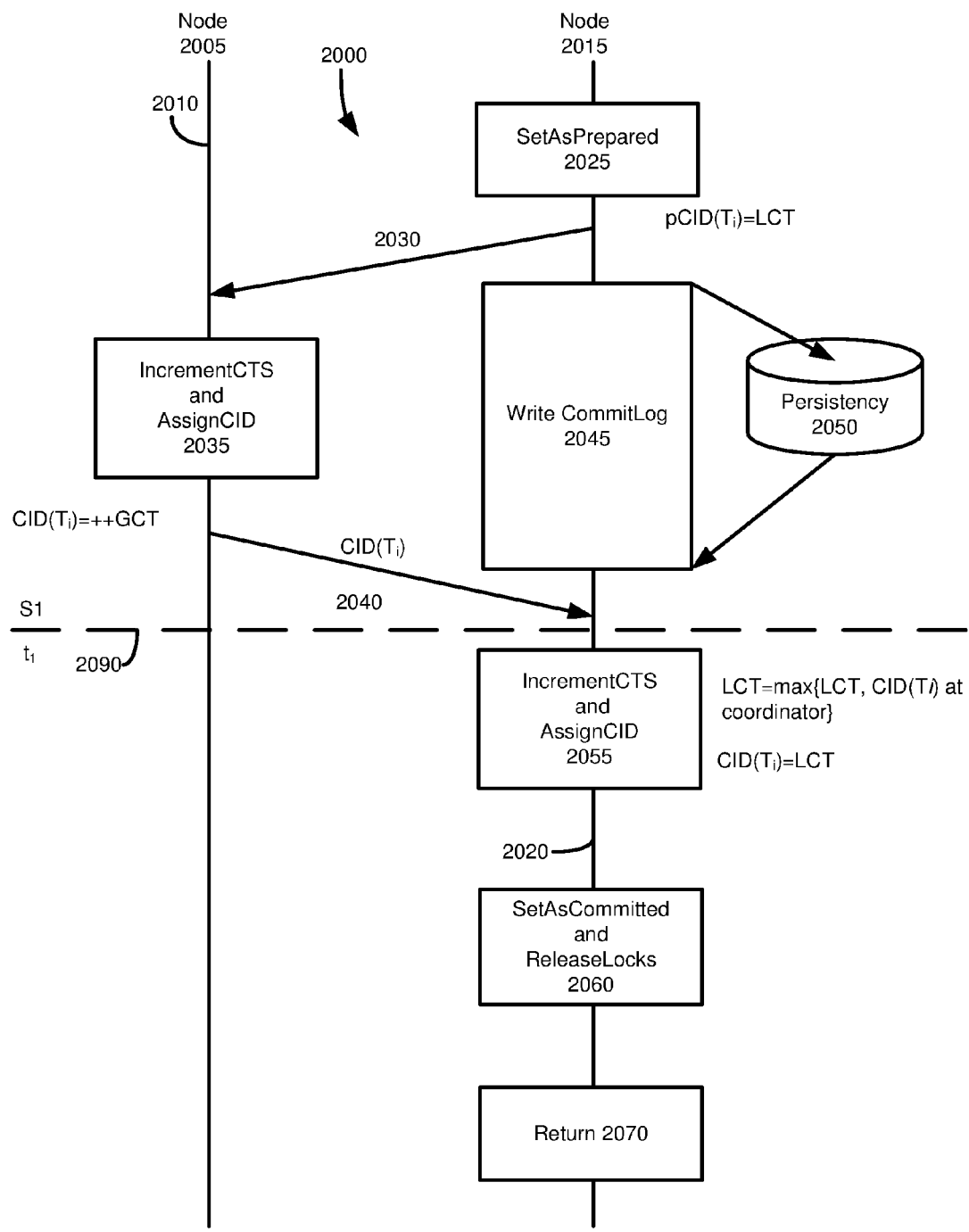
FIG. 20 is a diagram illustrating how a write transaction commits, using at least certain implementations of a disclosed distributed transaction protocol, when it has only updated tables at a single worker node.

FIG. 20 depicts a scenario 2000 in a system having a coordinator node 2005 and a worker node 2015, with respective execution timelines 2010, 2020, illustrating how a write transaction commits when it has updated the tables located at the single worker node 2015. The worker node 2015 synchronizes its local transaction token, such as its LCT, with a global transaction token, such as the GCT, maintained by the coordinator node 2005. Thus, even local-only write transactions of different nodes are ordered by GCT, which can help provide snapshot monotonicity.

In FIG. 20, execution timeline 2020 of worker node 2015 begins by setting transaction $T_i$ as prepared, or precommitted, in SetAsPrepared block 2025. Worker node 2015 then makes a call 2030 to increment a transaction token (such as the CTS) at the coordinator node 2005 (which is a global transaction token, such as the GCT) and assign a transaction token (such as a CID) for $T_i$ at the coordinator node 2005 in process block 2035. The GCT increment operation (call 2030, IncrementCTS and AssignCID 2035, and return communication 2040 with the assigned CID for $T_i$) is called in parallel with the WriteCommitLog process 2045 at worker node 2015, where the log is written to persistent storage 2050.

Since WriteCommitLog 2045 involves synchronous persistency I/O for transaction durability, overlapping the network I/O with the log persistency I/O can substantially hide the cost of the newly added network I/O operation. Although overlapping the network I/O (communications 2030, 2040) with the persistency I/O can help reduce the transaction commit latency, the overall throughput can be eventually bound by the network bandwidth of the coordinator node 2005. Thus, in particular examples of the disclosed distributed database transaction protocol, the network calls initiated from concurrent transactions are grouped and coalesced to a single network call, like the group commit operation for log persistency I/O. The commit log entry of the single-node write transaction at the worker node 2015 is written to the local log volume 2050 of the worker node 2015 without making any additional round trip to the coordinator node 2005. During recovery of the worker node 2015, node-local write transaction commits can be decided by the worker node 2015 without coordination or communication with the coordinator node 2005.

The IncrementCTS (the LCT of worker node 2015) and AssignCID operations in process block 2055 use the results of the GCT increment in block 2035, incrementing the CTS (LCT of node 2015) as shown. As discussed above, the GCT increment operation 2035 involves a synchronous network round trip between the worker node 2015 and the coordinator node 2005.

In case the network operation with the coordinator 2005 node, needed for IncrementCTS and AssignCID in operation 2055, fails, while the log persistency I/O succeeds in block 2045, the network operation 2030 is retried until the coordinator node 2005 becomes available again to the worker node 2015. If the worker node 2015 crashes while in this retry state, the transaction is simply committed during restart of the worker node 2015 and then $LCT_i$=++GCT is performed at the end of the restart phase of worker node 2015. Similarly, if the log persistency I/O fails in block 2045 while the network operations 2030, 2040 succeed, the worker node 2015 can proceed to the next operation only after the log persistency I/O operation is successfully retried.

After the transaction is assigned a CID in block 2055, the transaction is marked as committed in process 2060. Any write locks acquired at worker node 2015 for the transaction are also released in block 2060. In process 2070, the transaction is acknowledged as completed to the database client (not shown) that initiated $T_i$.

With the delayed visibility decision scheme shown in FIG. 20, using the precommit of block 2025, a global statement S1 starting at time point t1 (2090) will not see $T_i$'s change immediately at the time point t1. But, later, as soon as $T_i$ finishes SetAsCommitted, $T_i$'s change will be visible to S1. In this way, without adding any additional lock or synchronization among write transactions, the GCT and LCT increment operations become effectively atomic to other concurrent readers.

Figure 21:
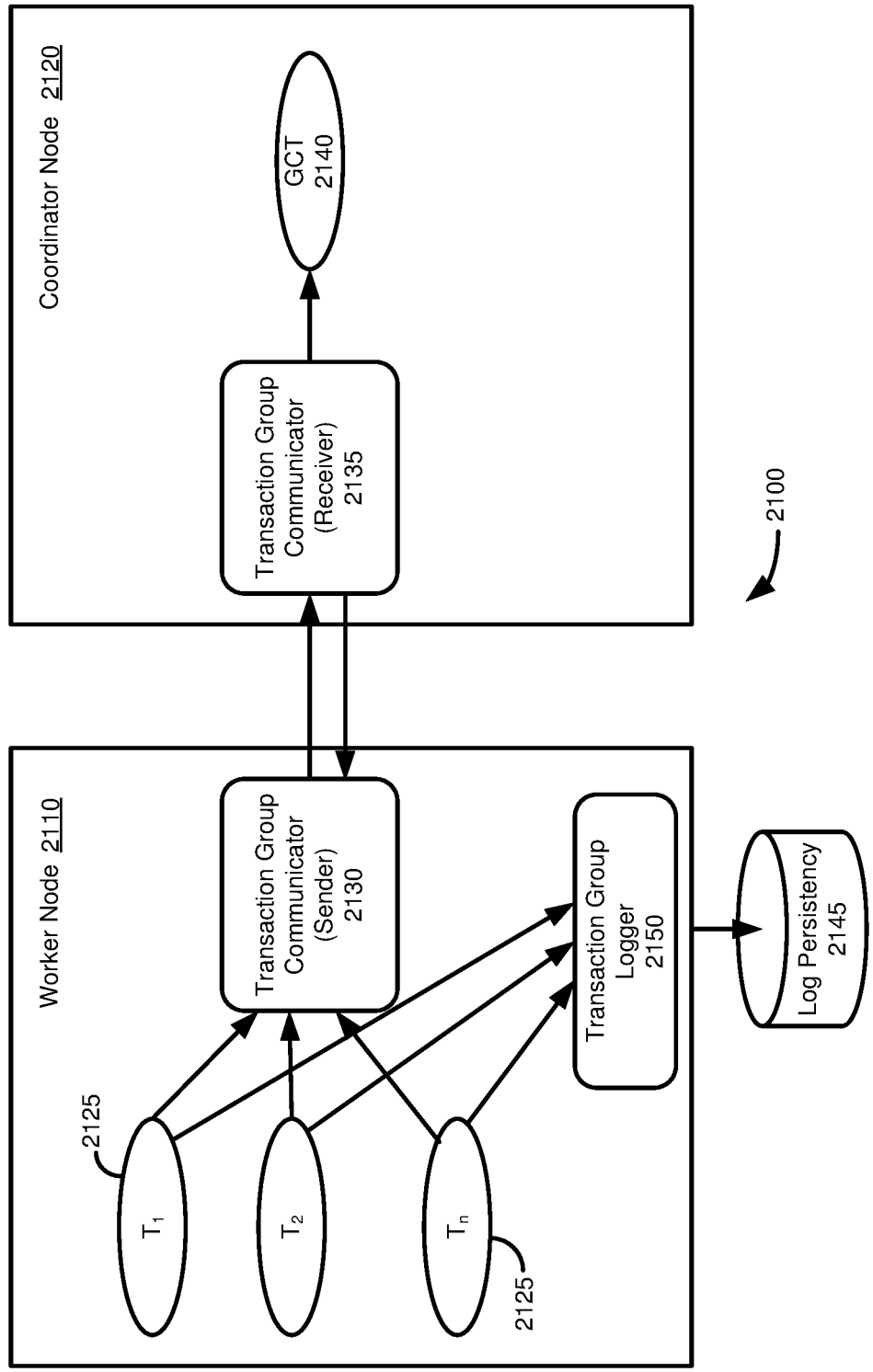
FIG. 21 provides an architecture that may be used with at least certain implementations of a disclosed distributed transaction protocol to group communication requests and commit requests at a worker node to be sent to a coordinator node.

FIG. 21 provides an architecture 2100 illustrating how network calls at a worker node 2110 may be grouped and coalesced to a single network call to a coordinator node 2120. The worker node 2110 executes a plurality of transactions 2125, $T_1$-$T_n$. The transactions 2125 send communication requests for the worker node 2110 to a sender side of a transaction group communicator 2130. The communication requests from the worker node 2110 are sent by the sender side of the group communicator 2130 to a receiver side of a transaction group communicator 2135 maintained at the coordinator node 2120. The receiver side transaction group communicator 2135 mediates concurrent access to one or more transaction tokens, (such as the GCT or cached watermark values) 2140 maintained by the coordinator node 2120, which assigns transaction tokens (such as CIDs) to the transactions and increments the transaction tokens (such as the GCT) as appropriate. The assigned transaction tokens (such as CIDs) are returned to the sender side transaction group communicator 2130. As network requests are enqueued at the sender side transaction group communicator 2130, an additional delay may be introduced, but it is typically trivial in most cases compared to the latency needed for communication with the coordinator node 2120.

A transaction group logger 2150 at the worker node 2110 mediates group commit access to logging I/O requests to persistent storage 2145.

Figure 22:
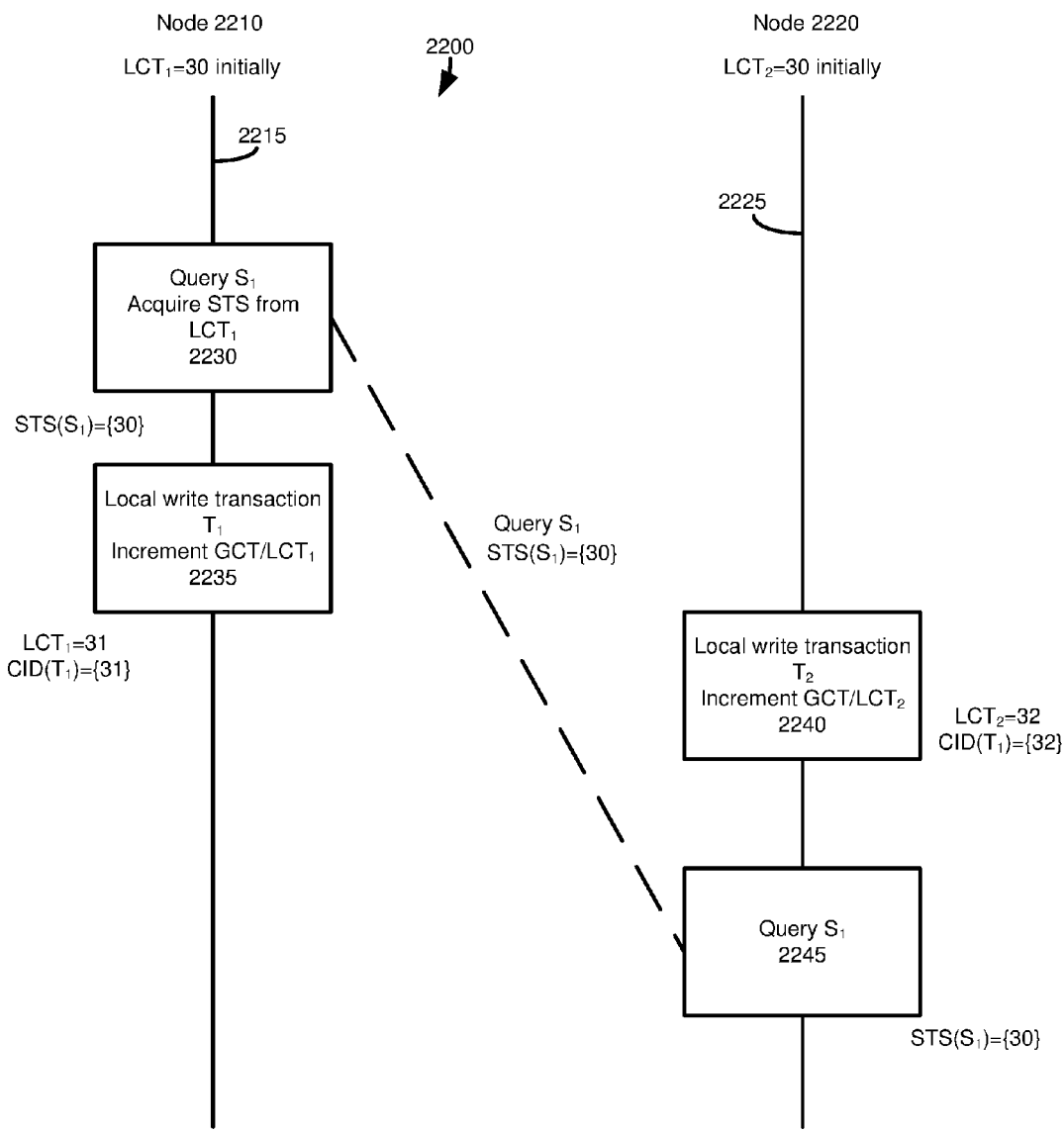
FIG. 22 is a diagram illustrating operations providing snapshot monotonicity occurring at first and second nodes using at least certain implementations of a disclosed distributed transaction protocol.

FIG. 22 presents a scenario 2200 that is a modified version of the scenario 500 of FIG. 5, adapted to the scenario 2000 of FIG. 20, illustrating how an embodiment of the disclosed distributed transaction protocol can provide snapshot monotonicity. Worker nodes 2210, 2220, with respective execution timelines 2215, 2225, have initial GCT values of 30 because every local write transaction increments GCT in at least certain implementations of the disclosed distributed database transaction protocol of this Example 8. Assuming the initial GCT value is 30, $S_1$ will start with $STS(S_1)$=30 in process 2230. Subsequently, write transaction $T_1$ executed in process block 2235 at worker node 2210, will increment GCT to 31 and set $CID(T_1)$=31 at node 2210.

Write transaction $T_2$ executed at worker node 2220 in process 2240 will increment GCT to 32 and set $CID(T_2)$=32. Thus, both of $T_1$ and $T_2$'s changes, with respective CIDs of 31 and 32, will not be visible to S1, which carries with it the initially assigned STS of 30 when it executes at node 2220 at process 2245, which is less than the CIDs of $T_1$ and $T_2$.

Figure 23:
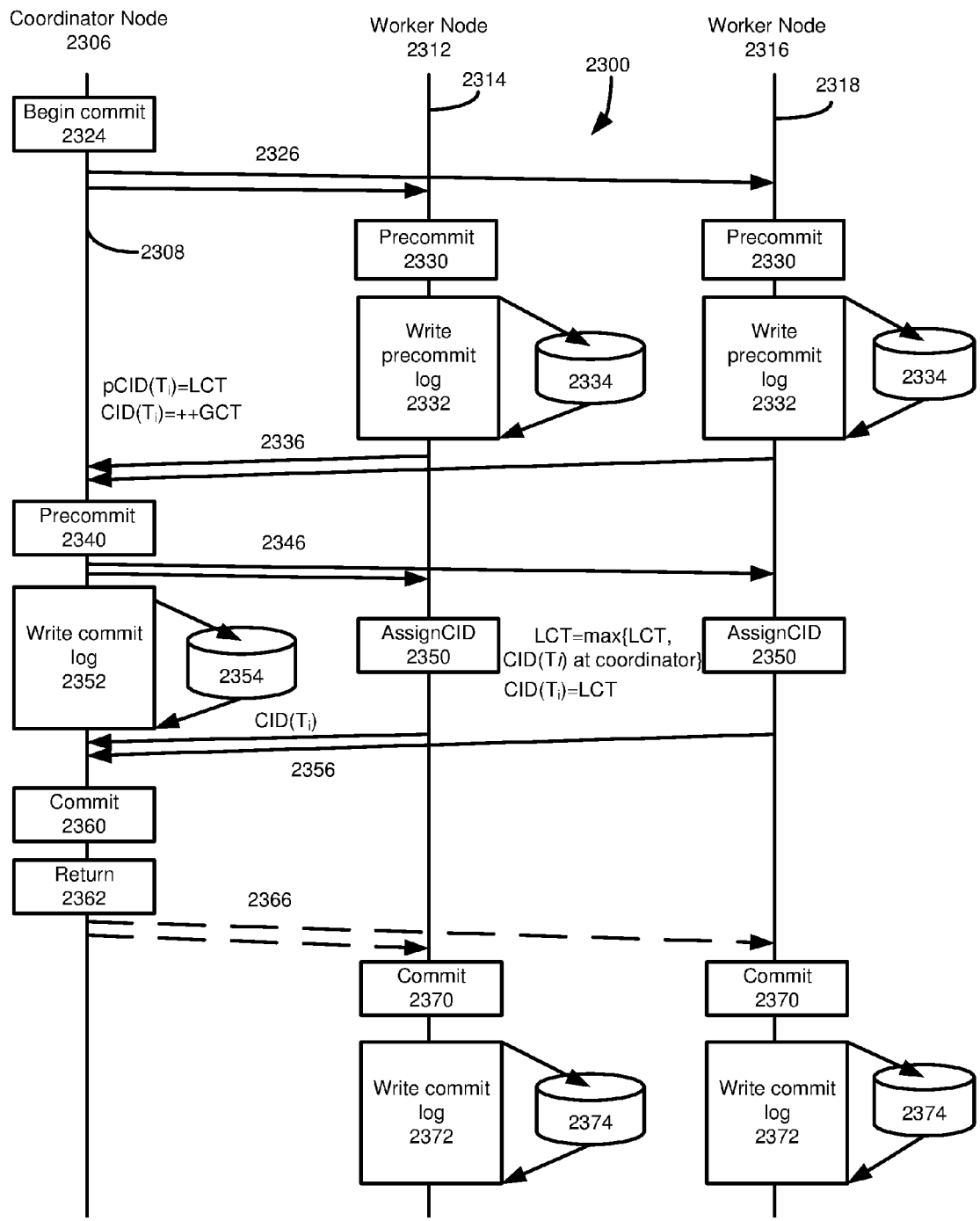
FIG. 23 is a diagram illustrating how a write transaction commits, using at least certain implementations of a disclosed distributed transaction protocol, when it has updated tables at first and second worker nodes.

FIG. 23 presents a scenario 2300 in a system having a coordinator node 2306 and worker nodes 2312, 2316, with respective execution timelines 2308, 2314, 2318. The scenario 2300 illustrates how a write transaction commits after having updated the tables located in more than a single worker node 2312, 2316. To help provide durable atomicity of changes in multiple nodes 2306, 2312, 2316, the scenario 2300 employs a two-phase commit approach. The commit log of the coordinator node 2306 is written only after the precommit log entries of the transaction are safely written to persistent storage at all of the worker nodes 2312, 2316 changed by the transaction.

The commit protocol begins in block 2324, where the coordinator node 2306 sends communications 2326 to the worker nodes 2312, 2316 to prepare the worker nodes for the transaction commit. For example, the coordinator node 2306 may send the communications 2326 in response to a request by a database client (not shown) to commit the transaction. The communications 2326, in a particular example, include a TransactionID for the transaction to be committed. In precommit blocks 2330, each worker node 2312, 2316 executes SetAsPrepared to precommit the transaction, assigning the transaction the LCT currently maintained at the worker node. The worker nodes 2312, 2316 then write the transaction to persistent storage 2334, such as in a precommit log, in block 2332, flushing the pending redo logs of the transaction. The worker nodes 2312, 2316 then communicate with the coordinator node 2302, via notifications 2336, indicating that the transaction has been precommitted at the worker nodes and confirming to the coordinator about the commit readiness of the worker nodes 2312, 2316.

When the coordinator node 2306 receives the notifications 2336, in process block 2340, the coordinator node 2306 precommits the transaction, assigning the transaction a pCID equal to the current GCT maintained by the coordinator node 2306. The coordinator node 2306 also increments the CTS (which is also the GCT, in this case, using IncrementCTS), and assigns the incremented CTS to the transaction as the CID (using AssignCID). Once the coordinator node 2306 has precommitted the transaction, including assigning the CID, the coordinator node 2306 sends communications 2346 to the worker nodes 2312, 2316 indicating the precommitment and associated CID. The worker nodes 2312, 2316 then execute process blocks 2350, in which they increment their locally maintained LCT value (such as using IncrementCTS). In a particular example, the worker nodes 2312, 2316 select as the new LCT value the larger of the current LCT value maintained at the worker node and the CID for the transaction received from the coordinator node 2306 in communication 2346. The worker nodes 2312, 2316 then assign the new LCT value as the CID for the transaction. Each worker node 2312, 2316, after completing block 2350, sends a communication 2356 to the coordinator node 2306, indicating that the transaction was successfully assigned a new CID at the worker nodes. While the communications 2346, and the increment and assign functions of blocks 2350, are being carried out, the coordinator node 2306 writes the commit to persistent storage 2354 in block 2352 (using WriteCommitLog, for example), such as to a commit log.

When the persistency operation 2352 has completed, and the coordinator node 2306 has received the communications 2356 from each of the worker nodes 2312, 2316, the coordinator node 2306 marks the transaction as committed and releases the write locks on the record, such as using SetAsCommitted and ReleaseLocks, in process block 2360. The completion of the transaction is acknowledged by the coordinator node 2306 to the client that initiated the transaction (not shown) in block 2362 (such as using the Return operation).

The coordinator node 2306 sends communications 2366 to the worker nodes 2312, 2316, such as asynchronously, that the transaction has been committed by the coordinator node 2306. When the worker nodes 2312, 2316 receive the communication 2366, the worker nodes 2312, 2316 commit the transaction and release their record write locks in process 2370. The transaction commit is then written by the worker nodes 2312, 2316 to persistent storage 2374, such as a commit log, in process block 2372.

As explained above, the process used in scenario 2300 involves several communications between the coordinator node 2306 and the worker nodes 2312, 2316. To reduce potential performance impacts from these communications, such as network round trips, during commit processing, the second round trip (communications 2346 and 2356) is overlapped by the log persistency I/O and the third trip (which does not need to be a round trip, in at least some examples) is carried out asynchronously after (or at the same time as) the transaction's commit is acknowledged to the client in process 2362. In terms of transaction latency, only the first round trip, used to help provide durable atomicity for multi-node write transactions, presents an added latency cost. In terms of transaction processing throughput, the network cost is reduced, in some examples, by grouping and coalescing the network I/O requests made by concurrent write transactions (such as described with reference to FIG. 21). By acknowledging the commit earlier in the commit process, without waiting for the final commitment of the transaction by the worker nodes 2312, 2316 in process blocks 2370, 2372, the next operation of the same session might encounter a tentative lock conflict if the next operation tries to update the same record updated by the previous write transaction. In at least some implementations, the tentative conflict should not produce any unexpected behavior for end users, because the lock wait time period will typically be short compared to common lock timeout values. Following the ordering 1800 of FIG. 18, in at least some implementations, the second round trip (2346, 2356), is not skipped or coalesced with the third communication (2366), because the IncrementCTS operation should be carried out before the Return operation.

The multi-node write transaction commit process described in FIG. 23 also takes advantage of the delayed visibility decision scheme during the in-doubt period for visibility atomicity across changes distributed to multiple nodes. One difference between FIG. 23 and FIG. 20 is that the coordinator node 2306 additionally has an in-doubt period so that it can decide the write transaction's CID value earlier and the network I/O for CID propagation (communication 2346) can be overlapped by the log persistency I/O (2352) for WriteCommitLog at the coordinator node 2306.

The WriteCommitLog operations 2372 at the worker nodes 2312, 2316 can be initiated after the Return operation 2362 at the coordinator node 2306. Even if a worker node 2312, 2316 crashes without having written its local commit log, the transaction can be detected as an in-doubt transaction during its restart and thus it can be committed again by referring to the coordinator node 2306. If there is neither a precommit nor a commit log entry at a worker node 2312, 2316, then the transaction can be rolled back at the worker node without asking the coordinator node 2306. In case there is a failure during the WriteCommitLog operation 2352 at the coordinator node 2306, or the AssignCID/IncrementCTS operations 2350 at the worker nodes 2312, 2316, a fault handling similar to the one described for FIG. 20 is applied. Other fault tolerance behavior is, in some examples, similar to other two-phase commit protocols.

Note that, in FIG. 23, as long as pCID(T) is smaller than CID(T) for a write transaction T, the pCID values of a transaction at different nodes do not need to have the same value, while CID values should be identical, because the pCID values are used as a hint for early filtering of false positive cases.

Figure 24:
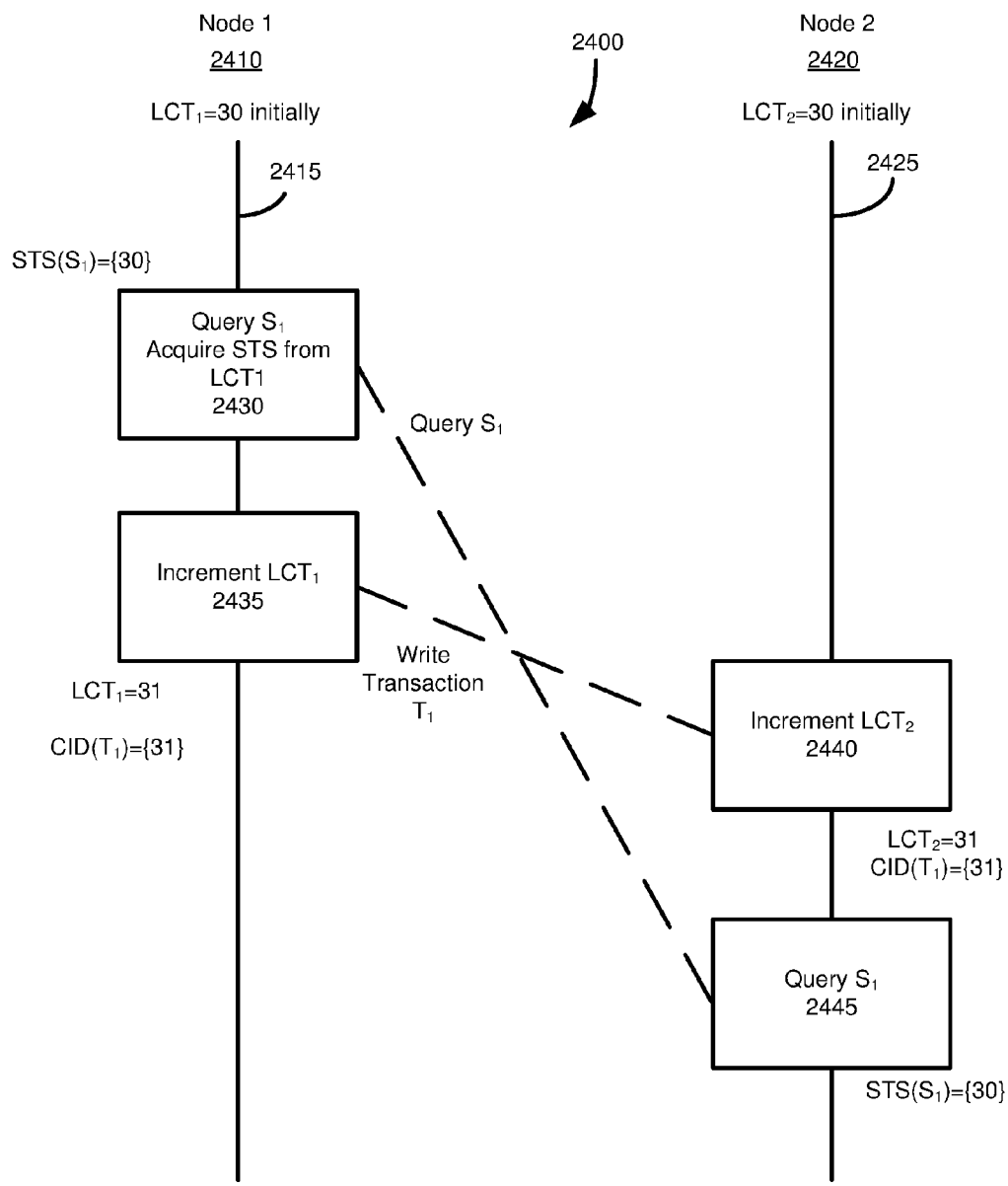
FIG. 24 is a diagram illustrating operations providing visibility atomicity occurring at first and second worker node using at least certain implementations of a disclosed distributed transaction protocol.

FIG. 24 depicts a scenario 2400 in a system having two worker nodes 2410, 2420 with respective execution timelines 2415, 2425, illustrating how at least certain implementations of the disclosed transaction protocol can help resolve the visibility atomicity issue described in conjunction with the scenario 400 of FIG. 4. In FIG. 24, the initial GCT value will be 30 or higher, because, according to the implementations, every local write transaction increments GCT. Assuming the initial GCT value is 30, $S_1$ will start with $STS(S_1)=30$ at block 2430. Then, $T_1$ will increment the GCT to 31 and set $CID(T_1)=31$ at both of node 2410 and node 2420 in processes 2435 and 2440. Therefore, $T_1$'s changes will not be visible to $S_1$ at neither node 2410 nor node 2420, as $S_1$ carries with it the STS of 30 from node 2410 when executed on node 2420 at process 2445, and that STS is less than the CID of $T_2$.

EXAMPLE 9

Decentralized Transaction Commit

This Example 9 describes a decentralized transaction commit protocol according to an embodiment of the present disclosure. The decentralized commit protocol of this Example 9 may be used with any desired snapshot isolation protocol, including, without limitation, the snapshot isolation protocols described in any of Examples 4-7, or may be used separately.

Typically, transaction commit protocols involve communication with, or mediation by, a coordinator node. For example, in the transaction commit protocol of Example 8, in FIG. 20, the worker node 2015 informs the coordinator node 2005 of commit operations local to the worker node 2015, and, as shown in FIG. 23, the coordinator node 2306 mediates multi-node write operations. Particularly as the number of worker nodes increases, or if the database system tends to process higher numbers of multi-node write transactions, involvement of the coordinator node with the commit process can result in undesirable network loads or processor loads at the coordinator node, or increased transaction processing times.

Figure 25:
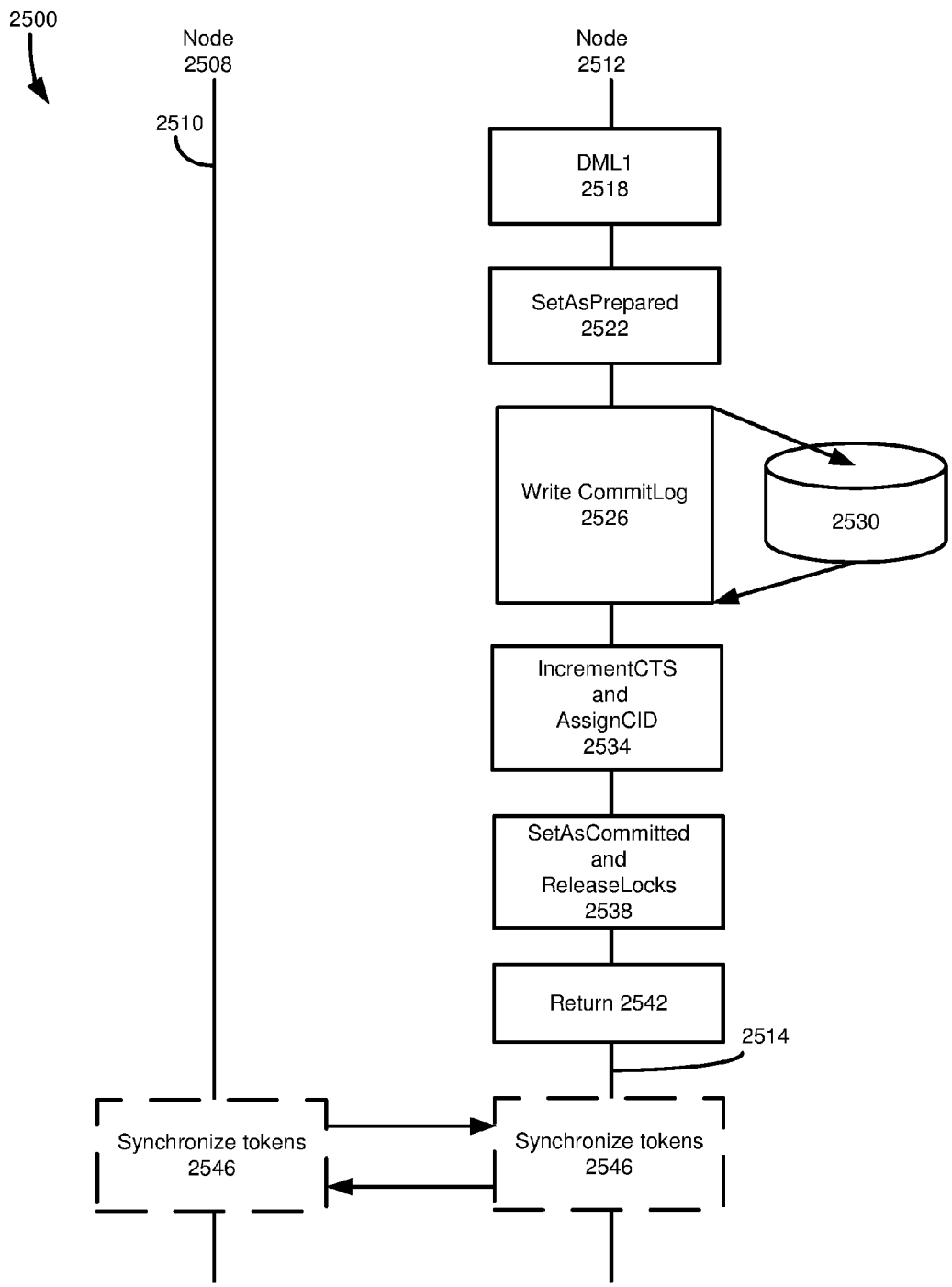
FIG. 25 is a diagram illustrating how a write transaction commits, using at least certain implementations of a disclosed distributed transaction protocol, when it has only updated tables at a single worker node.

FIG. 25 illustrates a scenario 2500 in a system having a coordinator node 2508 and a worker node 2512 with respective execution timelines 2510, 2514. The scenario 2500 illustrates how transaction commits may be carried out according to this Example 9 for write transactions that occur at a single worker node 2512.

In block 2518, worker node 2512 executes a single-node DML statement DML1 that includes a write operation. In process 2522, the worker node 2512 sets the status of DML1 as precommitted, such as in response to a request from a database client to commit the transaction.

In block 2526, DML1 is written to the commit log of worker node 2512, such as being stored in persistent storage 2530. In process 2534, the worker node 2512 increments its locally maintained transaction token, such as local commit timestamp, and assigns an identifier (or transaction token), such as a commit ID, to DML1. The worker node sets DML1 as committed and releases any write locks on records associated with DML1 in process 2538. The worker node 2512, in process 2542, returns a confirmation to a database client that the transaction was committed.

As described, the commitment process for DML1 does not require the worker node 2512 to communicate with the coordinator node 2508. However, in optional process 2546, the coordinator node 2508 and the worker node 2512 may synchronize their transaction tokens, such as through a snapshot isolation protocol. For example, the coordinator node 2508 and the worker node 2512 may synchronize their commit timestamps using the protocols of any of Examples 4-7. For at least Examples 5 and 6, the synchronization process 2546 can happen periodically (and, optionally, can include more than one synchronization operation in a synchronization cycle), such that it precedes, executes concurrently with, or follows the query processing operations 2522, 2526, 2534, 2538, and 2542. In this case, the locally maintained transaction token, such as local commit timestamp, can be updated at block 2534 using the most recently received synchronization timestamp token.

Figure 26:
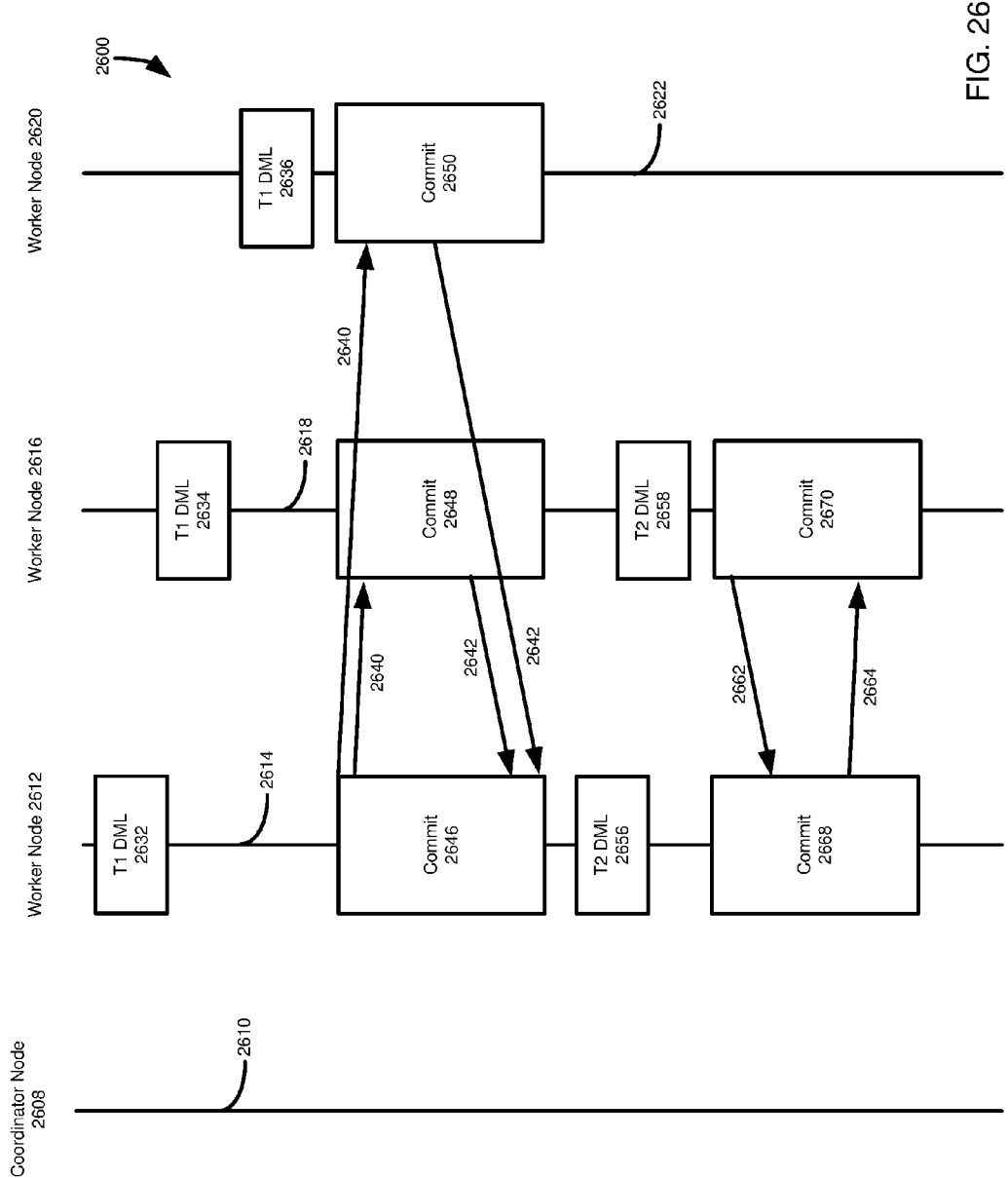
FIG. 26 is a diagram generally depicting a decentralized commit process according to an aspect of the present disclosure.

FIG. 26 presents a scenario 2600 that provides an overview of how multi-node write operations commit according to this Example 9. In the scenario 2600, a system includes a coordinator node 2608 and worker nodes 2612, 2616, 2620, with respective execution timelines 2610, 2614, 2618, 2622. In FIG. 26, the coordinator node 2608 no longer plays a role in transaction commit processing for the given transaction. Instead, for the given transaction, one of the worker nodes 2612, 2616, 2620 acts as coordinator for purposes of committing that transaction.

Worker nodes 2612, 2616, 2620 receive and execute DML statements 2632, 2634, 2636, respectively, with write operations, which are associated with a transaction T1. Worker node 2612 is selected to mediate the commit of T1, acting as a coordinator node for this particular transaction. For example, the worker node 2612 may be selected to act as the coordinator for the commit of T1 by receiving a request from a database client to commit transaction T1. However, in other examples, a different worker node may act as the coordinator. For example, the worker node acting as coordinator may be selected based on other factors, including the topology of the scenario 2600 or the processing and network loads and capacities of the respective worker nodes 2612, 2616, 2620.

The worker node acting as the coordinator node (worker node 2612 for T1) typically is responsible for incrementing and assigning a transaction token to a particular transaction, $T_i$, including providing the transaction token to the non-coordinator worker nodes (worker nodes 2616, 2620 for T1).

In addition, the worker node acting as the coordinator node for a particular transaction $T_i$ typically maintains a table of in-doubt transactions for the transaction for which the respective worker node is acting as coordinator. Thus, each of worker nodes 2612, 2616, 2620 may act as a coordinator node for different transactions, including maintaining a table of in-doubt transactions for which the respective node is acting as coordinator. In some cases, the commit process is carried out synchronously. In other cases, one or more steps of the commit process may be carried out asynchronously.

In FIG. 26, acting-coordinator worker node 2612 sends information to, and receives information from, non-coordinator worker nodes 2616, 2620 to carry out the commit processes in communications 2640, 2642, respectively. Communications 2640, 2642 are intended to generally indicate that the worker nodes 2612, 2616, 2620 exchange information, and the actual commit processes 2646, 2648, 2650 may include more than one communication to or from the acting-coordinator worker node 2612 and the non-coordinator worker nodes 2616, 2620. In addition, the number of communications sent by the acting-coordinator worker node 2612 need not be the same number of communications received by the acting-coordinator worker node 2612 from the non-coordinator worker nodes 2616, 2620.

Scenario 2600 also includes DML statements 2656, 2658 with write operations, which are received and executed by worker nodes 2612, 2616, respectively, and associated with a second transaction T2. Worker node 2616 is selected to mediate the commit of T2, acting as coordinator for this transaction. For example, the worker node 2616 may be selected to act as the coordinator for the commit of T2 by receiving a request from a database client to commit transaction T2.

For transaction T2, acting-coordinator worker node 2616 sends information to, and receives information from, non-coordinator worker node 2612 to carry out the commit processes in communications 2662, 2664, respectively. As described above, communications 2662, 2664 are intended to generally indicate communication between the worker nodes 2612, 2616, and the number of actual communications, and their content, may vary depending on the particular commit protocol used. The worker nodes 2612, 2616 commit T2 in blocks 2668, 2670, respectively.

Figure 27:
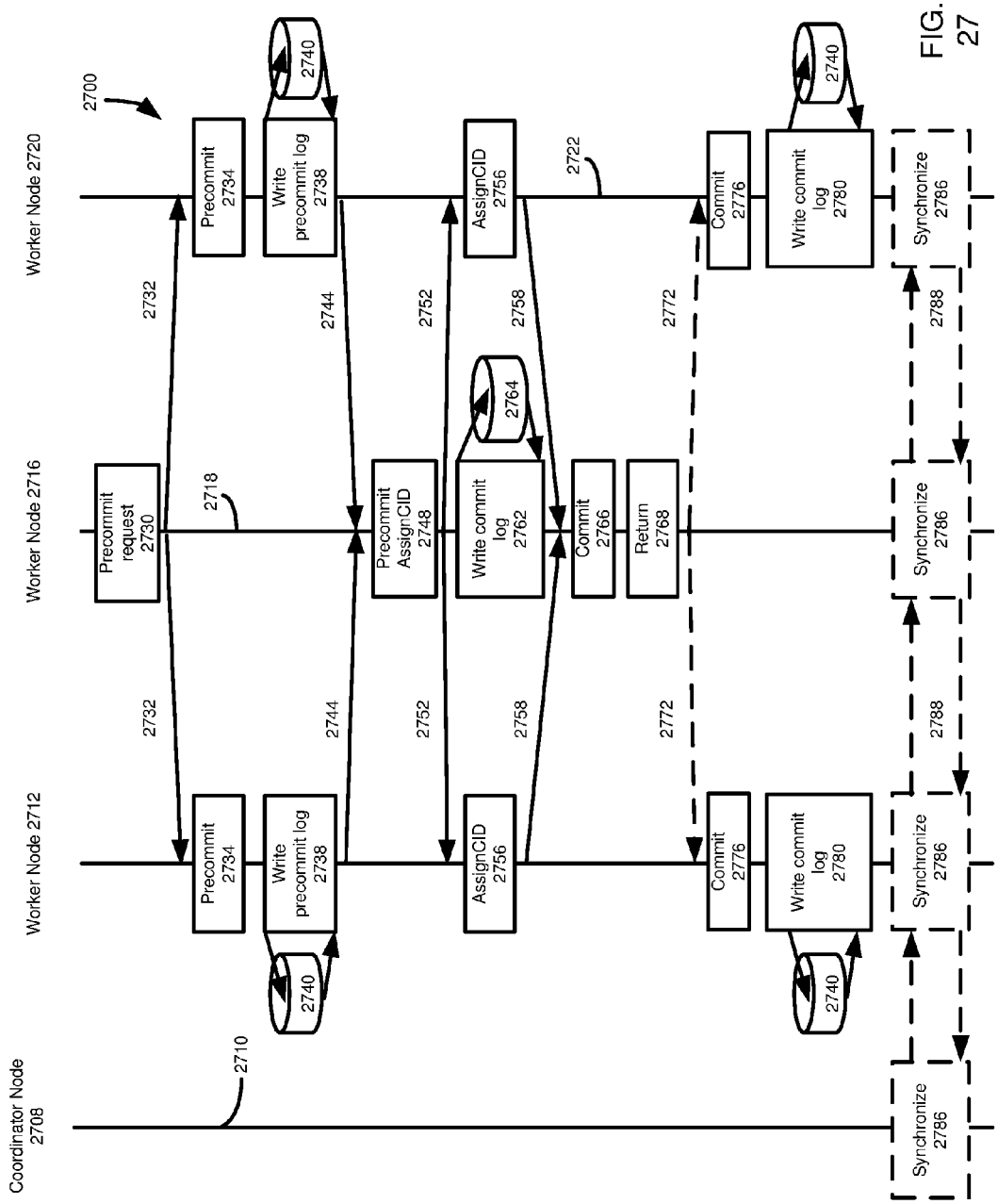
FIG. 27 is a diagram illustrating how a multi-write transaction commits using at least certain implementations of a disclosed distributed transaction protocol providing for a decentralized commit process.

FIG. 27 depicts a scenario 2700 illustrating how multi-node write transactions commit according to a particular implementation of the protocol of this Example 9. In the scenario 2700, a system includes a coordinator node 2708 and worker nodes 2712, 2716, 2720, with respective execution timelines 2710, 2714, 2718, and 2722. As in FIG. 26, in FIG. 27, the coordinator node 2708 no longer plays a role in transaction commit processing for the given transaction. Instead, for the given transaction, one of the worker nodes 2712, 2716, 2720 acts as coordinator for purposes of committing that transaction.

In block 2730, acting-coordinator worker node 2716 initiates the commit process by sending precommit requests to non-coordinator worker nodes 2712, 2720 in communications 2732. For example, the acting-coordinator worker node 2716 may send the precommit request in response to a request by a database client to commit a transaction.

In particular examples of the scenario 2700, the worker node 2712, 2716, 2720 receiving the commit request for a given transaction $T_i$ acts as the coordinator for $T_i$, rather than the coordinator node 2708. In blocks 2734, the non-coordinator worker nodes 2712, 2720 mark the records corresponding to the transaction to be committed as in-doubt, and write precommit log entries, such as to persistent storage

2740, in blocks 2738. The precommit log entries include the identity of the worker node acting as the coordinator for the transaction $T_i$ (in the example of FIG. 27, worker node 2716). In this way, if one of the worker nodes 2712, 2720 experiences a failure, it may determine the final commit-tance of the transaction by communicating with the worker node acting as the coordinator for each in-doubt transaction, as identified in the precommit log entry.

The non-coordinator worker nodes 2712, 2720 send precommit acknowledgements to the acting-coordinator worker node 2716 in communications 2744. The communications 2744 can include additional information, including the current transaction token, such as local commit timestamp, of the non-coordinator worker nodes 2712, 2716. Upon receiving the communications 2744, the acting-coordinator worker node 2716 precommits the transaction, including assigning a precommit transaction token, such as a precommit ID (for example, a timestamp) in block 2748. In particular examples, the acting-coordinator worker node 2716 acting as the coordinator for the commit of $T_i$, selects as the precommit transaction token the maximum of the precommit state token value of worker node 2716 and the precommit transaction token values of non-coordinator worker nodes 2712, 2720 received in communications 2744. The acting-coordinator worker node 2716 may also use this maximum value as a new value of its local transaction token. Also in block 2748, the acting-coordinator worker node 2716 increments a local transaction token, such as a commitID (for example, a timestamp), and assigns the transaction token to the transaction $T_i$.

The commit transaction token assigned to the transaction $T_i$ by the acting-coordinator worker node 2716 in block 2748 is sent by the acting-coordinator worker node 2716 to the non-coordinator worker nodes 2712, 2720 in communications 2752. In blocks 2756, the non-coordinator worker nodes assign a transaction token, such as a commitID (for example, a timestamp) value, to the transaction $T_i$. For example, each non-coordinator worker node 2712, 2720 may assign as a transaction token the larger of the current transaction token of the respective worker node 2712, 2720 and the transaction token sent by the acting-coordinator worker node 2716 in communications 2752. In communications 2758, the non-coordinator worker nodes 2712, 2720 acknowledge to the acting-coordinator worker node 2716 that the transaction token has been assigned. While the communications 2752, 2758, and the assignment of the transaction token at the non-coordinator worker nodes 2712, 2720 is occurring, the acting-coordinator worker node 2716 commits the transaction in block 2762, including writing a commit log, such as to persistent storage 2764.

When the acting-coordinator worker node 2716 receives the communications 2758 acknowledging the assignment of the transaction token to the transaction at non-coordinator worker nodes 2712, 2720, and the commit log was been written in block 2762, the acting-coordinator worker node 2716 marks the transaction as committed in block 2766. The commit of $T_i$ is acknowledged to a database client by the acting-coordinator worker node 2716 in process 2768.

In communications 2772, the acting-coordinator worker node 2716 requests the non-coordinator worker nodes 2712, 2720 to commit $T_i$. As shown, the commit by the non-coordinator worker nodes 2712, 2720 is asynchronous. If desired, the commit by the non-coordinator worker nodes 2712, 2720 could be carried out synchronously.

After receiving the commit requests in communications 2772, the non-coordinator worker nodes 2712, 2720 mark the transaction as committed in blocks 2776. In process 2780, the non-coordinator worker nodes 2712, 2720 write the transaction to a commit log, such as writing the logs to persistent storage 2740.

In blocks 2786, the coordinator node 2708 and worker nodes 2712, 2716, 2720 synchronize transaction tokens, such as between a global commit timestamp maintained by the coordinator node 2708 and location commit timestamps maintained by each of the worker nodes 2712, 2716, 2720. The synchronization process may be, in particular implementations, one of the protocols in Examples 4-7. For at least Examples 5 and 6, the synchronization process 2786 can happen periodically (and, optionally, include more than one synchronization operation in a synchronization cycle), such that it precedes, executes concurrently with, or follows the query processing operations. In this case, the locally maintained transaction token, such as local commit timestamp, can be updated before block 2748 using the most recently received synchronization timestamp token. However, in other implementations, the transaction tokens are synchronized in another manner. Synchronization 2786 may be carried out using communications 2788.

Although FIG. 27 illustrates a single communication 2788 to, and a single communication 2788 from, each node 2708, 2712, 2716, 2720, it should be appreciated that more than one communication of each type could be used. In addition, for clarity of presentation, FIG. 27 shows each node 2708, 2712, 2716, 2720 communicating only with directly neighboring nodes. However, in at least certain implementations of the present disclosure, each of the nodes 2708, 2712, 2716, 2720 may directly communicate with any other node. For example, the coordinator node 2708 may communicate directly with worker node 2716. If desired, information can be transmitted from one node 2708, 2712, 2716, 2720 through one or intermediate nodes, or other intermediaries. For example, information sent by coordinator node 2708 could be sent to worker node 2716 using worker node 2712 as an intermediary.

It should be appreciated that modifications can be made to the scenario 2700 without departing from the scope of this Example 9. For example, although synchronization 2786 is shown as occurring after the commit process has been completed, the synchronization process 2786 may be carried out at other stages of the commit process shown in FIG. 27. For example, the synchronization process 2786 may be implemented as a process that can occur in parallel with the commit process depicted in FIG. 27.

Figure 28:
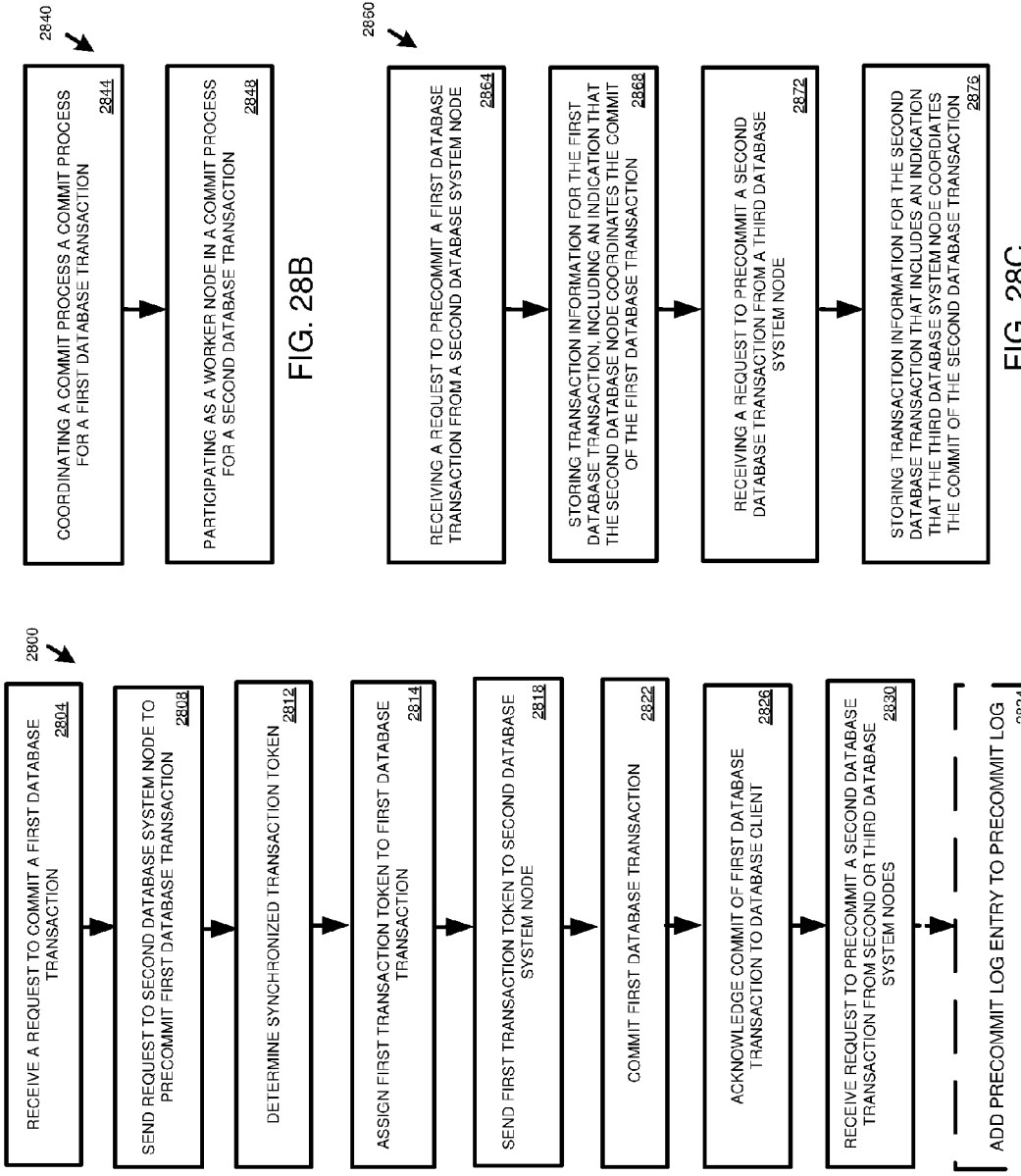
FIGS. 28A-28C are flowcharts of example methods summarizing actions occurring at a first worker database system node acting as a decentralized coordinator node during an embodiment of the present disclosure for a decentralized commit process for multi-node write transactions.

FIG. 28A present a flowchart for a method 2800 describing actions occurring at a first database system node that is in communication with at least second and third database system nodes for particular implementations of this Example 9. In a particular configuration, the first and second database system nodes are worker nodes and the third database system node is a coordinator node, such as a node that is responsible for synchronizing transaction tokens in the database system. In other configurations, the third database system node is another worker node. Although described as having three nodes, the database system may include a larger number of nodes, with one of the nodes, optionally, acting a coordinator node for the database system.

In step 2804, the first database system node receives a request to commit a first database transaction. For example, the first database node may receive a commit request from a database client to commit the first database transaction. In the example of FIG. 28A, the first database system node is the acting-coordinator node for the first database transaction. The first database system node, in step 2808, sends a request to the second database system node (a non-coordinator node for the first database transaction) to commit the first database transaction. The first database system node determines a synchronized transaction token in step 2812. The first database system node assigns a first transaction token, based at least in part on the synchronized transaction token, to the first database transaction in step 2814. In step 2818, the first transaction token is sent to the second database system node.

The first database system node commits the first database transaction in step 2822. In step 2826, the first database system node acknowledges the commit of the first database transaction to a database client.

The first database system node, in step 2830, receives from the second or third database system nodes a request to precommit a second database transaction. Thus, in the example of FIG. 28A, the first database system node is a non-coordinator node for the second database transaction.

In optional step 2834, the first database system node adds to a precommit log a precommit log entry.

The method 2800 may include additional steps. For example, the first database system node may synchronize a transaction token with the second and third database system nodes. In particular examples, the synchronization is carried out using one of the methods of Examples 4-7.

FIG. 28B present a flowchart for a generalized method 2840 describing actions occurring at a first database system node that is in communication with at least second and third database system nodes for particular implementations of this Example 9. The database system nodes, and the database system, may be configured as described above for FIG. 28A.

In step 2844, the first database system node coordinates a commit process for a first database transaction according to a transaction commit protocol. The first database system node acts as a coordinator node, and each of the one or more other database system nodes involved in the commit of the transaction act as worker nodes during the commit process for the first database transaction. For example, the first database system node performs actions as shown in blocks 2808, 2812, 2814, 2818, 2822, and 2826 of FIG. 28A to coordinate the commit process for the first database transaction.

The first database system node, in step 2448, participates in a commit process for a second database transaction according to the transaction commit protocol. The first database system node acts as a worker node, and one of the other database system nodes acts as a coordinator node during the commit process for the second database transaction. For example, the first database system node performs actions as shown in blocks 2830 and 2834 of FIG. 28A to participate in the commit process for the second database transaction.

From another perspective, FIG. 28C present a flowchart for a method 2860 describing actions occurring at a first database system node that is in communication with at least second and third database system nodes for particular implementations of this Example 9. According to the example of FIG. 28C, the first database system node acts as a non-coordinator worker node, receiving and reacting to communications from other worker nodes that act as coordinator nodes for database transactions.

In step 2864, the first database system node receives a request to precommit a first database transaction from the second database system node (acting coordinator for the first database transaction). The first database system node, in step 2868, stores transaction information, e.g., in a precommit log entry, for the first database transaction. The stored transaction information includes an indication that the second database system node coordinates the commit of the first database transaction.

The first database system node receives from the third database system node (acting coordinator for the second database transaction) a request to precommit a second database transaction in step 2872. In step 2876, the first database system node stores transaction information, e.g., in a precommit log entry, for the second database transaction. The stored transaction information includes an indication that the third database system node coordinates the commit of the second database transaction.

The first database system node can similarly repeat the acts of receiving a precommit request and storing transaction information for one or more additional iterations. In this way, the first database system stores transaction information that can be used to identify coordinator nodes when restoring or replaying transactions during failure recovery.

EXAMPLE 10

Computing Systems

Figure 29:
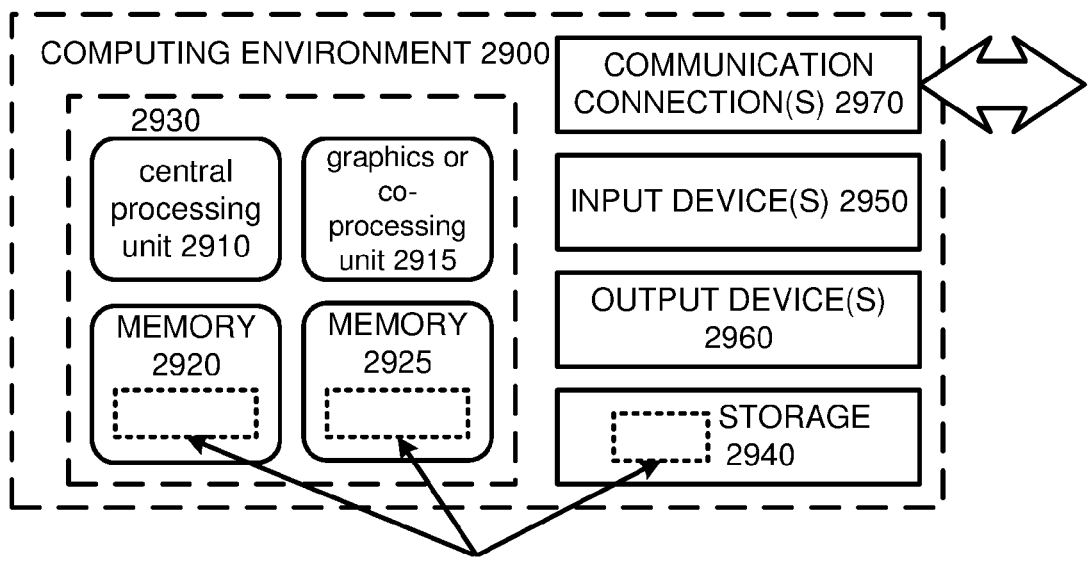
FIG. 29 is a diagram of an example computing system in which some described embodiments can be implemented.

FIG. 29 depicts a generalized example of a suitable computing system 2900 in which the described innovations may be implemented. The computing system 2900 is not intended to suggest any limitation as to scope of use or functionality of the present disclosure, as the innovations may be implemented in diverse general-purpose or special-purpose computing systems.

With reference to FIG. 29, the computing system 2900 includes one or more processing units 2910, 2915 and memory 2920, 2925. In FIG. 29, this basic configuration 2930 is included within a dashed line. The processing units 2910, 2915 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 29 shows a central processing unit 2910 as well as a graphics processing unit or co-processing unit 2915. The tangible memory 2920, 2925 may be volatile memory (e.g., registers, cache, RAM), nonvolatile memory (e.g., ROM, EEPROM, flash memory, etc.), or some combination of the two, accessible by the processing unit(s) 2910, 2915. The memory 2920, 2925 stores software 2980 implementing one or more innovations described herein, in the form of computer-executable instructions suitable for execution by the processing unit(s) 2910, 2915.

A computing system 2900 may have additional features. For example, the computing system 2900 includes storage 2940, one or more input devices 2950, one or more output devices 2960, and one or more communication connections 2970. An interconnection mechanism (not shown) such as a bus, controller, or network interconnects the components of the computing system 2900. Typically, operating system software (not shown) provides an operating environment for other software executing in the computing system 2900, and coordinates activities of the components of the computing system 2900.

The tangible storage 2940 may be removable or non-removable, and includes magnetic disks, magnetic tapes or cassettes, CD-ROMs, DVDs, or any other medium which can be used to store information in a non-transitory way and which can be accessed within the computing system 2900.

The storage 2940 stores instructions for the software 2980 implementing one or more innovations described herein.

The input device(s) 2950 may be a touch input device such as a keyboard, mouse, pen, or trackball, a voice input device, a scanning device, or another device that provides input to the computing system 2900. The output device(s) 2960 may be a display, printer, speaker, CD-writer, or another device that provides output from the computing system 2900.

The communication connection(s) 2970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

EXAMPLE 11

Cloud Computing Environment

Figure 30:
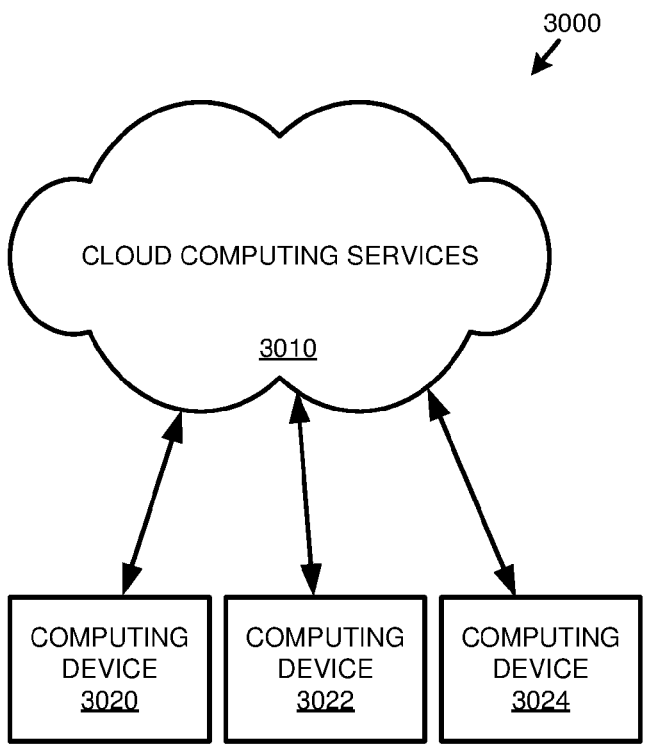
FIG. 30 is an example cloud computing environment that can be used in conjunction with the technologies described herein.

FIG. 30 depicts an example cloud computing environment 3000 in which the described technologies can be implemented. The cloud computing environment 3000 comprises cloud computing services 3010. The cloud computing services 3010 can comprise various types of cloud computing resources, such as computer servers, data storage repositories, networking resources, etc. The cloud computing services 3010 can be centrally located (e.g., provided by a data center of a business or organization) or distributed (e.g., provided by various computing resources located at different locations, such as different data centers and/or located in different cities or countries).

The cloud computing services 3010 are utilized by various types of computing devices (e.g., client computing devices), such as computing devices 3020, 3022, and 3024. For example, the computing devices (e.g., 3020, 3022, and 3024) can be computers (e.g., desktop or laptop computers), mobile devices (e.g., tablet computers or smart phones), or other types of computing devices. For example, the computing devices (e.g., 3020, 3022, and 3024) can utilize the cloud computing services 3010 to perform computing operators (e.g., data processing, data storage, and the like).

EXAMPLE 12

Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Tangible computer-readable media are any available tangible media that can be accessed within a computing environment (e.g., one or more optical media discs such as DVD or CD, volatile memory components (such as DRAM or SRAM), or non-volatile memory components (such as flash memory or hard drives)). By way of example and with reference to FIG. 29, computer-readable media include memory 2920 and 2925, and storage 2940. The term computer-readable media does not include signals and carrier waves. In addition, the term computer-readable media does not include communication connections (e.g., 2970).

Any of the computer-executable instructions for implementing the disclosed techniques as well as any data created and used during implementation of the disclosed embodiments can be stored on one or more computer-readable media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, implemented at least in part by a first database system node comprising a processing unit and memory, the first database system node being in communication with at least a second and a third database system nodes, for facilitating database transaction processing within a database environment, the method comprising, at the first database system node:
    receiving a request to commit a first database transaction;
    sending a request to the second database system node to precommit the first database transaction;
    determining a synchronized transaction token, the synchronized transaction token representing a most recent commit state known to at least the first database system node and the second database system node;
    assigning, based at least in part on the synchronized transaction token, a first transaction token to the first database transaction;
    sending the first transaction token to the second database system node;
    committing the first database transaction;
    acknowledging the commit of the first database transaction to a database client;
    receiving a request from the third database system node to precommit a second database transaction; and
    adding, to a precommit log stored in persistent storage at the first database system node, a precommit log entry for the second database transaction, the precommit log entry for the second database transaction comprising an indication that the third database system node coordinates the commit of the second database transaction;
    wherein the first database system node acts as a coordinator node for the first database transaction and as a worker node for the second database transaction.

2. The method of claim 1, wherein each of the synchronized transaction token and the first transaction token comprise a commit ID.

3. The method of claim 1, further comprising, at the first database system node:
    receiving, from the third database system node, a second transaction token associated with the second database transaction, wherein the second transaction token comprises a timestamp;
    determining, based at least in part on the second transaction token, a third transaction token, wherein the third transaction token comprises a timestamp;
    assigning the third transaction token to the second database transaction; and
    marking the second database transaction as committed.

4. The method of claim 3, wherein determining a third transaction token comprises:
    comparing the second transaction token to a local transaction token maintained by the first database system node; and
    selecting as, the third transaction token, the more current value of the second transaction token and the local transaction token maintained by the first database system node.

5. The method of claim 3, further comprising receiving a request from the third database system node to commit the second database transaction.

6. The method of claim 3, wherein the third transaction token has the same value as the second transaction token.

7. The method of claim 3, wherein the commit of the second database transaction is acknowledged to a database client by the third database system node.

8. The method of claim 1, wherein the determining a synchronized transaction token comprises:
    receiving a local commit timestamp from each of the at least a second and a third database system nodes;
    determining a most current value among a local commit timestamp of the first database system node and the respective local commit timestamps from the at least a second and a third database system nodes; and
    setting the synchronized transaction token to be the most current value.

9. The method of claim 1, further comprising:
    incrementing the synchronized transaction token; and
    setting the first transaction token to be the incremented synchronized transaction token.

10. The method of claim 1, wherein the first database system node maintains a first in-doubt transaction table for transactions coordinated by the first database system node, and wherein each of the at least a second and a third database system nodes maintains its own in-doubt transaction table for transactions coordinated by that database system node.

11. The method of claim 1, further comprising, without waiting to receive a precommit acknowledgement from the second database system node in response to the sending the request to the second database system node to precommit the first database transaction, starting a process to write a commit log for the first database transaction.

12. The method of claim 1, further comprising:
    receiving a multi-node database statement, the multi-node database statement executable at least in part at the first database system node;
    determining that the multi-node database statement is associated with an indicator that the multi-node database statement can be executed with relaxed consistency; and
    based on the determining that the multi-node database statement is associated with an indicator that the multi-node database statement can be executed with relaxed consistency, without waiting to synchronize a local transaction token maintained by the first database system node with one or more transaction tokens maintained by one or more other database system nodes, or to update an interval counter or flag indicative of such synchronizing, executing the multi-node database statement, wherein the local transaction token indicates data versions visible during the execution of the multi-node database statement.

13. The method of claim 1, further comprising, at the first database system node:
experiencing a failure;
responsive to experiencing the failure, accessing the stored precommit log entry for the second database transaction to identify that the third database system node coordinated the commit of the second database transaction; and
communicating with the third database system node to determine a final committance of the second database transaction.

14. A server comprising a processing unit and memory, wherein the server is configured to operate a first database system node of a database system, the first database system node being in communication with one or more other database system nodes, wherein the server is further configured to perform database transaction processing comprising:
coordinating, as the first database system node, a commit process for a first database transaction according to a transaction commit protocol, wherein the first database system node acts as coordinator node and each of the one or more other database system nodes involved in the commit act as worker node during the commit process for the first database transaction, the coordinating comprising:
sending a request to at least a second database system node to precommit a first database transaction; and
determining a synchronized transaction token, the synchronized transaction token representing a most recent commit state known to at least the first database system node and the second database system node; and
participating, as the first database system node, in a commit process for a second database transaction according to the transaction commit protocol, wherein the first database system node acts as worker node and one of the one or more other database system nodes acts as coordinator node during the commit process for the second database transaction, the participating comprising:
receiving a request from a third database system node, which can be the second database system node, to precommit a second transaction;
adding, to a precommit log, a precommit log entry that comprises an indication that the third database system node coordinates the commit of the second database transaction;
precommitting the second transaction; and
sending a current value of a location transaction token maintained by the first database system node to the third database system node.

15. The server of claim 14, wherein the coordinating the commit process for the first database transaction includes:
receiving a request to commit the first database transaction;
to each of the one or more other database system nodes involved in the commit, sending a request to precommit the first database transaction;

assigning, based at least in part of the synchronized transaction token, a first transaction token to the first database transaction;
to each of the one or more other database system nodes involved in the commit, sending the first transaction token;
committing the first database transaction; and
acknowledging the commit of the first database transaction to a database client.

16. The server of claim 15, wherein the first transaction token is the incremented value of the synchronized transaction token.

17. The server of claim 14, wherein the participating in the commit process for the second database transaction further includes:
receiving a second transaction token from the given database system node, the second transaction token being associated with the second database transaction;
determining, based at least in part on the second transaction token, a third transaction token;
assigning the third transaction token to the second database transaction;
sending an acknowledgment to the third database system node that the third transaction token was assigned to the second database transaction;
receiving a request from the third database system node to commit the second database transaction; and
setting the second database transaction as committed.

18. The server of claim 14, wherein the first database system node maintains an in-doubt transaction table for transactions coordinated by the first database system node.

19. One or more tangible computer-readable media storing computer-executable instructions for causing a server programmed thereby to perform database transaction processing within a database environment using data manipulation language (DML) statements, the server implementing a first database system node of a database system, the first database system node being in communication with at least a second and a third database system nodes, the database transaction processing comprising:
receiving a request to precommit a first database transaction from the second database system node;
storing transaction information for the first database transaction, including adding, to a precommit log stored in persistent storage at the first database system node, a first precommit log entry that comprises an indication that the second database system node coordinates committing the first database transaction;
precommitting the first database transaction;
sending an indication of the precommitting to the second database system node;
receiving a request to precommit a second database transaction from the third database system node;
storing transaction information for the second database transaction, including adding, to the precommit log, a second precommit log entry that comprises an indication that the third database system node coordinates committing the second database transaction;
precommitting the second database transaction; and
sending an indication of the precommitting of the second database transaction to the third database system node.

20. The one or more tangible computer-readable media of claim 19, wherein the database transaction processing further comprises:
receiving, from a database client, a request to commit a third database transaction; and coordinating, among the first database system node and the at least a second and third database system nodes, the commit of the third database transaction.

21. The one or more tangible computer-readable media of claim 20, wherein the coordinating includes adding the third database transaction to a table of in-doubt transactions maintained by the first database system node.

* * * * *